US012439394B2

(12) United States Patent
Jang et al.

(10) Patent No.: US 12,439,394 B2
(45) Date of Patent: Oct. 7, 2025

(54) METHOD AND APPARATUS FOR DEFAULT BEAM BEHAVIOR OF PUSCH FOR FEMIMO

(71) Applicant: Samsung Electronics Co., Ltd., Suwon-si (KR)

(72) Inventors: Youngrok Jang, Suwon-si (KR); Dhivagar Baskaran, Bangalore (IN); Jinyoung Oh, Suwon-si (KR); Seongmok Lim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/282,692

(22) PCT Filed: Mar. 15, 2022

(86) PCT No.: PCT/KR2022/003603
§ 371 (c)(1),
(2) Date: Sep. 18, 2023

(87) PCT Pub. No.: WO2022/197065
PCT Pub. Date: Sep. 22, 2022

(65) Prior Publication Data
US 2024/0195483 A1    Jun. 13, 2024

(30) Foreign Application Priority Data
Mar. 19, 2021  (IN) ............................. 202111011793

(51) Int. Cl.
*H04B 7/06* (2006.01)
*H04B 7/0404* (2017.01)
(Continued)

(52) U.S. Cl.
CPC ....... *H04B 7/06952* (2023.05); *H04B 7/0404* (2013.01); *H04L 5/0053* (2013.01); *H04W 52/242* (2013.01)

(58) Field of Classification Search
CPC ............. H04B 7/06952; H04B 7/0404; H04B 7/06966; H04B 7/06968; H04B 7/0413;
(Continued)

(56) References Cited

U.S. PATENT DOCUMENTS 10,764,896 B2 * 9/2020 Guo ....................... H04W 16/14
10,863,494 B2 * 12/2020 Zhang .................... H04L 5/005
(Continued)

FOREIGN PATENT DOCUMENTS

AU    2019320610 A1 *  2/2021  ........... H04L 1/1819
AU    2019320610 B2 *  6/2024  ........... H04L 1/1819
(Continued)

OTHER PUBLICATIONS

3GPP TS 38.214 V17.0.0 (Dec. 2018) 3rd Generation Partnership Project; Technical Specification Group Radio Access Network; NR; Physical layer procedures for data (Release 15), Dec. 2018 (Year: 2018).*
(Continued)

*Primary Examiner* — Berhanu Tadese
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety
(Continued)

services. The present disclosure related generally to wireless communication system and, more specifically, the present disclosure relates to default beam behaviour of PUSCH.

15 Claims, 25 Drawing Sheets

(51) Int. Cl.
  *H04L 5/00* (2006.01)
  *H04W 52/24* (2009.01)
(58) Field of Classification Search
  CPC ... H04B 7/0697; H04L 5/0053; H04L 5/0048; H04W 52/242; H04W 52/146; H04W 72/0457; H04W 72/046; H04W 72/1268; H04W 72/21; H04W 72/23
  See application file for complete search history.

(56) References Cited

U.S. PATENT DOCUMENTS

| | | | | |
|---|---|---|---|---|
| 10,887,843 | B2* | 1/2021 | MolavianJazi | H04W 52/40 |
| 10,952,189 | B2* | 3/2021 | Choi | H04L 5/0055 |
| 10,952,231 | B2* | 3/2021 | Liou | H04W 76/27 |
| 10,972,244 | B2* | 4/2021 | Guo | H04W 72/542 |
| 11,050,478 | B2* | 6/2021 | Guo | H04L 27/2607 |
| 11,160,028 | B2* | 10/2021 | MolavianJazi | H04L 1/1858 |
| 11,290,968 | B2* | 3/2022 | MolavianJazi | H04L 1/1858 |
| 11,395,322 | B2* | 7/2022 | Papasakellariou | H04L 5/0005 |
| 11,405,911 | B2* | 8/2022 | Zhang | H04L 5/005 |
| 11,412,507 | B2* | 8/2022 | Choi | H04W 72/0446 |
| 11,477,810 | B2* | 10/2022 | Kang | H04W 72/044 |
| 11,503,542 | B2* | 11/2022 | Kim | H04L 5/0053 |
| 11,700,604 | B2* | 7/2023 | Wang | H04W 72/23 370/329 |
| 11,716,133 | B2* | 8/2023 | Jang | H04L 5/0053 375/267 |
| 11,737,081 | B2* | 8/2023 | Moon | H04L 5/0053 370/329 |
| 11,811,480 | B2* | 11/2023 | Yang | H04W 74/0833 |
| 11,849,454 | B2* | 12/2023 | Choi | H04L 5/10 |
| 11,902,201 | B2* | 2/2024 | Noh | H04L 27/2613 |
| 11,910,315 | B2* | 2/2024 | Kim | H04W 52/0225 |
| 12,047,922 | B2* | 7/2024 | Choi | H04W 72/21 |
| 12,114,348 | B2* | 10/2024 | Kim | H04L 5/0064 |
| 12,213,112 | B2* | 1/2025 | Choi | H04W 72/0446 |
| 12,256,238 | B2* | 3/2025 | Ji | H04B 7/0695 |
| 2019/0141693 | A1* | 5/2019 | Guo | H04W 72/23 |
| 2019/0349964 | A1* | 11/2019 | Liou | H04B 7/0626 |
| 2020/0205082 | A1* | 6/2020 | Chen | H04W 72/23 |
| 2020/0314664 | A1* | 10/2020 | Zhou | H04B 7/0617 |
| 2021/0282167 | A1* | 9/2021 | Wang | H04L 5/0044 |
| 2022/0095330 | A1* | 3/2022 | Kang | H04B 7/0408 |
| 2022/0095333 | A1* | 3/2022 | Takeda | H04W 72/23 |
| 2022/0124784 | A1* | 4/2022 | Kang | H04L 5/0025 |
| 2022/0132326 | A1* | 4/2022 | Wang | H04W 72/21 |
| 2022/0248433 | A1* | 8/2022 | Li | H04L 5/0092 |
| 2022/0312467 | A1* | 9/2022 | Matsumura | H04L 5/0023 |
| 2022/0353698 | A1* | 11/2022 | Jang | H04L 5/0053 |
| 2022/0369297 | A1* | 11/2022 | Takahashi | H04L 5/0092 |
| 2022/0386156 | A1* | 12/2022 | Park | H04W 24/10 |
| 2022/0417964 | A1* | 12/2022 | Matsumura | H04W 72/542 |
| 2023/0011465 | A1* | 1/2023 | Matsumura | H04W 72/23 |
| 2023/0024375 | A1* | 1/2023 | Yao | H04W 52/10 |
| 2023/0029850 | A1* | 2/2023 | Park | H04L 1/189 |
| 2023/0080431 | A1* | 3/2023 | Matsumura | H04L 5/0048 |
| 2023/0081776 | A1* | 3/2023 | Kim | H04L 5/0051 370/329 |
| 2023/0081792 | A1* | 3/2023 | Kim | H04L 1/0031 370/329 |
| 2023/0091578 | A1* | 3/2023 | Zhang | H04B 7/0456 370/329 |
| 2023/0119379 | A1* | 4/2023 | Kim | H04W 72/23 370/311 |
| 2024/0163793 | A1* | 5/2024 | Kim | H04W 52/0225 |
| 2024/0195483 | A1* | 6/2024 | Jang | H04W 52/242 |
| 2024/0380524 | A1* | 11/2024 | Marcone | H04W 74/0833 |

FOREIGN PATENT DOCUMENTS

| | | | | |
|---|---|---|---|---|
| CN | 110972171 | A * | 4/2020 | H04B 7/0408 |
| CN | 111316739 | A * | 6/2020 | H04B 7/00 |
| CN | 111901808 | A * | 11/2020 | H04B 7/0456 |
| CN | 113259073 | A * | 8/2021 | H04L 5/0053 |
| CN | 110972171 | B * | 5/2022 | H04B 7/0408 |
| CN | 113259073 | B * | 2/2023 | H04L 5/0053 |
| CN | 110475360 | B * | 5/2023 | H04B 7/0413 |
| CN | 111316739 | B * | 3/2024 | H04B 7/00 |
| CN | 111567081 | B * | 4/2024 | H04B 17/17 |
| CN | 113396616 | B * | 4/2024 | H04L 1/1858 |
| CN | 113906789 | B * | 4/2024 | H04L 1/1812 |
| CN | 113412650 | B * | 5/2024 | H04L 1/1858 |
| CN | 112514315 | B * | 8/2024 | H04B 17/373 |
| CN | 113519138 | B * | 8/2024 | H04B 7/2656 |
| CN | 118764144 | A * | 10/2024 | H04B 7/2656 |
| CN | 111901808 | B * | 1/2025 | H04B 7/0456 |
| EP | 3567967 | A1 * | 11/2019 | H04B 7/0413 |
| EP | 3684123 | A1 * | 7/2020 | H04L 1/0006 |
| EP | 3567967 | B1 * | 2/2021 | H04B 7/0413 |
| EP | 3829127 | A1 * | 6/2021 | H04J 13/0025 |
| EP | 3860190 | A1 * | 8/2021 | H04B 7/0408 |
| EP | 3911037 | A1 * | 11/2021 | H04W 52/146 |
| EP | 4016910 | A1 * | 6/2022 | H04W 72/23 |
| EP | 4072184 | A1 * | 10/2022 | H04L 27/26 |
| EP | 3669604 | B1 * | 12/2023 | H04B 7/00 |
| EP | 3829127 | B1 * | 3/2024 | H04J 13/0025 |
| EP | 3791642 | B1 * | 7/2024 | H04B 17/309 |
| EP | 4395425 | A2 * | 7/2024 | H04B 17/309 |
| EP | 4462927 | A1 * | 11/2024 | H04L 1/1614 |
| EP | 4492716 | A2 * | 1/2025 | H04L 1/0006 |
| GB | 2630032 | A * | 11/2024 | H04L 1/1614 |
| JP | 7398451 | B2 * | 12/2023 | H04W 16/28 |
| JP | 7407186 | B2 * | 12/2023 | H04L 5/0048 |
| JP | 7407187 | B2 * | 12/2023 | H04L 5/0048 |
| JP | 7447146 | B2 * | 3/2024 | H04L 27/26 |
| JP | 7463381 | B2 * | 4/2024 | H04L 5/001 |
| KR | 10-2021-0033370 | A | 3/2021 | |
| RU | 2795833 | C1 * | 5/2023 | H04L 5/001 |
| RU | 2795931 | C1 * | 5/2023 | H04W 52/242 |
| WO | WO-2019050381 | A1 * | 3/2019 | |
| WO | WO-2019093764 | A1 * | 5/2019 | |
| WO | WO-2019124983 | A1 * | 6/2019 | |
| WO | WO-2020017391 | A1 * | 1/2020 | |
| WO | WO-2020027594 | A1 * | 2/2020 | |
| WO | WO-2020032462 | A1 * | 2/2020 | |
| WO | WO-2020050653 | A1 * | 3/2020 | |
| WO | 2020/069075 | A1 | 4/2020 | |
| WO | WO-2020063212 | A1 * | 4/2020 | H04B 7/0408 |
| WO | WO-2020144780 | A1 * | 7/2020 | H04B 7/0695 |
| WO | 2020/162728 | A1 | 8/2020 | |
| WO | 2020/232155 | A1 | 11/2020 | |
| WO | WO-2020250401 | A1 * | 12/2020 | H04L 5/0048 |
| WO | WO-2020250402 | A1 * | 12/2020 | H04L 5/0048 |
| WO | WO-2020250403 | A1 * | 12/2020 | H04W 16/28 |
| WO | WO-2020250404 | A1 * | 12/2020 | H04W 24/08 |
| WO | WO-2021159447 | A1 * | 8/2021 | |

OTHER PUBLICATIONS

3GPP TSG RAN WG1 Meeting #AH-1901 Taipei, Taiwan Jan. 21-25, 2019 (Year: 2019).*
3GPP TS 38.214 V17.0.0 (Dec. 2021) 3rd Generation Partnership Project; Technical Specification Group Radio Access Network; NR; Physical layer procedures for data (Release 17), Dec. 2021 (Year: 2021).*
Samsung, Enhancements on HST-SFN, 3GPP TSG RAN WG1 #104b-e, R1-2103225, Apr. 12-20, 2021.
3GPP TS 38.213 V17.0.0 (Dec. 2021) 3rd Generation Partnership Project; Technical Specification Group Radio Access Network; NR; Physical layer procedures for control (Release 17), Dec. 2021.

(56) References Cited

OTHER PUBLICATIONS

3GPP TS 38.214 V17.0.0 (Dec. 2021) 3rd Generation Partnership Project; Technical Specification Group Radio Access Network; NR; Physical layer procedures for data (Release 17), Dec. 2021.
International Search Report and written opinion dated Jun. 10, 2022, issued in International Application No. PCT/KR2022/003603.
Oppo, Discussion on Multi-beam Operation Enhancements, R1-1910117, 3GPP TSG RAN WG1 #98bis, Chongqing, China, XP051808071, Oct. 14-20, 2019.
Apple Inc., On Multi-TRP Reliability Enhancement, R1-2101351, 3GPP TSG RAN WG1 Meeting #104-e, e-Meeting, XP051970739, Jan. 25-Feb. 5, 2021.
Extended European Search Report dated Jul. 18, 2024, issued in European Application No. 22771731.1-1206.
European Office Action dated Jun. 30, 2025, issued in European Application No. 22 771 731.1.

* cited by examiner

METHOD AND APPARATUS FOR DEFAULT BEAM BEHAVIOR OF PUSCH FOR FEMIMO

TECHNICAL FIELD

The present disclosure related generally to wireless communication system and, more specifically, the present disclosure relates to default beam behaviour of PUSCH for further enhanced multiple input multiple output (FeMIMO).

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

As a part of further enhancing the existing 5th generation (5G) new radio (NR), control channel transmissions are being redesigned for better reliability and performance. One such enhancement is multi transmit receive point (mTRP) based enhancement of physical downlink control channel (PDCCH). The enhancement focuses on improving the reliability of PDCCH by transmitting from different TRPs in different ways. This document considers two schemes used for mTRP PDCCH enhancement and propose different UE behaviours towards the default beam consideration of physical uplink shared channel (PUSCH), under different scenarios.

Solution to Problem

In accordance with an aspect of the disclosure, a terminal in a communication system is provided. The terminal includes a transceiver; and a controller configured to: receive, from a base station, downlink control information (DCI) format 0_0 scheduling a physical uplink shared channel (PUSCH), identify a spatial relation for the PUSCH; and transmit, to the base station, the PUSCH based on the spatial relation, wherein the spatial relation for the PUSCH corresponds to a dedicated physical uplink control channel (PUCCH) resource with the lowest identity (ID) within an active uplink (UL) bandwidth part (BWP), in response to at least one dedicated PUCCH resource being configured on the UL BWP, and wherein, in case that the dedicated PUCCH resource with the lowest ID within the UL BWP corresponds to more than one spatial relation, the spatial relation for the PUSCH corresponds to a spatial relation with the lowest ID among the more than one spatial relation.

In accordance with another aspect of the disclosure, a method performed by a terminal in a communication system is provided. The method includes receiving, from a base station, downlink control information (DCI) format 0_0 scheduling a physical uplink shared channel (PUSCH), identifying a spatial relation for the PUSCH; and transmitting, to the base station, the PUSCH based on the spatial relation, wherein the spatial relation for the PUSCH corresponds to a dedicated physical uplink control channel (PUCCH) resource with the lowest identity (ID) within an active uplink (UL) bandwidth part (BWP), in response to at least one dedicated PUCCH resource being configured on the UL BWP, and wherein, in case that the dedicated PUCCH resource with the lowest ID within the UL BWP corresponds to more than one spatial relation, the spatial relation for the PUSCH corresponds to a spatial relation with the lowest ID among the more than one spatial relation.

In accordance with another aspect of the disclosure, a base station in a communication system is provided. The base station includes a transceiver; and a controller configured to: transmit, to a terminal, downlink control information (DCI) format 0_0 scheduling a physical uplink shared channel (PUSCH), and receive the PUSCH from the terminal based on a spatial relation for the PUSCH, wherein the spatial relation for the PUSCH corresponds to a dedicated physical uplink control channel (PUCCH) resource with the lowest identity (ID) within an active uplink (UL) bandwidth part (BWP), in response to at least one dedicated PUCCH resource being configured on the UL BWP, and wherein, in case that the dedicated PUCCH resource with the lowest ID within the UL BWP corresponds to more than one spatial relation, the spatial relation for the PUSCH corresponds to a spatial relation with the lowest ID among the more than one spatial relation.

In accordance with another aspect of the disclosure, a method performed by a base station in a communication system is provided. The method includes transmitting, to the terminal, downlink control information (DCI) format 0_0 scheduling a physical uplink shared channel (PUSCH), and receiving the PUSCH from the terminal based on a spatial relation for the PUSCH, wherein the spatial relation for the PUSCH corresponds to a dedicated physical uplink control channel (PUCCH) resource with the lowest identity (ID) within an active uplink (UL) bandwidth part (BWP), in response to at least one dedicated PUCCH resource being configured on the UL BWP, and wherein, in case that the dedicated PUCCH resource with the lowest ID within the UL BWP corresponds to more than one spatial relation, the spatial relation for the PUSCH corresponds to a spatial relation with the lowest ID among the more than one spatial relation.

Advantageous Effects of Invention

The present disclosure provides method and system of default beam behaviour of PUSCH for FeMIMO.

BRIEF DESCRIPTION OF DRAWINGS

For a more complete understanding of the disclosure and its advantages, reference is now made to the following description taken in conjunction with the accompanying drawings, in which like reference numerals represent like parts.

MODE FOR THE INVENTION

Figure 1:
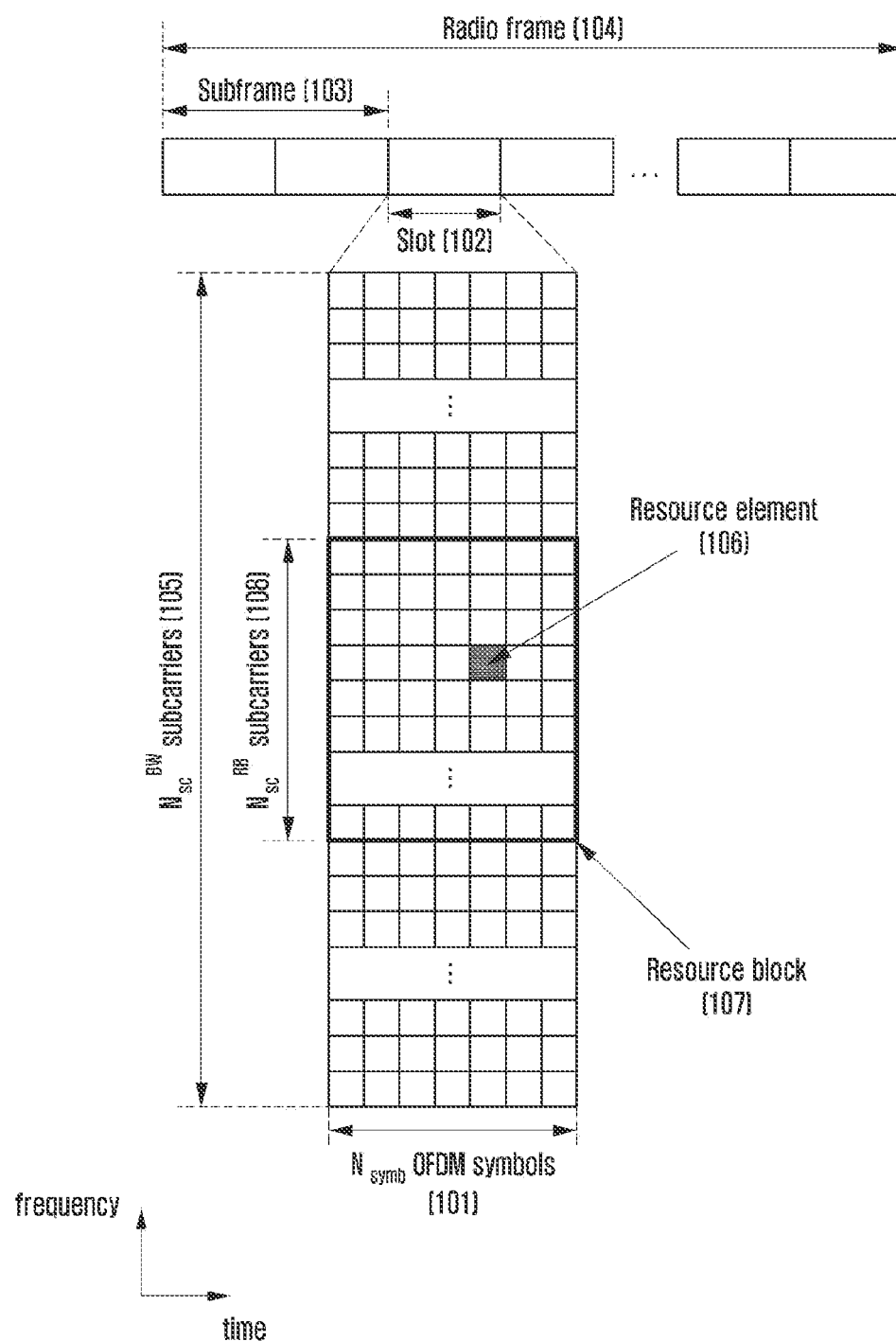
FIG. 1 illustrates an uplink/downlink time-frequency area transmission structure in an NR system according to an embodiment of disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. When it is determined that a detailed description of known functions or configurations related to the disclosure may obscure the gist of the disclosure, the detailed description thereof will be omitted. Further, the following terminologies are defined in consideration of the functions in the disclosure and may be construed in different ways by the intention or practice of users and operators. Therefore, the definitions thereof should be construed based on the contents throughout the specification.

Various advantages and features of the disclosure and methods accomplishing the same will become apparent from the following detailed description of embodiments with reference to the accompanying drawings. However, the disclosure is not limited to the embodiments disclosed herein but may be implemented in various forms. The embodiments have made disclosure complete and are provided so that those skilled in the art can easily understand the scope of the disclosure. Therefore, the disclosure will be defined by the scope of the appended claims. Like reference numerals throughout the description denote like elements.

Hereinafter, embodiments of the disclosure will be described in detail with reference to the accompanying drawings.

In describing the embodiments of the disclosure, a description of technical contents which are well known in the art to which the disclosure belongs and are not directly connected to the disclosure will be omitted. Unnecessary decryptions will be omitted in order to provide the gist of the disclosure more clearly without obscuring the same.

For the same reason, some components are exaggerated, omitted, or schematically illustrated in the accompanying drawings. Further, the size of each component does not exactly reflect the real size. In each drawing, the same or corresponding components are denoted by the same reference numerals.

Various advantages and features of the disclosure and methods accomplishing the same will become apparent from the following detailed description of embodiments with reference to the accompanying drawings. However, the disclosure is not limited to the embodiments disclosed herein but may be implemented in various forms. The embodiments have made the disclosure complete and are provided so that those skilled in the art can easily understand the scope of the disclosure. Therefore, the disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses generate a means for performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including an instruction means for performing the functions described in block(s) of the flow charts. Since the computer program instructions may also be mounted on the computer or the other programmable data processing apparatuses, the instructions for performing a series of operation steps on the computer or the other programmable data processing apparatuses to generate processes executed by the computer and to execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term "-unit" used in the embodiment means software or hardware components such as Field Programmable Gate Array (FPGA) and Application Specific Integrated Circuit (ASIC), and the "-unit" performs predetermined roles. However, the meaning of the "-unit" is not limited to software or hardware. The "-unit" may be configured to be in a storage medium that may be addressed and may also be configured to reproduce one or more processor. Accordingly, for example, the "-unit" includes components such as software components, object-oriented software components, class components, task components and processors, functions, attributes, procedures, subroutines, segments of program code, drivers, firmware, microcode, circuits, data, a database, data structures, tables, arrays, and variables. The functions provided in the components and the "-units" may be combined as a smaller number of components and the "-units" or may be further separated into additional components and "-units". In addition, the components and the "-units" may also be implemented to replicate one or more CPUs within a device or a security multimedia card. Further, in some embodiments, "-unit" may include one or more processors.

In the 5G system, a support for various services is considered compared to the existing 4G system. For example, the most representative services are an enhanced mobile broadband (eMBB) communication service, an ultra-reliable and low-latency communication (URLLC) service, a massive machine type communication (mMTC) service, an evolved multimedia broadcast/multicast service (eM-BMS), etc. Further, a system providing the URLLC service may be referred to as an URLLC system, a system providing the eMBB service may be referred to as an eMBB system, and the like. In addition, the terms "service" and "system" may be interchangeably used with each other.

As described above, in a communication system, a plurality of services may be provided to a user. In order to provide a plurality of such services to a user, there is a need for a method capable of providing each service suitable for characteristics within the same time interval and an apparatus using the same.

In a wireless communication system, for example, in an LTE system, an LTE-advanced (LTE-A) system or a 5G new radio (NR) system, a base station and a terminal may be configured such that the base station transmits downlink control information (DCI) to the terminal, the DCI including resource assignment information for transmission of a downlink signal to be transmitted via a physical downlink control channel (PDCCH), and thus the terminal receives at least one downlink signal of the DCI (for example, a channel-state information reference signal (CSI-RS)), a physical broadcast channel (PBCH), or a physical downlink shared channel (PDSCH). For example, the base station transmits, in a subframe n, DCI indicating, to the terminal, reception of the PDSCH in the subframe n via the PDCCH, and upon reception of the DCI, the terminal receives the PDSCH in the subframe according to the received DCI. In addition, in the LTE, LTE-A, or NR system, the base station and the terminal may be configured such that the base station transmits DCI including uplink resource assignment information to the terminal via the PDCCH, and thus the terminal transmits at least one uplink signal of uplink control information (UCI) (for example, a sounding reference signal (SRS), UCI, or a physical random access channel (PRACH)) or a physical uplink shared channel (PUSCH) to the base station. For example, the terminal having received, from the base station via the PDCCH, uplink transmission configuration information (or uplink DCI or UL grant) in a subframe n may perform uplink data channel transmission (hereinafter, referred to as "PUSCH transmission") according to a pre-defined time (for example, n+4), a time configured via a higher-layer signal (for example, n+k), or uplink signal transmission time indicator information included in the uplink transmission configuration information.

In a case where configured downlink transmission is transmitted from the base station to the terminal via an unlicensed band, or configured uplink transmission is transmitted from the terminal to the base station via the unlicensed band, a transmission device (the base station or the terminal) may perform a channel access procedure or listen-before talk (LBT) procedure on the unlicensed band where a signal transmission is configured before or immediately before a start of the configured signal transmission. According to a result of performing the channel access procedure, when it is determined that the unlicensed band is in an idle state, the transmission device may access the unlicensed band and then perform the configured signal transmission. According to the result of the channel access procedure performed by the transmission device, when it is determined that the unlicensed band is not in the idle state or that the unlicensed band is in an occupied state, the transmission device fails to access the unlicensed band and thus fails to perform the configured signal transmission. In general, in the channel access procedure via the unlicensed band where signal transmission is configured, the transmission device may determine the idle state of the unlicensed band by receiving a signal via the unlicensed band during a predetermined time or a time calculated according to a pre-defined rule (for example, a time calculated using a random value selected by the base station or the terminal), and comparing a strength of the received signal and a threshold value that is pre-defined or calculated by using a function of at least one parameter including a channel bandwidth, a bandwidth of a signal to be transmitted, the intensity of transmission power, or a beamwidth of a transmission signal. For example, when a strength of a signal received by the transmission device for 25 μs is less than −72 dBm, that is, a pre-defined threshold, the transmission device may determine that the unlicensed band is in the idle state and thus may perform the configured signal transmission. In this case, a maximum available time of the signal transmission may be limited according to a maximum channel occupancy time in the unlicensed band, which is defined according to each country or each region, or a type (for example, the base station, the terminal, a master device or a slave device) of the transmitting apparatus. For example, in Japan, the base station or the terminal in 5 GHz of the unlicensed band may perform the channel access procedure and then may transmit, during a maximum of 4 ms, a signal by occupying a channel without additionally performing the channel access procedure. When the strength of the signal received by for 25 μs is greater than −72 dBm, which is the predefined threshold, the base station may determine that the unlicensed band is not in the idle state and transmits no signal.

In the 5G communication system, in order to provide various services and support a high data transmission rate, various technologies such as a technology capable of performing re-transmission in units of code block groups and transmitting an uplink signal without UL scheduling information have been introduced. Accordingly, to perform 5G communication via the unlicensed band, a more efficient channel access procedure based on various parameters is required.

Wireless communication systems have expanded beyond the original role of providing a voice-oriented service and have evolved into wideband wireless communication systems that provide a high-speed and high-quality packet data service according to, for example, communication standards such as high-speed packet access (HSPA), long-term evolution (LTE or evolved universal terrestrial radio access (E-UTRA)), and LTE-Advanced (LTE-A) of 3GPP, high-rate packet data (HRPD) and a ultra-mobile broadband (UMB) of 3GPP2, and 802.16e of IEEE. In addition, 5G or NR communication standards are being established for a 5G wireless communication system.

In a wireless communication system including the 5G system, at least one of services including eMBB, mMTC, and URLLC may be provided to the terminal. The services may be provided to a same terminal during a same time interval. In an embodiment, the eMBB may be a service aiming at high-speed transmission of large-capacity data, the mMTC may be a service aiming at minimizing terminal power and connecting multiple terminals, and the URLLC may be a service aiming at high reliability and low latency, but the disclosure is not limited thereto. The above three services may be major scenarios in a system such as an LTE system or a 5G or new-radio/next-radio (NR) system beyond LTE.

In a case where a base station has scheduled data corresponding to an eMBB service for a terminal in a particular transmission time interval (TTI), when the situation in which URLLC data is to be transmitted in the TTI occurs, the base station does not transmit some of eMBB data in a frequency band in which the eMBB data has already been scheduled and transmitted, but may transmit the generated URLLC data in the frequency band. A terminal for which the eMBB has been scheduled and a terminal for which URLLC has been scheduled may be the same terminal or different terminals. In such a case, the possibility that the eMBB data may be damaged increases because there is a portion in which some of the already scheduled and transmitted eMBB data are not transmitted. Accordingly, in the above case, there is a need for a method of processing a signal received by the terminal for which eMBB has been scheduled or the terminal for which URLLC has been scheduled and a method of receiving a signal.

Hereinafter, the disclosure is described in detail with reference to the accompanying drawings. When it is determined that a detailed description for the function or configuration related to the disclosure may obscure the gist of the disclosure, the detailed description therefor will be omitted. Further, in the description of the disclosure, the following terminologies are defined in consideration of the functions in the disclosure and may be construed in different ways by the intention or practice of users and operators. Therefore, the definitions thereof should be construed based on the contents throughout the specification. Hereinafter, a base station is an entity that assigns resources of a terminal, and may be at least one of an eNode B, a Node B, a BS, a wireless access unit, a BS controller, or a node on a network. A terminal may include a user equipment (UE), a mobile station (MS), a cellular phone, a smartphone, a computer, or a multimedia system capable of performing a communication function. In the disclosure, a downlink (DL) means a radio transmission path of a signal transmitted from a base station to a terminal, and an uplink (UL) means a radio transmission path of a signal transmitted from a terminal to a base station. Furthermore, hereinafter, the LTE or LTE-A system is described as an example in the disclosure, but is not limited thereto, and embodiments of the disclosure may be applied to other communication systems having a similar technical background or channel type, and a $5^{th}$-generation mobile communication technology (5G or new-radio (NR)) developed beyond LTE-A can be included therein, for example. Furthermore, an embodiment of the disclosure may be applied to other communication systems through some modifications without greatly departing from the range of the disclosure based on a determination of those having skilled technical knowledge.

As a representative example of the broadband wireless communication systems, in an NR system, an orthogonal frequency-division multiplexing (OFDM) scheme has been adopted for a downlink (DL), and both the OFDM scheme and a single carrier frequency division multiple access (SC-FDMA) scheme have been adopted for an uplink (UL). The uplink indicates a radio link through which data or a control signal is transmitted from a terminal (a user equipment (UE) or a mobile station (MS)) to a base station (an eNode B or a BS), and the downlink indicates a radio link through which data or a control signal is transmitted from a base station to a terminal. In the above-mentioned multiple-access scheme, normally, data or control information is distinguished according to a user by assigning or managing time-frequency resources for carrying data or control information of each user, wherein the time-frequency resources do not overlap, that is, orthogonality is established.

In a 5G system, flexibly defining and operating a frame structure may be required in consideration of various services and requirements. For example, services may have different subcarrier spacings according to the requirements. In a current 5G communication system, a scheme of supporting a plurality of subcarrier spacings may be determined by using [Equation 1] below.

$$\Delta f = f_0 2^m \qquad [\text{Equation 1}]$$

Here, $f_0$ indicates a default subcarrier spacing in a system, and m indicates a scaling factor that is an integer. For example, when $f_0$ is 15 kHz, a set of subcarrier spacings that the 5G communication system can have may include 3.75 kHz, 7.5 kHz, 15 kHz, 30 kHz, 60 kHz, 120 kHz, 240 kHz, 480 kHz, or the like. An available set of subcarrier spacings may vary according to a frequency band. For example, in a frequency band equal to or less than 6 GHz, 3.75 kHz, 7.5 kHz, 15 kHz, 30 kHz, and 60 kHz may be used, and in a frequency band equal to or greater than 6 GHz, 60 kHz, 120 kHz, and 240 kHz may be used.

The length of an OFDM symbol may vary depending on the subcarrier spacing constituting the OFDM symbol. This is because the subcarrier spacing and the OFDM symbol length are inversely proportional to each other, which is a characteristic feature of OFDM symbols. For example, when the subcarrier spacing doubles, the symbol length becomes half, and when the subcarrier spacing becomes half, the symbol length doubles.

The NR system adopts a hybrid automatic repeat request (HARQ) scheme such that, when decoding fails during the initial transmission, the corresponding data is retransmitted in the physical layer. According to the HARQ scheme, when a receiver fails to accurately decode data, the receiver transmits information indicating the decoding failure (negative acknowledgement (NACK)) to a transmitter such that the transmitter can retransmit the corresponding data in the physical layer. The receiver combines data retransmitted by the transmitter with data, which has previously failed to be decoded, thereby increasing the data receiving performance. In addition, when the receiver accurately decodes data, the receiver transmits information indicating the successful decoding (acknowledgement (ACK)) to the transmitter such that the transmitter can transmit new data.

FIG. 1 illustrates a basic structure of a time-frequency domain, which is a radio resource area in which a data or control channel is transmitted in up/downlink in an NR system or a system similar thereto according to an embodiment of the disclosure.

Referring to FIG. 1, a horizontal axis indicates a time domain, and a vertical axis indicates a frequency domain. A minimum transmission unit in the time domain is an OFDM symbol or DFT-s-OFDM symbol, and $N_{symb}$ OFDM symbols 101 gather to configure one slot 102. Here, the OFDM symbol represents a symbol used to transmit or receive a signal by using an OFDM multiplexing scheme, and the DFT-s-OFDM symbol represents a symbol used to transmit or receive a signal by using a DFTs-OFDM multiplexing scheme or an SC-FDMA multiplexing scheme. Hereinafter, for convenience of description, the OFDM symbol and the DFT-s-OFDM symbol are not distinguished from each other and thus are collectively referred to as an OFDM symbol, and will now be described with reference to reception or transmission of a downlink signal, but may also be applied to reception or transmission of an uplink signal.

When spacing between subcarriers is 15 kHz, one slot constitutes one subframe 103, and lengths of the slot and the subframe may each be 1 ms. The number of the slots constituting one subframe 103, and a length of the slot may vary according to spacing between subcarriers. For example, when spacing between subcarriers is 30 kHz, four slots gather to constitute one subframe 103. In this case, a length of the slot is 0.5 ms, and a length of the subframe is 1 ms. A radio frame 104 may be a time domain period composed of 10 subframes. A minimum transmission unit in the frequency domain is a subcarrier, and a transmission bandwidth of a whole system is composed of $N_{BW}$ subcarriers 105. However, these specific numerical values may be variably applied. For example, in the LTE system, spacing between subcarriers is 15 kHz, two slots gather to constitute one subframe 103, and in this case, a length of the slot is 0.5 ms and a length of the subframe is 1 ms.

A basic unit of a resource in the time-frequency domain is a resource element (RE) 106 and may be expressed as a symbol index and a subcarrier index. A resource block (RB or a physical resource block (PRB)) 107 may be defined as $N_{symb}$ consecutive OFDM symbols 101 in the time domain and $N_{SC}^{RB}$ consecutive subcarriers 108 in the frequency domain. Therefore, one RB 107 in one slot may include $N_{symb} \times N_{SC}^{RB}$ number of REs. In general, a minimum data assignment unit in the frequency domain is the RB 107. In the NR system, $N_{symb}=14$ and $N_{SC}^{RB}=12$, and the number of RBs ($N_{RB}$) may change according to a bandwidth of a system transmission band. In the LTE system, generally, $N_{symb}=7$ and $N_{SC}^{RB}=12$, and $N_{RB}$ may change according to a bandwidth of a system transmission band.

Downlink control information may be transmitted within first N OFDM symbols in the subframe. Generally, N={1, 2, 3}, and the number of symbols in which the downlink control information is transmittable via a higher-layer signal may be configured for the terminal by the base station. In addition, according to the amount of control information to be transmitted in a current slot, the base station may change, for each slot, the number of symbols in which downlink control information is transmittable in a slot, and may transfer information on the number of symbols to the terminal via a separate downlink control channel.

In the NR system, one component carrier (CC) or serving cell may include up to 250 RBs. Therefore, when a terminal always receives the entire serving cell bandwidth as in the LTE system, the power consumption of the terminal may be extreme. To solve this problem, a base station may configure one or more bandwidth parts (BWP) for the terminal, thus supporting the terminal in changing a reception area in the cell. In the NR system, the base station may configure an "initial BWP", which is the bandwidth of CORESET #0 (or a common search space (CSS)), for the terminal through a master information block (MIB). Subsequently, the base station may configure the initial BWP (the first BWP) for the terminal through radio resource control (RRC) signaling, and may report at least one piece of BWP configuration information that may be indicated through downlink control information (DCI) later. The base station may report a BWP ID through DCI, thereby indicating a band to be used by the terminal. When the terminal fails to receive the DCI in the currently allocated BWP for a specified time or longer, the terminal returns to a "default BWP" and attempts to receive the DCI.

Figure 2:
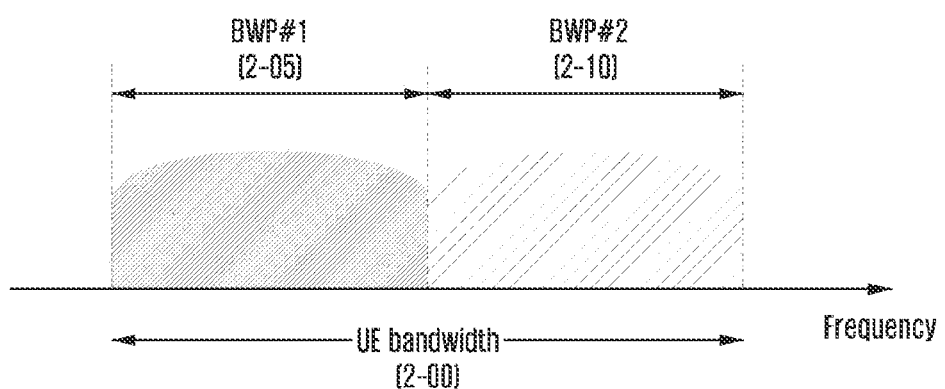
FIG. 2 illustrates an example of the configuration of a bandwidth part (BWP) in a wireless communication system according to an embodiment of the disclosure.

FIG. 2 illustrates an example of the configuration of a bandwidth part (BWP) in a wireless communication system according to an embodiment of the disclosure.

Referring to FIG. 2, FIG. 2 shows an example in which a terminal bandwidth 2-00 is configured with two bandwidth parts, that is, BWP #1 2-05 and BWP #2 2-10. A base station may configure one bandwidth part or a plurality of bandwidth parts for the terminal, and may configure, for each bandwidth part, information as shown in [Table 1].

TABLE 1

```
BWP ::=                          SEQUENCE {
    bwp-Id                       BWP-Id,
    (bandwidth part identifier)
    locationAndBandwidth         INTEGER (1..65536),
    (the location of the bandwidth part)
    subcarrierSpacing            ENUMERATED {n0, n1, n2, n3, n4, n5},
    (subcarrier spacing)
    cyclicPrefix                 ENUMERATED { extended }
    (cyclic prefix)
}
```

The disclosure is not limited to the above-described example, and not only the configuration information but also various parameters related to the bandwidth part may be configured for the terminal. The information may be transferred from the base station to the terminal through higher-layer signaling, for example, radio resource control (RRC) signaling. Among one or multiple configured bandwidth parts, at least one bandwidth part may be activated. Information indicating whether to activate the configured bandwidth part may be semi-statically transferred from the base station to the terminal through RRC signaling, or may be dynamically transferred through a MAC control element (CE) or DCI.

According to an embodiment, the terminal before the RRC connection may receive the configuration of an initial bandwidth part (initial BWP) for initial access from the base station through a master information block (MIB). More specifically, the terminal may receive configuration information relating to a control resource set (CORESET) and a search space in which a PDCCH can be transmitted in order to receive system information (remaining system information (RMSI) or system information block 1 (SIB1)) required for initial access through the MIB in an initial access step. Each of the control resource set and the search space configured through the MIB may be considered as identity (ID) 0.

The base station may inform the terminal of configuration information such as frequency allocation information, time allocation information, and numerology for control resource set #0 through the MIB. Further, the base station may inform the terminal of configuration information relating to a monitoring period and occasion of control resource set #0, that is, configuration information relating to search space #0, through the MIB. The terminal may consider a frequency region configured as control resource set #0 acquired from the MIB as an initial bandwidth part for initial access. In this case, the ID of the initial bandwidth part may be considered as 0.

In relation to a method for configuring the bandwidth part, terminals before RRC-connected may receive configuration information of an initial bandwidth part through a master information block (MIB). More specifically, a control resource set (CORESET) for a downlink control channel through which downlink control information (DCI) for scheduling a system information block (SIB) can be transmitted may be configured for the terminal through an MIB of a physical broadcast channel (PBCH). The bandwidth of the control resource set configured by the MIB may be considered as an initial bandwidth part, and the terminal may receive a PDSCH through which the SIB is transmitted, through the configured initial bandwidth part. An initial bandwidth part may be used for other system information (OSI), paging, and random access in addition to the reception of the SIB.

In the following description, a synchronization signal (SS)/PBCH block in a next-generation mobile communication system (a 5G system or NR system) will be described.

An SS/PBCH block means a physical layer channel block including a primary SS (PSS), a secondary SS (SSS), and a PBCH. More specifically, the SS/PBCH block is defined below.

PSS: This indicates a signal serving as a reference for downlink time/frequency synchronization and provides a part of information of a cell ID.

SSS: This is a reference for downlink time/frequency synchronization and provides the remaining cell ID information which a PSS does not provide. Additionally, the SSS may serve as a reference signal for demodulating a PBCH.

PBCH: This provides necessary system information required for transmitting or receiving a data channel and a control channel by a terminal. The necessary system information may include search space-related control information indicating wireless resource mapping information of a control channel, and scheduling control information of a separate data channel for transmitting system information.

SS/PBCH block: An SS/PBCH block includes a combination of a PSS, an SSS, and a PBCH. One SS/PBCH block or a plurality of SS/PBCH blocks may be transmitted within 5 ms, and each of transmitted SS/PBCH blocks may be distinguished from each other by an index.

The terminal may detect the PSS and the SSS and decode the PBCH in the initial access stage. An MIB may be obtained from the PBCH and control resource set #0 may be configured from the MIB. The terminal may monitor control resource set #0 under the assumption that a selected SS/PBCH block and a demodulation reference signal (DMRS) transmitted on control resource set #0 are in a quasi-co-location (QCL). The terminal may receive system information from downlink control information transmitted on control resource set #0. The terminal may obtain, from the received system information, configuration information related to a random access channel (RACH) required for initial access. The terminal may transmit a physical RACH (PRACH) to the base station in consideration of a selected SS/PBCH index, and the base station having received the PRACH may obtain information on the SS/PBCH block index selected by the terminal. The base station may monitor a block which the terminal selects from among SS/PBCH blocks, and control resource set #0 corresponding to (or associated with) the selected SS/PBCH block.

In the following description, downlink control information (hereinafter, referred to as "DCI") in a next-generation mobile communication system (a 5G system or an NR system) will be described in detail.

In the next-generation mobile communication system (the 5G system or the NR system), scheduling information on uplink data (or a physical uplink data channel (a physical uplink shared channel (PUSCH))) or downlink data (or a physical downlink data channel (a physical downlink shared channel, (PDSCH))) can be transferred through DCI from a base station to a terminal. The terminal may monitor a fallback DCI format and a non-fallback DCI format for a PUSCH or a PDSCH. The fallback DCI format may include a fixed field pre-defined between the base station and the terminal, and the non-fallback DCI format may include a configurable field.

The DCI may be subjected to a channel coding and modulation procedure, and then transmitted through a physical downlink control channel (PDCCH). A cyclic redundancy check (CRC) may be attached to a DCI message payload, and the CRC may be scrambled by a radio network temporary identifier (RNTI) corresponding to the identity of the terminal. Different types of RNTIs can be used for scrambling the CRC, which is attached to the DCI message payload, according to the purpose of a DCI message, for example, UE-specific data transmission, a power control command, a random access response, or the like. That is, an RNTI is not explicitly transmitted, and may be included in a CRC calculation procedure so as to be transmitted. When a DCI message transmitted on a PDCCH is received, the terminal may identify a CRC by using an allocated RNTI. When a CRC identification result indicates matching of the RNTI, the terminal may identify that the message has been transmitted to the terminal.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying a slot format indicator (SFI) may be scrambled by an SFI-RNTI. DCI for notifying a transmission power control (TPC) may be scrambled by a TPC-RNTI. DCI for scheduling a UE-specific PDSCH or PUSCH may be scrambled by a cell RNTI (C-RNTI).

DCI format 0_0 may be used for fallback DCI for scheduling a PUSCH, and in this case, a CRC may be scrambled by a C-RNTI. In an embodiment, DCI format 0_0 having a CRC scrambled by a C-RNTI may include the following information as shown in [Table 2].

TABLE 2

- Identifier for DCI formats (DCI format identifier) - [1] bit
- Frequency domain resource assignment - [[$\log_2(N_{RB}^{UL,\,BWP}(N_{RB}^{UL,\,BWP} + 1)/2)$] ] bits
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- TPC command for scheduled PUSCH - [2] bits
- Uplink/supplementary uplink (UL/SUL) indicator - 0 or 1 bit DCI format 0_1 may be used for non-fallback DCI for scheduling a PUSCH, and in this case, a CRC may be scrambled by a C-RNTI. In an embodiment, DCI format 0_1 having a CRC scrambled by a C-RNTI may include the following information as shown in [Table 3].

TABLE 3

- Carrier indicator - 0 or 3 bits
- UL/SUL indicator - 0 or 1 bit
- Identifier for DCI formats - [1] bits
- Bandwidth part indicator - 0, 1, or 2 bits
- Frequency domain resource assignment
  • For resource allocation type 0, [$N_{RB}^{UL,BWP}/P$]bits TABLE 3-continued

- For resource allocation type 1, $\lceil \log_2(N_{RB}^{UL,BWP}(N_{RB}^{UL,BWP} + 1)/2) \rceil$ bits
- Time domain resource assignment - 1, 2, 3, or 4 bits
- VRB-to-PRB mapping (mapping between virtual resource block and physical resource block) - 0 or 1 bit, only for resource allocation type 1.
    - 0 bit if only resource allocation type 0 is configured;
    - 1 bit otherwise.
- Frequency hopping flag - 0 or 1 bit, only for resource allocation type 1.
    - 0 bit if only resource allocation type 0 is configured;
    - 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
    - 1 bit for semi-static HARQ-ACK codebook;
    - 2 bits for dynamic HARQ-ACK codebook with single HARQ-ACK codebook.
- 2nd downlink assignment index - 0 or 2 bits
    - 2 bits for dynamic HARQ-ACK codebook with two HARQ-ACK sub-codebooks;
    - 0 bit otherwise.
- TPC command for scheduled PUSCH - 2 bits SRS resource indicator $- \left\lceil \log_2\left(\sum_{k=1}^{L_{max}} \binom{N_{SRS}}{k}\right) \right\rceil$ or $\lceil \log_2(N_{SRS}) \rceil$ bits

- $\left\lceil \log_2\left(\sum_{k=1}^{L_{max}} \binom{N_{SRS}}{k}\right) \right\rceil$ bits for non-codebook based PUSCH transmission (if PUSCH transmission is not based on codebook);
  - $\lceil \log_2(N_{SRS}) \rceil$ bits for codebook based PUSCH transmission(if PUSCH transmission is based on codebook).
- Precoding information and number of layers - up to 6 bits
- Antenna ports - up to 5 bits
- SRS request - 2 bits
- CSI request (wherein CSI indicates channel state information) - 0, 1, 2, 3, 4, 5, or 6 bits
- Code block group (CBG) transmission information - 0, 2, 4, 6, or 8 bits
- Phase tracking reference signal (PTRS)-Demodulation reference signal (DMRS) association - 0 or 2 bits.
- beta_offset indicator - 0 or 2 bits
- DMRS sequence initialization - 0 or 1 bit DCI format 1_0 may be used for fallback DCI for scheduling a PDSCH, and in this case, a CRC may be scrambled by a C-RNTI. In an embodiment, DCI format 1_0 having a CRC scrambled by a C-RNTI may include the following information as shown in [Table 4].

TABLE 4

- Identifier for DCI formats - [1] bit
- Frequency domain resource assignment -$[\lceil \log_2(N_{RB}^{DL, BWP}(N_{RB}^{DL, BWP} + 1)/2) \rceil]$ bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- Physical uplink control channel (PUCCH) resource indicator - 3 bits
- PDSCH-to-HARQ feedback timing indicator - [3] bits Alternatively, DCI format 1_0 may be used for DCI for scheduling a PDSCH relating to an RAR message, and in this case, a CRC may be scrambled by an RA-RNTI. In an embodiment, DCI format 1_0 having a CRC scrambled by an RA-RNTI may include the following information as shown in [Table 5].

TABLE 5

- Frequency domain resource assignment -$[\lceil \log_2(N_{RB}^{DL, BWP}(N_{RB}^{DL, BWP} + 1)/2) \rceil]$ bits
- Time domain resource assignment - 4 bits
- VRB-to-PRB mapping - 1 bit
- Modulation and coding scheme - 5 bits
- TB scaling - 2 bits
- Reserved bits - 16 bits DCI format 1_1 may be used for non-fallback DCI for scheduling a PDSCH, and in this case, a CRC may be scrambled by a C-RNTI. In an embodiment, DCI format 1_1 having a CRC scrambled by a C-RNTI may include information as shown in [Table 6].

TABLE 6

- Carrier indicator - 0 or 3 bits
- Identifier for DCI formats - [1] bits
- Bandwidth part indicator - 0, 1, or 2 bits
- Frequency domain resource assignment
    - For resource allocation type 0, $\lceil N_{RB}^{DL, BWP}/P \rceil$ bits
    - For resource allocation type 1, $\lceil \log_2(N_{RB}^{DL, BWP}(N_{RB}^{DL, BWP} + 1)/2) \rceil$ bits
- Time domain resource assignment -1, 2, 3, or 4 bits TABLE 6-continued

- VRB-to-PRB mapping - 0 or 1 bit, only for resource allocation type 1.
  - 0 bit if only resource allocation type 0 is configured;
  - 1 bit otherwise.
- Physical resource block (PRB) bundling size indicator - 0 or 1 bit
- Rate matching indicator - 0, 1, or 2 bits
- Zero power channel state information-reference signal (ZP CSI-RS) trigger - 0, 1, or 2 bits For transport block 1:
  - Modulation and coding scheme - 5 bits
  - New data indicator - 1 bit
  - Redundancy version - 2 bits For transport block 2:
  - Modulation and coding scheme - 5 bits
  - New data indicator - 1 bit
  - Redundancy version - 2 bits

Figure 3:
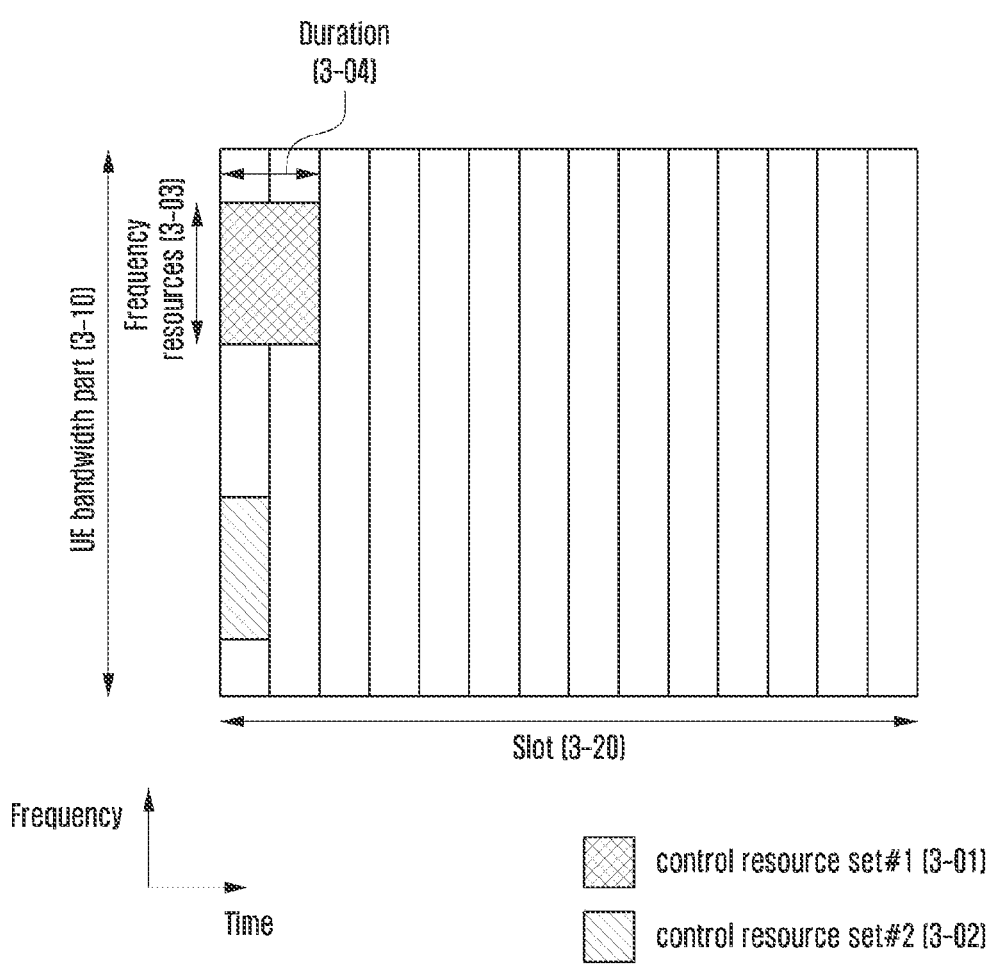
FIG. 3 illustrates an example of the configuration of a control resource set of a downlink control channel in a wireless communication system according to an embodiment of the disclosure.

- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5, or 6 bits
- Transmission configuration indication - 0 or 3 bits
- SRS request - 2 bits
- Code block group (CBG) transmission information - 0, 2, 4, 6, or 8 bits
- CBG flushing out information - 0 or 1 bit
- DMRS sequence initialization - 1 bit FIG. 3 illustrates an embodiment of a control resource set (CORESET), on which a downlink control channel is transmitted, in a 5G wireless communication system according to an embodiment of the disclosure.

Referring to FIG. 3, FIG. 3 shows an embodiment in which a terminal (UE) bandwidth part 3-10 is configured along a frequency axis, and two control resource sets (control resource set #1 3-01 and control resource set #2 3-02) are configured in one slot 3-20 along a time axis. The control resource sets 3-01 and 3-02 may be configured in a particular frequency resource 3-03 in the terminal bandwidth part 3-10 along the frequency axis. In the control resource sets 3-01 and 3-02, one OFDM symbol or multiple OFDM symbols may be configured along the time axis, and the configured OFDM symbol or symbols may be defined as a control resource set duration 3-04. Referring to FIG. 3, control resource set #1 3-01 may be configured to have a control resource set duration of two symbols, and control resource set #2 3-02 may be configured to have a control resource set duration of one symbol.

A control resource set in the above-described next-generation mobile communication system (the 5G system or the NR system) may be configured for a terminal by a base station via higher-layer signaling (for example, system information, master information block (MIB), and radio resource control (RRC) signaling). Configuring a control resource set for a terminal means providing information such as a control resource set identifier (identity), the frequency location of the control resource set, the symbol length of the control resource set, etc. For example, the configuration of the control resource set may include the following information as shown in [Table 7].

TABLE 7

```
ControlResourceSet ::=          SEQUENCE {
    -- Corresponds to L1 parameter 'CORESET-ID'
    controlResourceSetId        ControlResourceSetId,
(control resource set identifier(Identity))
    frequencyDomainResources    BIT STRING (SIZE (45)),
(frequency-axis resource assignment information)
    duration                    INTEGER (1..maxCoReSetDuration),
(time-axis resource assignment information)
    cce-REG-MappingType         CHOICE {
(CCE-to-REG mapping scheme)
        interleaved             SEQUENCE {
            reg-BundleSize      ENUMERATED {n2, n3, n6},
        (REG bundle size)
            precoderGranularity ENUMERATED {sameAsREG-bundle,
        allContiguousRBs},
            interleaverSize     ENUMERATED {n2, n3, n6}
            (interleaver size)
            shiftIndex          INTEGER(0..maxNrofPhysicalResourceBlocks-1)
            (interleaver shift)
        },
        nonInterleaved          NULL
    },
    tci-StatesPDCCH             SEQUENCE(SIZE (1..maxNrofTCI-StatesPDCCH))
        OF TCI-StateId          OPTIONAL,
    (QCL configuration information)
    tci-PresentInDCI            ENUMERATED {enabled}
}
```

The tci-StatesPDCCH (hereinafter, referred to as a "ICI state") configuration information shown in [Table 7] may include information on the index or indices of one synchronization signal (SS)/physical broadcast channel (PBCH) block or multiple SS/PBCH blocks which are in a quasi-co-located (QCL) relationship with a demodulation reference signal (DMRS) transmitted on a corresponding control resource set, or information on the index of a channel state information reference signal (CSI-RS). The frequencyDomainResources configuration information configures a frequency resource of the corresponding CORESET as a bitmap, wherein each bit indicates a group of non-overlapping six PRBs. The first group means a group of six PRBs having the first PRB index of $6 \cdot \lceil N_{BWP}^{start}/6 \rceil$, wherein $N_{BWP}^{start}$ indicates a start point of a BWP. The most significant bit of the bitmap indicates the first group and the bits are configured in an ascending order.

In the wireless communication system, different antenna ports (which can be replaced with one or more channels, signals, or a combination thereof, but is collectively referred to as "different antenna ports" for convenience of further description in the disclosure) may be associated with each other according to QCL configuration as shown in [Table 8] below.

TABLE 8

```
QCL-Info ::=            SEQUENCE
    cell                ServCellIndex (an index of a serving
cell in which QCL reference RS is transmitted)
    bwp-ID              BWP-Id (an index of a bandwidth part
in which QCL reference RS is transmitted)
    referenceSignal     CHOICE { (an indicator indicating one of CSI-
RS and SS/PBCH as a QCL reference RS)
        csi-rs              NZP-CSI-RS-ResourceId,
        ssb                 SSB-Index
    },
    qcl-Type            ENUMERATED {typeA, typeB,
typeC, type D}, (QCL type indicator)
    ...
}
```

Specifically, in QCL configuration, two different antenna ports can be associated with each other based on relationships between a (QCL) target antenna port and a (QCL) reference antenna port. The terminal may apply (or assume) all or some of channel statistical characteristics measured by the reference antenna port (for example, a large-scale parameter of a channel, such as a Doppler shift, a Doppler spread, an average delay, a delay spread, an average gain, a spatial Rx (or Tx) parameter, a reception space filter parameter of the terminal, or a transmission space filter parameter of the terminal) at the time of target antenna port reception. In the description above, the target antenna means an antenna port for transmitting a channel or a signal configured by higher-layer configuration including the QCL configuration, or an antenna port for transmitting a channel or a signal for transmitting a channel or a signal to which a TCI state indicating the QCL configuration is applied. The reference antenna port means an antenna port for transmitting a channel or a signal indicated (or specified) by a referenceSignal parameter in the QCL configuration.

Specially, channel statistical characteristics specified by the QCL configuration (or indicated by the parameter qcl-Type in the QCL configuration) may be classified as below according to a QCL type.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In this case, the QCL type is not limited to the four types above, but all possible combinations are not enumerated in order not to obscure the gist of the description. QCL-TypeA corresponds to a QCL type used in a case where the bandwidth and the transport interval of the target antenna port are more sufficient than those of the reference antenna port (that is, in a case where the number of samples and the transmission bandwidth/time of the target antenna port are greater than the number of samples and the transmission bandwidth/time of the reference antenna port in both the frequency axis and the time axis), and thus all statistical characteristics measurable in the frequency axis and the time axis can be referred to. QCL-TypeB corresponds to a QCL type used in a case where the bandwidth of the target antenna port is sufficient to measure statistical characteristics, that is, the Doppler shift and Doppler spread parameters, measurable in the frequency. QCL-TypeC corresponds to a QCL type used in a case where the bandwidth and the transport interval of the target antenna port are insufficient to measure second-order statistics, that is, the Doppler spread and delay spread parameters, and thus only first-order statistics, that is, only the Doppler shift and average delay parameters, can be referred to. QCL-TypeD corresponds to a QCL type configured when spatial reception filter values used at the time of reference antenna port reception can be used at the time of target antenna port reception.

The base station may configure or indicate the maximum two QCL configurations for or to the target antenna port through TCI state configuration as shown in [Table 9a] below.

TABLE 9a

```
TCI-State ::=       SEQUENCE {
    tci-StateId         TCI-StateId, (TCI state indicator)
    qcl-Type1           QCL-Info, (the first QCL configuration
for the target antenna port to which the corresponding TCI state is
applied)
    qcl-Type2           QCL-Info (the second QCL configuration
for the target antenna port to which the corresponding TCI state is
applied)
                        OPTIONAL,  --Need R
    ...
}
```

The first QCL configuration among two QCL configurations included in one TCI state configuration may be configured to be one of QCL-TypeA, QCL-TypeB, and QCL-TypeC. In this case, the configurable QCL type is specified by the types of the target antenna port and the reference antenna port and will be described in detail below. In addition, the second QCL configuration among two QCL configurations included in the TCI state configuration may be configured to be QCL-TypeD and can be omitted in some cases.

Tables 9ba to 9be show valid TCI state configurations according to the type of the target antenna port.

Table 9ba shows valid TCI state configurations in a case where the target antenna port is a CSI-RS for tracking (TRS). The TRS means an NZP CSI-RS, for which no repetition parameter is configured and trs-Info is configured to have a value of "true", among CSI-RSs. In Table 9ba, when configuration 3 is configured, the target antenna port can be used for an aperiodic TRS.

TABLE 9ba

Valid TCI state configurations when target antenna port is CSI-RS for tracking (TRS)

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 9bb shows valid TCI state configurations in a case where the target antenna port is a CSI-RS for CSI. The CSI-RS means an NZP CSI-RS, for which neither repetition parameter is configured nor trs-Info is configured to have a value of "true", among CSI-RSs.

TABLE 9bb

Valid TCI state configurations when target antenna port is CSI-RS for CSI

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 9bc shows valid TCI state configurations in a case where the target antenna port is a CSI-RS for beam management (BM) (that is identical to a CSI-RS for L1 RSRP reporting). The CSI-RS of BM means an NZP CSI-RS for which a repetition parameter is configured and has a value of "on" or "off" and no trs-info is configured to have a value of "true", among CSI-RSs.

TABLE 9bc

Valid TCI state configurations when target antenna port is CSI-RS for BM (for L1 RSRP reporting)

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 9bd shows valid TCI state configurations when the target antenna port is a PDCCH DMRS.

TABLE 9bd

Valid TCI state configurations when target antenna port is PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 9be shows valid TCI state configurations when the target antenna port is a PDSCH DMRS.

TABLE 9be

Valid TCI state configurations when target antenna port is PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the representative QCL configuration scheme according to Tables 9ba to 9be, the target antenna port and the reference antenna port at each stage are configured and managed such as "SSB"→"TRS"→"CSI-RS for CSI, CSI-RS for BM, PDCCH DMRS, or PDSCH DMRS". Accordingly, the statistical characteristics measurable from the SSB and the TRS are associated with the antenna ports, and thus a reception operation by the terminal can be assisted.

Figure 4:
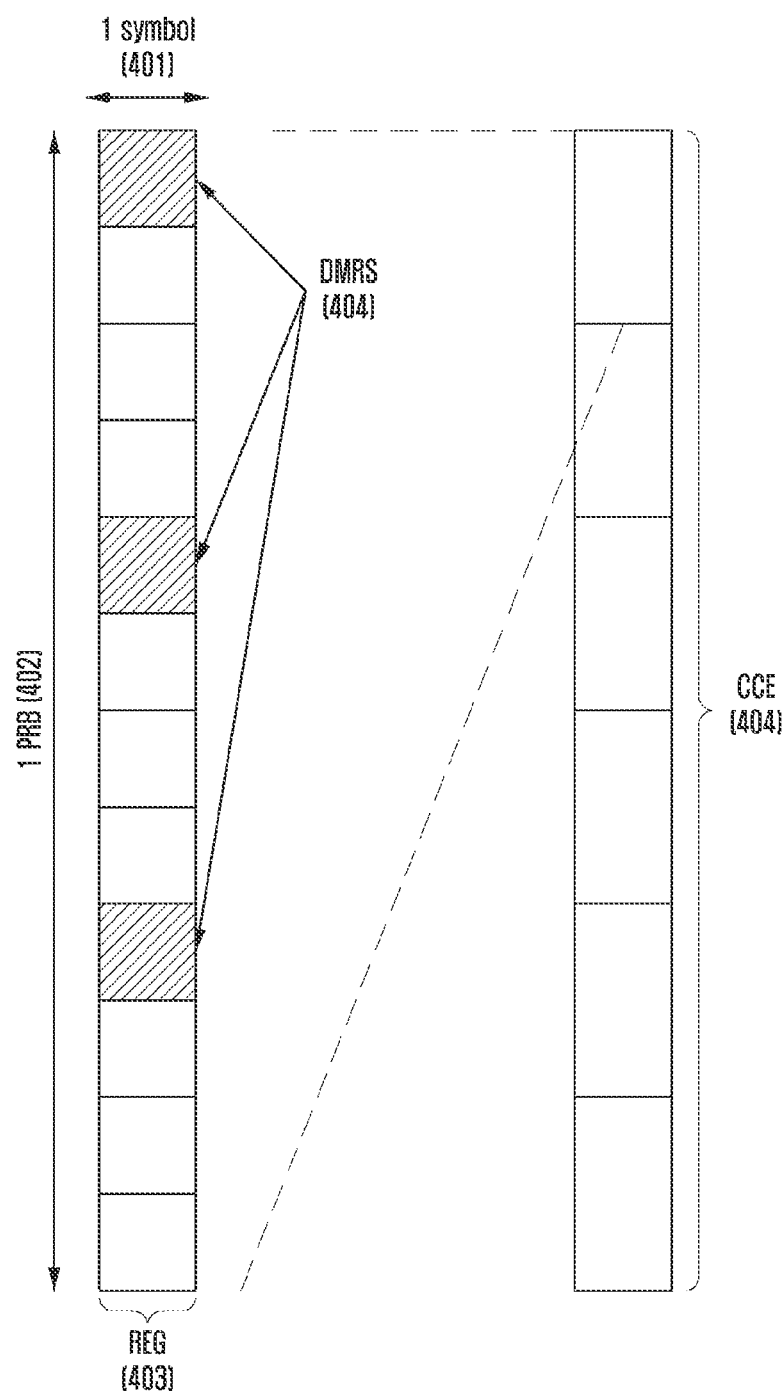
FIG. 4 illustrates a structure of a downlink control channel in an NR system according to an embodiment of the disclosure.

FIG. 4 illustrates a structure of a downlink control channel in a wireless communication system according to an embodiment of the disclosure. That is, FIG. 4 illustrates an example of a basic unit of a time and a frequency resource included in a downlink control channel which can be used by 5G according to an embodiment of the disclosure.

Referring to FIG. 4, the basic unit of a time and a frequency resource included in the control channel may be defined by a resource element group (REG) 403. The REG 403 may be defined as one OFDM symbol 401 on the time axis and one physical resource block (PRB) 402 on the frequency axis, that is, as 12 subcarriers. It is possible to configure a downlink control channel allocation unit by concatenating the REG 403.

As illustrated in FIG. 4, when the basic unit in which the downlink control channel is allocated in the 5G system is a control channel element (CCE) 404, one CCE 404 may include a plurality of REGs 403. For example, the REG 403 in FIG. 4 may include 12 REs, and when one CCE 404 includes six REGs 403, one CCE 404 may include 72 REs. When a downlink control resource set is configured, the corresponding resource set may include a plurality of CCEs 404, and a particular downlink control channel may be mapped to one or a plurality of CCEs 404 according to an aggregation level (AL) within the control resource set and may then be transmitted. The CCEs 404 within the control resource set may be distinguished by numbers, and the numbers of the CCEs 404 may be assigned according to a logical mapping scheme.

The basic unit of the downlink control channel illustrated in FIG. 4, that is, the REG 403, may include all REs to which the DCI is mapped and the region to which a DMRS 405, which is a reference signal for decoding the REs, is mapped. As illustrated in FIG. 4, three DMRSs 405 may be transmitted within one REG 403. The number of CCEs required to transmit the PDCCH may be 1, 2, 4, 8, or 16 according to the aggregation level (AL), and the different number of CCEs may be used to implement link adaptation of the downlink control channel. For example, when AL=L, one downlink control channel may be transmitted through L CCEs.

The terminal is required to detect a signal in the state in which the terminal is not aware of information on the downlink control channel, and a search space indicating a set of CCEs may be defined for blind decoding. The search space is a set of candidate control channels including CCEs for which the terminal should attempt decoding at the given aggregation level. There are several aggregation levels at which a set of CCEs is configured by 1, 2, 4, 8, and 16 CCEs, so that the terminal has a plurality of search spaces. The search space set may be defined as a set of search spaces at all configured aggregation levels.

The search spaces may be classified into a common search space and a terminal (UE)-specific search space. According to an embodiment of the disclosure, terminals in a predetermined group or all terminals may search for a common search space of the PDCCH in order to receive cell-common control information such as dynamic scheduling of system information or paging messages.

For example, the terminal may receive PDSCH scheduling allocation information for transmission of an SIB including information on the service provider of a cell by searching a common search space of the PDCCH. In a case of the common search space, terminals in a predetermined group or all terminals should receive the PDCCH, so that the common search space may be defined as a set of pre-arranged CCEs. Scheduling allocation information of the terminal-specific PDSCH or PUSCH may be received by searching a terminal-specific search space of the PDCCH. The terminal-specific search space may be defined in a terminal-specific manner as a terminal identity and a function of various system parameters.

In the 5G system, parameters for the PDCCH search space may be configured for the terminal by the base station via higher-layer signaling (for example, SIB, MIB, or RRC signaling). For example, the base station may configure, to the terminal, the number of PDCCH candidates at each aggregation level L, a monitoring period of the search space, a monitoring occasion in units of symbols within the slot for the search space, a search space type (a common search space or a terminal-specific search space), a combination of a DCI format and an RNTI to be monitored in the corresponding search space, a control resource set index for monitoring the search space, and the like. For example, the above-described configuration may include the following information as shown in [Table 10].

TABLE 10

```
SearchSpace ::=                           SEQUENCE {
    -- Identity of the search space. SearchSpaceId = 0 identifies the SearchSpace configured via PBCH
        (MIB) or ServingCellConfigCommon.
    searchSpaceId                         SearchSpaceId,
    (search space identifier)
    controlResourceSetId                  ControlResourceSetId,
    (control resource set identifier)
    monitoringSlotPeriodicityAndOffset    CHOICE {
    (monitoring slot level period)
        sl1                               NULL,
        sl2                               INTEGER (0..1),
        sl4                               INTEGER (0..3),
        sl5                               INTEGER (0..4),
        sl8                               INTEGER (0..7),
        sl10                              INTEGER (0..9),
        sl16                              INTEGER (0..15),
        sl20                              INTEGER (0..19)
    }
    duration(monitoring duration)         INTEGER (2..2559)
    monitoringSymbolsWithinSlot                 BIT STRING (SIZE (14))
    (monitoring symbols in slot)
    nrofCandidates                        SEQUENCE {
    (the number of PDCCH candidate groups for each aggregation level)
        aggregationLevel1                 ENUMERATED {n0, n1, n2, n3, n4, n5, n6, n8},
        aggregationLevel2                 ENUMERATED {n0, n1, n2, n3, n4, n5, n6, n8},
        aggregationLevel4                 ENUMERATED {n0, n1, n2, n3, n4, n5, n6, n8},
        aggregationLevel8                 ENUMERATED {n0, n1, n2, n3, n4, n5, n6, n8},
        aggregationLevel16                    ENUMERATED {n0, n1, n2, n3, n4, n5, n6, n8}
    },
    searchSpaceType                       CHOICE {
    (search space type)
        -- Configures this search space as common search space (CSS) and DCI formats to monitor.
        common                            SEQUENCE {
        (common search space)
        }
        ue-Specific                       SEQUENCE {
        (UE-specific search space)
```

TABLE 10-continued

```
0-1     -- Indicates whether the UE monitors in this USS for DCI formats 0-0 and 1-0 or for formats
        and 1-1.
        formats                         ENUMERATED {formats0-0-And-1-0, formats0-1-
        And-1-1},
        ...
}
```

The base station may configure one or a plurality of search space sets for the terminal according to the configuration information. In an embodiment of the disclosure, the base station may configure search space set 1 and search space 2 for the terminal, and the configuration may be performed such that DCI format A scrambled by an X-RNTI in search space set 1 is monitored in the common search space and DCI format B scrambled by a Y-RNTI in search space set 2 is monitored in the terminal-specific search space.

According to the configuration information, there may be one or a plurality of search space sets in the common search space or the terminal-specific search space. For example, search space set #1 and search space set #2 may be configured as common search spaces, and search space set #3 and search space set #4 may be configured as terminal-specific search spaces.

The common search spaces may be classified into a particular type of search space sets according to the purpose thereof. RNTIs to be monitored may be different for each determined search space set type. For example, the common search space types, the purposes, and the RNTIs to be monitored may be classified as shown in Table 10a below.

TABLE 10a

| Search space type | Purpose | RNTI |
| --- | --- | --- |
| Type0 CSS | PDCCH transmission for SIB scheduling | SI-RNTI |
| Type0A CSS | PDCCH transmission for SI scheduling (SIB2, etc.) other than SIB1 | SI-RNTI |
| Type1 CSS | PDCCH transmission for random-access response (RAR) scheduling, Msg3 retransmission scheduling, and Msg4 scheduling | RA-RNTI, TC-RNTI |
| Type2 CSS | Paging | P-RNTI |
| Type3 CSS | Group control information transmission | INT-RNTI, SFI-RNTI, TPC-PUSCH-RNTI, TPC-PUCCH-RNTI, TPC-SRS-RNTI |
|  | PDCCH transmission for data scheduling in case of PCell | C-RNTI, MCS-C-RNTI, CS-RNTI |

In a common search space, the following combinations of a DCI format and a RNTI may be monitored, but is not limited to the examples below.
  DCI format 0_0/1_0 with CRC scrambled by C-RNTI, CS-RNTI, SP-CSI-RNTI, RA-RNTI, TC-RNTI, P-RNTI, SI-RNTI
  DCI format 2_0 with CRC scrambled by SFI-RNTI
  DCI format 2_1 with CRC scrambled by INT-RNTI
  DCI format 2_2 with CRC scrambled by TPC-PUSCH-RNTI, TPC-PUCCH-RNTI
  DCI format 2_3 with CRC scrambled by TPC-SRS-RNTI In a terminal-specific search space, the following combinations of a DCI format and a RNTI may be monitored, but is not limited to the examples below.
  DCI format 0_0/1_0 with CRC scrambled by C-RNTI, CS-RNTI, TC-RNTI
  DCI format 1_0/1_1 with CRC scrambled by C-RNTI, CS-RNTI, TC-RNTI The described types of RNTIs may follow the definitions and purposes below.
  Cell RNTI (C-RNTI): Terminal-specific PDSCH scheduling purpose
  Temporary Cell RNTI (TC-RNTI): Terminal-specific PDSCH scheduling purpose
  Configured Scheduling RNTI (CS-RNTI): Semi-statically configured terminal-specific PDSCH scheduling purpose
  Random Access RNTI (RA-RNTI): The purpose of scheduling a PDSCH in a random access stage
  Paging RNTI (P-RNTI): The purpose of scheduling a PDSCH on which paging is transmitted
  System Information RNTI (SI-RNTI): The purpose of scheduling a PDSCH on which system information is transmitted
  Interruption RNTI (INT-RNTI): The purpose of notifying of whether a PDSCH is punctured
  Transmit Power Control for PUSCH RNTI (TPC-PUSCH-RNTI): The purpose of indicating a power control command for a PUSCH
  Transmit Power Control for PUCCH RNTI (TPC-PUCCH-RNTI): The purpose of indicating a power control command for a PUCCH
  Transmit Power Control for SRS RNTI (TPC-SRS-RNTI): The purpose of indicating a power control command for a SRS In an embodiment, the described DCI formats may follow the definitions in [Table 11] below.

TABLE 11

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

TABLE 11-continued

| DCI format | Usage |
| --- | --- |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G system, a search space of aggregation level L in control resource set p and search space set s may be expressed as in the following equation.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 2]}$$

L: Aggregation level $n_{CI}$: Carrier index $N_{CCE,p}$: The total number of CCEs existing in control resource set p $n_{s,f}^\mu$: Slot index $M^{(L)}_{p,s,max}$: The number of PDCCH candidate groups of aggregation level L $m_{snCI}=0, \ldots, M^{(L)}_{p,s,max}-1$: The index of PDCCH candidate groups of aggregation level L $i=0, \ldots, L-1$ $Y_{p,n_{s,f}^\mu}=(A_p \cdot Y_{p,n_{s,f}^\mu-1}) \bmod D$, $Y_{p,-1}=n_{RNTI} \neq 0$, $A_0=39827$, $A_1=39829$, $A_2=39839$, $D=65537$ $n_{RNTI}$: Terminal identifier In a case of a common search space, $Y\_(p,n^\mu_{s,f})$ may be 0.

In a case of a terminal-specific search space, $Y\_(p,n^\mu_{s,f})$ may be changed according to a time index and the identity (a C-RNTI or an ID configured for the terminal by the base station) of a terminal.

According to an embodiment of the disclosure, a plurality of search space sets may be configured as different parameters (for example, the parameters in [Table 10]) in the 5G system. Accordingly, the search space set that the terminal monitors may be different each time. For example, when search space set #1 is configured in an X-slot period, search space set #2 is configured in a Y-slot period, and X and Y are different from each other, the terminal may monitor both search space set #1 and search space set #2 in a particular slot, and may monitor only one of search space set #1 and search space set #2 in another particular slot.

Meanwhile, the uplink/downlink HARQ in the NR system adopts an asynchronous HARQ scheme in which the data retransmission time point is not fixed. By taking the downlink as an example, when a base station has received a feedback of HARQ NACK from the terminal in response to initially transmitted data, the base station freely determines the retransmission data transmission time point according to a scheduling operation. After buffering data that has been determined as an error as a result of decoding of reception data for an HARQ operation, the terminal may perform combining with the next retransmission data. HARQ ACK/NACK information of the PDSCH transmitted in a subframe n-k may be transmitted from the terminal to the base station via the PUCCH or the PUSCH in a subframe n. In the 5G communication system such as the NR system, a k value may be included in DCI for indicating or scheduling reception of the PDSCH transmitted in the subframe n-k and then transmitted, or may be configured for the terminal via a higher-layer signal. In this case, the base station may configure one or more k values via a higher-layer signal, and may indicate a particular k value via the DCI, wherein k may be determined based on HARQ-ACK processing capacity of the terminal, i.e., a minimum time required for the terminal to receive the PDSCH and then to generate and report HARQ-ACK with respect to the PDSCH. In addition, before the k value is configured for the terminal, the terminal may use a pre-defined value or a default value.

Next, the description of a resource area in which a data channel is transmitted in a 5G communication system will be made below.

Figure 5:
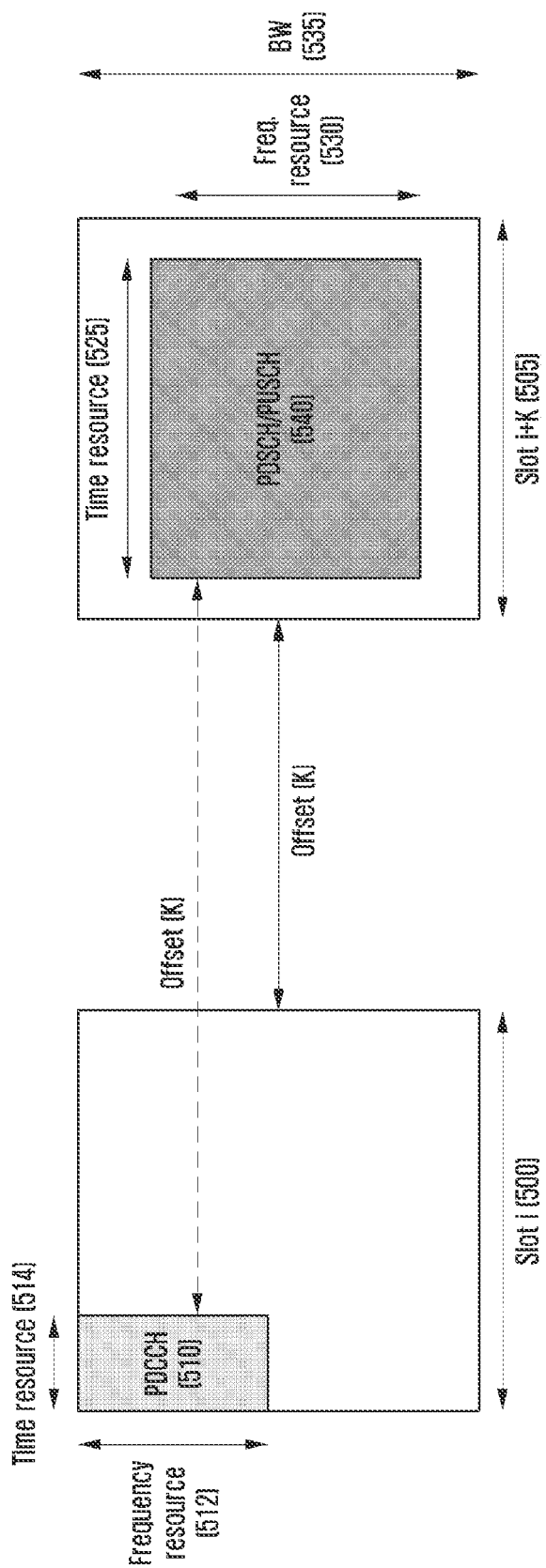
FIG. 5 illustrates a downlink or uplink scheduling method and a resource area in an NR system according to an embodiment of the disclosure.

FIG. 5 illustrates a resource area in which a data channel is transmitted in a 5G communication system. In a downlink control channel (hereinafter, referred to as a "PDCCH") area (hereinafter, referred to as a "control resource set (CORESET)" or a "search space (SS)") configured by the base station through a higher-layer signal, the terminal monitors or searches for a PDCCH 510. In this case, the downlink control channel area may include time-domain information 514 and frequency-domain information 512, the time-domain information 514 may be configured in units of symbols, and the frequency-domain information 512 may be configured in units of RBs or RB groups. When the terminal detects the PDCCH 510 in a slot i 500, the terminal acquires downlink control information (DCI) transmitted via the detected PDCCH 510. The terminal may acquire scheduling information relating to a downlink data channel or an uplink data channel from the received downlink control information (DCI). In other words, the DCI may include at least information on a resource area (or a PDSCH transmission area) in which the terminal is to receive a downlink data channel (hereinafter, referred to as a "PDSCH") transmitted from the base station, or information on a resource area that is allocated to the terminal, by the base station, for transmission of an uplink data channel (a PUSCH). The case in which uplink data channel (PUSCH) transmission is scheduled for the terminal will be described as follows. The terminal that received DCI may acquire, from the DCI, a slot index or offset information K relating to reception of the PUSCH, and may determine a PUSCH transmission slot index. For example, the terminal may determine that the terminal is scheduled to transmit the PUSCH in a slot i+K 505, based on the offset information K, with reference to the slot index I 500 in which the PDCCH 510 is received. In this case, the terminal may also determine the slot i+K 505 or a PUSCH start symbol or time in the slot i+K by using the received offset information K, with reference to the received CORESET in which the PDCCH 510 is received. In addition, the terminal may acquire, from the DCI, information relating to a PUSCH transmission time-frequency resource area 540 in a PUSCH transmission slot 505, wherein PUSCH transmission frequency resource area information 530 may be information in units of PRBs or PRB groups. The PUSCH transmission frequency resource area information 530 is an area included in an initial (uplink) bandwidth (BW) 535 or an initial (uplink) bandwidth part (BWP) 535 that is determined by or is configured for the terminal via an initial access procedure. When a BW or a BWP is configured for the terminal via a higher-layer signal, the PUSCH transmission frequency resource area information 530 may be an area included in the BW or the BWP that is configured via the higher-layer signal.

The PUSCH transmission time resource area information 525 may be information in units of symbols or symbol groups, or may be information indicating absolute time information. In this case, the PUSCH transmission time resource area information 525 may be expressed as a combination of a PUSCH transmission start time or symbol and a PUSCH length, and a PUSCH end time or symbol, and may be included in the DCI as a field or value. Here, the PUSCH transmission time resource area information 525 may be included in the DCI as a field or a value expressing each of the PUSCH transmission start time or symbol and the PUSCH length, and the PUSCH end time or symbol. The terminal may transmit the PUSCH in a PUSCH transmission resource area 540 determined based on the DCI.

The description of a frequency-domain resource allocation scheme for a data channel in the 5G communication system will be made below.

The 5G system supports three types of frequency-domain resource allocation schemes for a physical downlink shared channel (PDSCH) and a physical uplink shared channel (PUSCH), namely resource allocation type 0, resource allocation type 1, and resource allocation type 2.

Resource Allocation Type 0

RB allocation information may be notified of to the terminal in the form of a bitmap for a resource block group (RBG) by the base station. In this case, the RBG may include a set of consecutive virtual RBs (VRBs), and the RBG size P may be determined as a value configured with a high-layer parameter (rbg-Size) and a value of a bandwidth part size defined in the table below.

TABLE 12

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The total number $N_{RBG}$ of RBGs of bandwidth part i having the size of $N_{BWP,i}^{size}$ may be defined as below:
$N_{RBG} = \lceil (N_{BWP,i}^{size} + (N_{BWP,i}^{start} \bmod P))/P \rceil$, where
the size of the first RBG is $RBG_0^{size} = P - N_{BWP,i}^{start} \bmod P$,
the size of last RBG is $RBG_{last}^{size} = (N_{BWP,i}^{start} + N_{BWP,i}^{size}) \bmod P$ if $(N_{BWP,i}^{start} + N_{BWP,i}^{size}) \bmod P > 0$ and P otherwise,
the size of all other RBGs is P.

Each bit of a bitmap having the size of $N_{RBG}$ bit may correspond to each of the RBGs. The RBGs may be indexed in the order of the ascending frequency, starting from the lowest frequency position of the bandwidth part. With respect to $N_{RBG}$ RBGs in the bandwidth part, RBG #0 to RBG #($N_{RBG}$−1) may be mapped to MSB to LSB of an RBG bitmap. When a particular bit value in the bitmap is 1, the terminal may determine that an RBG corresponding to the bit value is allocated, and when a particular bit value in the bitmap is 0, the terminal may determine that an RBG corresponding to the bit value is not allocated.

Resource Allocation Type 1

Start positions and lengths of consecutively allocated VRBs may be notified of to the terminal as RB allocation information by the base station. In this case, interleaving or non-interleaving of the consecutively allocated VRBs may be additionally applied. A resource allocation field of resource allocation type 1 may be configured with a resource indication value (RIV), wherein the RIV may include a start point $RB_{start}$ of a VRB and the lengths $L_{RBs}$ of consecutively allocated RBs. More specifically, the RIV in the bandwidth part of the size $N_{BWP}^{size}$ may be defined as follows:
if $(L_{RBs}-1) \leq \lfloor N_{BWP}^{size}/2 \rfloor$ then
$RIV = N_{BWP}^{size}(L_{RBs}-1) + RB_{start}$
else
$RIV = N_{BWP}^{size}(N_{BWP}^{size} - L_{RBs}+1) + (N_{BWP}^{size} - 1 - RB_{start})$
where $L_{RBs} \geq 1$ and shall not exceed $N_{BWP}^{size} - RB_{start}$.

Resource Allocation Type 2

M interlace index sets may be notified of to the terminal as RB allocation information by the base station.

Interlace index $m \in \{0, 1, \ldots, M-1\}$ may be configured by common RBs $\{m, M+m, 2M+m, 3M+m, \ldots\}$, and M may be defined as shown in Table 13 below.

TABLE 13

| μ | M |
|---|---|
| 0 | 10 |
| 1 | 5 |

The relationships between the common $RB_{n_{CRB}^\mu}$ and the $RB_{n_{IRB,m}^\mu} \in \{0, 1, \ldots\}$ in interlace m and the bandwidth part i may be defined as below:
$n_{CRB}^\mu = M n_{IRB,m}^\mu + N_{BWP,i}^{start,\mu} + ((m - N_{BWP,i}^{start,\mu}) \bmod M)$
where $N_{BWP,i}^{start,\mu}$ is the common resource block where the bandwidth part starts relative to common resource block 0. u is subcarrier spacing index When a subcarrier spacing is 15 kHz (u=0), $m_0$+1 indices may be notified of to the terminal as the RB allocation information relating to the interlace set by the base station. In addition, a resource allocation field may be configured by resource indication value (RIV). When the RIV is $0 \leq RIV < M(M+1)/2$, $l=0, 1, \ldots L-1$, the resource allocation field may be configured by start interlace $m_0$ and the number of consecutive interlaces L (L≥1), and the value is as follows:
if $(L-1) \leq \lfloor M/2 \rfloor$ then
$RIV = M(L-1) + m_0$
else
$RIV = M(M-L+1) + (M-1-m_0)$ When the RIV is $RIV \geq M(M+1)/2$, the RIV may be configured by values of start interlace index $m_0$ and l, and the value may be configured as shown in Table 14.

TABLE 14

| RIV − M(M + 1)/2 | $m_0$ | l |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

When a subcarrier spacing is 30 kHz (u=1), the RB allocation information may be notified of to the terminal in the form of a bitmap indicating interlaces allocated to the terminal, by the base station. The bitmap size is M, and 1 bit of the bitmap corresponds to each interlace. With respect to the interlace bitmap order, interlace indices 0 to M−1 may be mapped to MSB to LSB.

In addition, with respect to 15 kHz and 30 kHz, a least significant bit (LSB) $Y=\lceil \log 2 \, (N\_(RB\text{-set})^{\wedge}BWP \, (N\_(RB\text{-set})^{\wedge}BWP+1))/2 \rceil$ of an FDRA field may mean a set of consecutive RBs of the PUSCH scheduled by DCI format 0_1. Y bit may be configured by a resource indication value ($RIV_{RBset}$). In $0 \leq RIV_{RBset} < N_{RB\text{-}set}^{BWP}(N_{RB\text{-}set}^{BWP}+1)/2$, l=0, 1, ... $L_{RBset}-1$, $RIV_{RBset}$ may be determined by a start RB set $RBset_{START}$ and the number $L_{RBset}(L_{RBset} \geq 1)$ of consecutive RB sets. $RIV_{RBset}$ may be defined as follows:

if $(L_{RBset}-1) \leq \lfloor N_{RB\text{-}set}^{BWP}/2 \rfloor$ then
$RIB_{RBset}=N_{RB\text{-}set}^{BWP}(L_{RBset}-1)+RBset_{START}$
else
$RIV_{RBset}=N_{RB\text{-}set}^{BWP}(N_{RB\text{-}set}^{BWP}-L_{RBset}+1)+(N_{RB\text{-}set}^{BWP}-1-RBset_{START})$ $N_{RB\text{-}set}^{BWP}$ means a number of RB sets included in the BWP, and may be determined by the number of guard gaps (or bands) in a carrier preconfigured or configured via higher-layer signaling.

Meanwhile, in the NR system, a preparation time for PUSCH transmission after the terminal is scheduled to transmit the PUSCH is defined. When the PUSCH first symbol including a DMRS is scheduled to the terminal by the base station after $L_2$, the terminal may transmit the PUSCH, or may disregard scheduling DCI. Here, $L_2$ means the first uplink symbol where CP starts after $T_{proc,2}$ max $((N_2+d_{2,1})(2048+144) \cdot \kappa 2^{-\mu} \cdot T_C, d_{2,2})$ from the last symbol of the PDCCH including DCI for scheduling the PUSCH.

$N_2$ may be defined as shown in Tables 15A and 15B. u is determined by a value having a greater $T_{proc,2}$, among $u_{DL}$ and $u_{UL}$, wherein $u_{DL}$ and $u_{UL}$ mean a PDCCH subcarrier spacing and a PUSCH subcarrier spacing, respectively. In addition, $\kappa=T_s/T_c=64$, $T_s=1/(\Delta f_{ref} \cdot N_{f,ref})$, $T_c=1/(\Delta f_{max} \cdot N_f)$, $N_f=4096$, and $N_{f,ref}=2048$.

If the first symbol of the PUSCH is configured by only a DM-RS, $d_{2,1}=0$, else $d_{2,1}=1$.

If the DCI instructs BWP switching, d2,2 means a BWP switching time, else $d_{2,2}=0$.

TABLE 15a

| μ | PUSCH preparation time N₂ [symbols] |
|---|---|
| 0 | 10 |
| 1 | 12 |
| 2 | 23 |
| 3 | 36 |

TABLE 15b

| μ | PUSCH preparation time N₂ [symbols] |
|---|---|
| 0 | 5 |
| 1 | 5.5 |
| 2 | 11 for frequency range 1 |

Next, a scheme of configuring a beam to transmit control information and data to the terminal by the base station will be described. For convenience of description in the disclosure, a process of transmitting control information via a PDCCH may be represented in that a PDCCH is transmitted, and a process of transmitting data via a PDSCH may be represented in that a PDSCH is transmitted.

First, a beam configuration scheme will be described.

Figure 6:
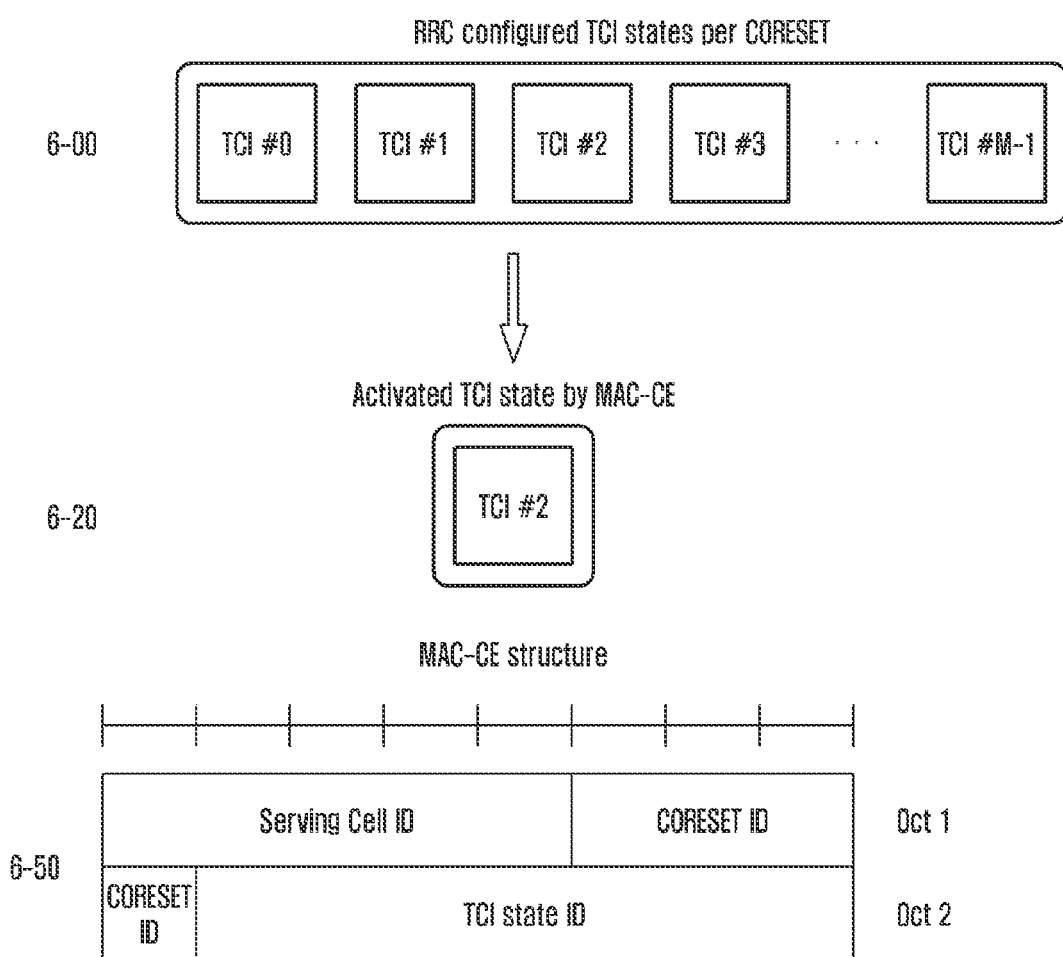
FIG. 6 illustrates a process of beam configuration and activation of a PDCCH according to an embodiment of the disclosure.

FIG. 6 illustrates a process of beam configuration and activation for a PDCCH according to an embodiment of the disclosure. First, a list of TCI states may be indicated for each CORESET through a higher-layer list such as RRC (operation 6-00). The list of TCI states may be indicated by "tci-StatesPDCCH-ToAddList" and/or "tciStatesPDCCH-ToReleaseList". Next, one from the list of TCI states configured for each CORESET may be activated by the MAC-CE (operation 6-20). Operation 6-50 illustrates an example of a MAC-CE structure for TCI state activation. The meaning of each field and a value configured for each field in the MAC-CE are as follows.

- Serving Cell Identifier (Serving Cell ID): This field indicates the identity of the Serving Cell for which the MAC CE applies. The length of the field is 5 bits;
- CORESET Identifier (CORESET ID): This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;
- Transmssion control indication Identifier (TCI State ID): This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

Next, a scheme of configuring a beam for a PDSCH will be described.

Figure 7:
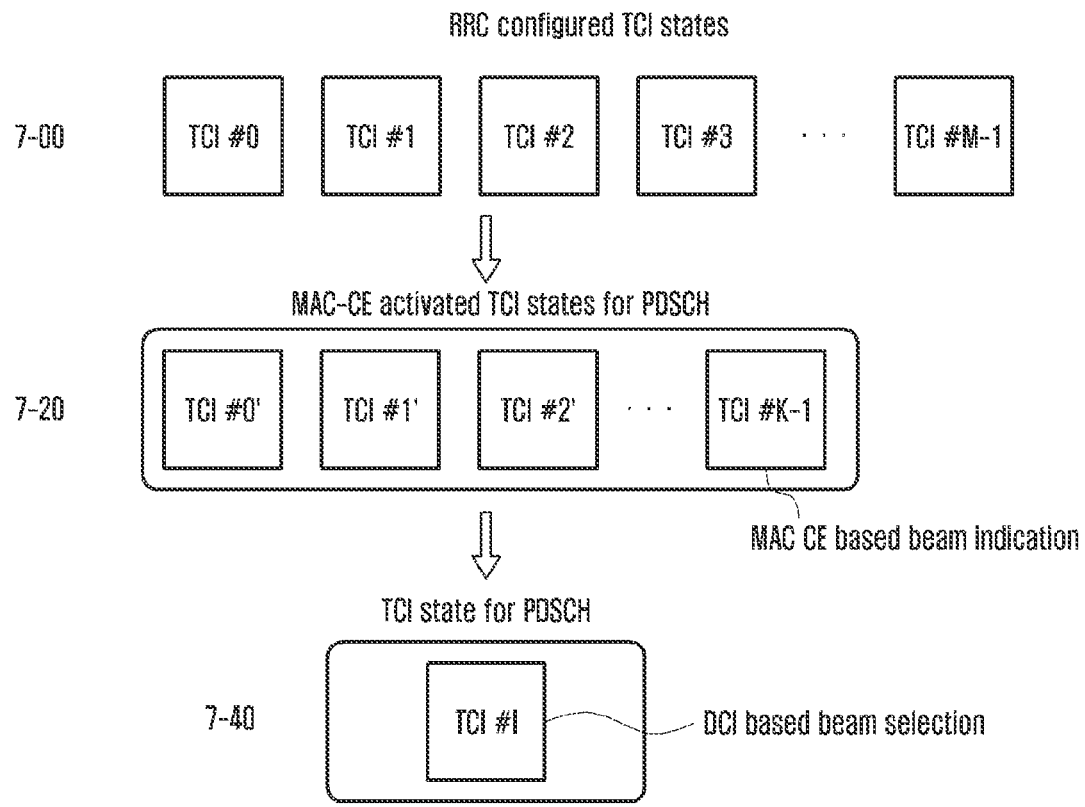
FIG. 7 illustrates a process of beam configuration and activation of a PDSCH according to an embodiment of the disclosure.

FIG. 7 illustrates a process of beam configuration and activation for a PDSCH according to an embodiment of the disclosure.

First, a list of TCI states may be indicated through a higher-layer list such as RRC (operation 7-00). The list of TCI states may be indicated by, for example, "tciStates-ToAddModList" and/or "tci-StatesToReleaseList" in a PDSCH-Config IE for each BWP. Next, some of the list of TCI states may be activated by the MAC-CE (operation 7-20). The maximum number of the activated TCI states may be determined according to the capability reported by the terminal. Operation 7-50 illustrates an example of a MAC-CE structure for TCI state activation/deactivation of a Rel-15-based PDSCH.

The meaning of each field and a value configured for each field in the MAC-CE are as follows.

- Serving Cell Identifier (Serving Cell ID): This field indicates the identity of the Serving Cell for which the MAC CE applies. The length of the field is 5 bits;
- Bandwidth Part Identifier (BWP ID): This field indicates a DL BWP for which the MAC CE applies as the codepoint of the DCI bandwidth part indicator field as specified in TS 38.212 [9]. The length of the BWP ID field is 2 bits;
- TCI state Identifier i (Ti): If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e. the first TCI State with Ti field set to 1 shall be mapped to the codepoint value 0, second TCI State with Ti field set to 1 shall be mapped to the codepoint value 1 and so on. The maximum number of activated TCI states is 8;
- Reserved Bit (R): Reserved bit, set to 0.

When the terminal has received DCI format 1_1 or DCI format 1_2, the terminal may receive, based on transmission configuration indication (TCI) field information in the DCI, a PDSCH by a beam of TCI states activated by the MAC-CE (operation 7-40). Whether the TCI field exists may be determined by a tci-PresentinDCI value indicating a higher-layer parameter in a CORESET configured to reception of the DCI. When tci-PresentinDCI is configured to be "enabled" in the higher layer, the terminal may identify a TCI field having 3-bit information and determine the TCI states activated in the DL BWP or the scheduled component carrier and the direction of a beam associated with the DL-RS.

In the LTE and NR system, in the state in which the terminal is connected to the serving base station, a procedure of reporting the capability supported by the terminal to the corresponding base station is performed. In the following description, the procedure may be referred to as "UE capability (report)". The base station may transfer a UE capability enquiry message requesting the capability report to the terminal in the connection state. The message may include a UE capability requested by the base station for each RAT type. The request for each RAT type may include required frequency band information. In addition, multiple RAT types may be request through the UE capability enquire message in one RRC message container, or multiple UE capability enquire messages including a request for each RAT type may be transferred to the terminal. That is, the UE capability enquiry may be repeated multiple times, and the terminal may configure the UE capability information message relating to the enquiry and report the message multiple times. In the next-generation mobile communication system, the UE capability request for NR, LTE, EN-DC, and MR-DC can be made. Generally, the UE capability enquiry message is initially transmitted after the terminal is connected, but the base station may request the message as necessary in some conditions.

In the above operation, the terminal having received the UE capability report request from the base station configures the terminal (UE) capability according to the RAT type or band information request by the base station. A scheme of configuring UE capability by the terminal in the NR system is described as below:

1. When the terminal receives a list relating to the LTE and/or NR band upon the UE capability request from the base station, the terminal configures a band combination (BC) for EN-DC and NR stand-alone (SA). That is, the terminal configures, based on the bands requested from the base station through FreqBandList, a candidate list of BCs for EN-DC and NR SA. In addition, the bands have priorities as in the order listed in FreqBandList.

2. When the base station sets an "eutra-nr-only" flag or an "eutra" flag and requests a UE capability report, the terminal completely removes NR SA BCs from the above-configured candidate list of BCs. This operation can be performed when the LTE base station (eNB) request "eutra" capability.

3. Later, the terminal removes fallback BCs from the candidate list of BCs configured in the above operation. In this case, if the fallback BC corresponds to a super set BC from which a band corresponding to one initial SCell is removed, and the super set BC can cover the fallback BC already, the fallback BC can be omitted. This operation is applied to the MR-DC, that is, the LTE bands. The remaining BCs after this operation correspond to the final "candidate BC list".

4. The terminal selects BCs suitable for the request RAT type from the final "candidate BC list" and selects BCs to be reported. In this operation, the terminal configures supportedBandCombinationList according to a predetermined order. That is, the terminal configures the UE capability and BC to be reported according to a preconfigured rat-Type order. (nr→eutra-nr→eutra). In addition, the terminal configures featureSetCombination for the configured supportedBandCombinationList and configures a "candidate feature set combination" list from the candidate BC list from which a list of the fallback BCs (including the capability in the level equal to or lower than those of the other BCs) is removed. The "candidate feature set combination" includes all feature set combinations for the NR and EUTRA-NR BC, and may be acquired from the feature set combination of the UE-NR-Capabilities and UE-MRDC-Capabilities container.

5. In addition, when the request RAT type is "eutra-nr" and affects, featureSetCombinations are included in both containers of UE-MRDC-Capabilities and UE-NR-Capabilities. However, the feature set of the NR is included only in the UE-NR-Capabilities.

Once the terminal (UE) capability is configured, the terminal transfers a UE capability information message including the UE capability to the base station. The base station performs, based on the UE capability received from the terminal, scheduling and reception or transmission management suitable for the corresponding terminal later.

When an interval between a symbol at which PDCCH transmission ends and a start symbol of a PDSCH scheduled by the PDCCH has a value smaller than a particular threshold, the terminal may fail to complete PDCCH decoding at the time when receiving the PDSCH. This means that beam information indicated for PDSCH reception by DCI of the PDCCH fails to be received. In this case, the base station and the terminal may designate a default beam for PDSCH reception. That is, in this case, the base station transmits the PDSCH by using the designated default beam, and the terminal performs buffering by using the designated default beam. When the terminal determines after PDCCH decoding that there was a PDSCH scheduled before PDCCH decoding, PDSCH decoding may be performed from a signal buffered according to the default beam. Here, the above-mentioned threshold may be a value of timeDurationForQCL reported by the terminal (UE) capability. The default beam operation may be limited to the case in which one or more TCI states among the TCI state list 7-00 configured for the PDSCH include QCL-TypeD, that is, the case of accompanying reception beam configuration of the terminal. In this case, the default beam may correspond to a beam configured in a CORESET (e.g., CORESET #0) corresponding to the lowest ID, among CORESETs corresponding to monitored search spaces of the most recent slot with reference to a PDSCH reception slot.

The default beam operation for PDSCH reception may be limited to the case in which no cross-carrier configuration for the PDSCH is made.

Figure 8:
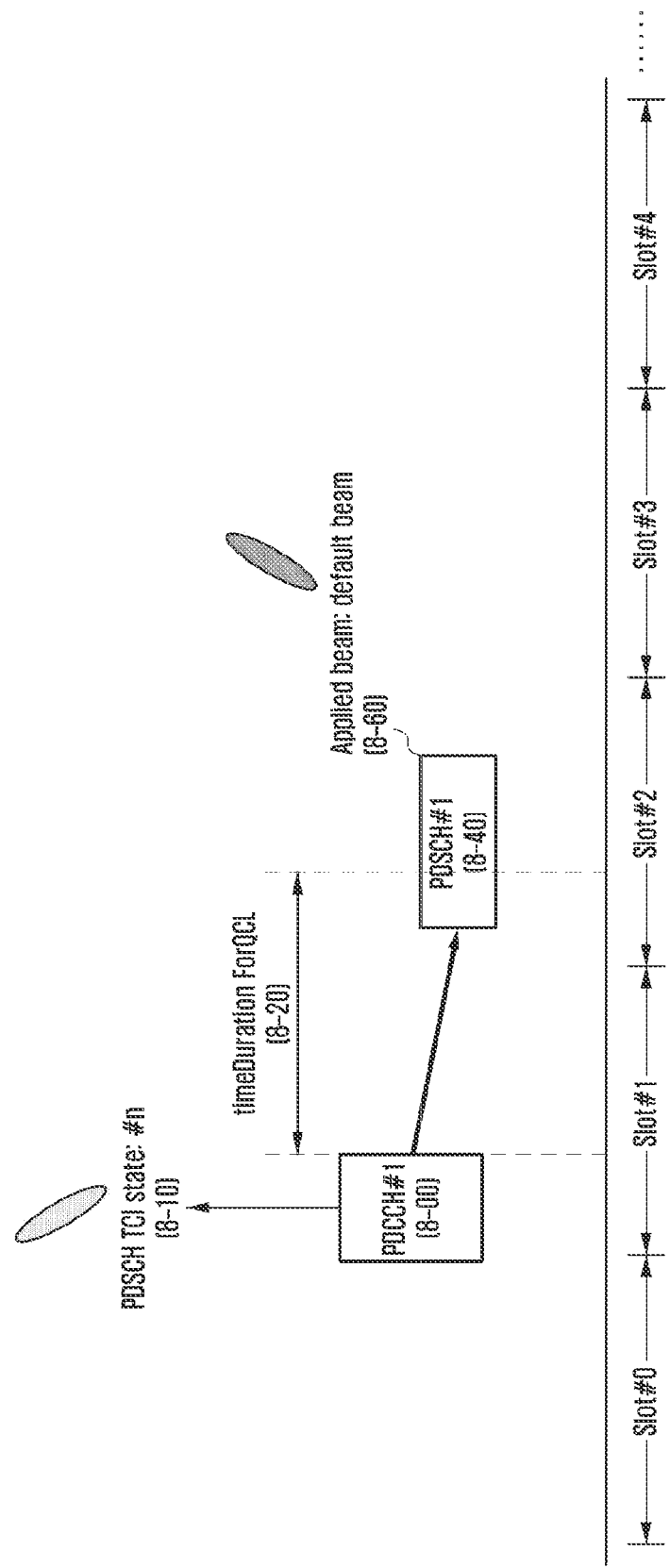
FIG. 8 illustrates an example of a PDSCH default beam operation according to an embodiment of the disclosure.

FIG. 8 illustrates an example of a PDSCH default beam operation according to an embodiment of the disclosure.

In the DCI transmitted via a PDCCH 8-00, in a case in which a TCI field for PDSCH reception corresponds to TCI state #n 8-10, when an interval between a symbol in which PDCCH transmission ends and a start symbol of a PDSCH 8-40 scheduled by the PDCCH is shorter than timeDurationforQCL 8-20, and at least one TCI state among a list of TCI states configured for a PDSCH via RRC includes QCL-TypeD, a default beam 8-60 is applied to the PDSCH.

When no parameter tci-PresetinDCI is configured in a CORESET or when the PDSCH is scheduled by DCI format 10, a beam for PDSCH reception may not be indicated to the terminal via the DCI since no TCI field exists in the DCI. In this case, when an interval between a symbol in which PDCCH transmission ends and a start symbol of a PDSCH scheduled by the PDCCH has a value equal to or larger than timeDurationforQCL, the terminal assumes that a beam for PDSCH reception is identical to a beam configured/activated in a PDCCH transmission CORESET, and the base station may configure a PDSCH transmission beam in accordance with the assumption made by the terminal. The default beam operation for PDSCH reception may be limited to the case of no cross-carrier configuration for the PDSCH.

In the NR system, when the base station schedules a PDSCH by using DCI format 1_0 or DCI format 1_1 for the terminal, the terminal transmits HARQ-ACK feedback information relating to the PDSCH via a physical uplink control channel (PUCCH) to the base station. The base station indicates a slot, to which a PUCCH for transmitting HARQ-ACK feedback information is mapped, and a type of a PUCCH resource via DCI for scheduling a PDSCH to the terminal. Specifically, the base station may indicate a slot offset between the PDSCH and the PUCCH for transmitting HARQ-ACK feedback information, via a PDSCH-to-HARQ_feedback timing indicator field of the DCI for scheduling the PDSCH. In addition, the base station may indicate a type of a PUCCH resource for transmitting HARQ-ACK feedback information through a PUCCH resource indicator of the DCI for scheduling the PDSCH.

The below sections discuss four scenarios for PUSCH default beam behaviour. For each scenario, two PDCCH Schemes are considered namely single frequency network (SFN) scheme and Non-SFN scheme. And for each scheme in each scenario, multiple solutions are discussed for the default beam assumption of PUSCH, of which one or more solutions are applicable to a given scenario. Conditions and solutions for each scenario described below can be combined with each other. In an embodiment of the disclosure, a parameter indicating whether default beam or default pathloss reference signal is enabled is described as a same one parameter, each of the default beam and default pathloss reference signal may be enabled using separate parameter. In an embodiment of the disclosure, a parameter indicating whether multiple (e.g. two) default beam or multiple (e.g. two) default pathloss reference signal is enabled is described as a same one parameter, each of the multiple default beam and multiple default pathloss reference signal may be enabled using separate parameter.

For SFN scheme, the environment is defined as follows. The control resource set (CORESET) used for PDCCH transmission is configured with more than one transmission configuration indication (TCI) state corresponding to different quasi colocation (QCL) parameters, where each PDCCH candidate of a monitored search space maps to at least one TCI state. Same PDCCH information is transmitted over the same time-frequency resource from each TRP. On reception of the PDCCH occasion, the UE performs channel estimation over the PDCCH demodulation reference signal (DMRS) port considering a combined QCL parameter with respect to the configured TCI states.

For non-SFN scheme, the environment is defined as follows. The PDCCH transmission is monitored over more than one search space each associated with the respective control resource set (CORESET) with different transmission configuration indication (TCI) state corresponding to different quasi co-location (QCL) parameters. The same PDCCH information is transmitted over multiple transmission occasions from each TRP in different time resources as time division multiplexing (TDM) or in different frequency resources as frequency division multiplexing (FDM). On reception of the PDCCH occasions from different search spaces, the UE performs channel estimation over the PDCCH demodulation reference signal (DMRS) port considering different QCL parameters over each occasion, with respect to the configured TCI states.

For multi-TRP PUSCH repetition, the environment is defined as follows. The same PUSCH information is transmitted over multiple transmission occasions to each TRP in different time resources as TDM manner. For multi-TRP PUSCH repetition, some methods using higher layer parameter can be used to enable as follows.

a new high layer parameter, e.g., enableMultiTRPPuschRep can be configured, or multiple SRS resource sets with related higher layer parameter usage set to codebook or noncodebook can be configured and each SRS resource set is correspond to each PUSCH transmission toward each TRP.

In the sequel, the description for enabling multi-TRP PUSCH repetition can be considered one of the above methods.

[Scenario 1]

Conditions and solutions for the scenario 1 according to the embodiment of the present disclosure are described below. The conditions described below are for illustrative purpose, and not all conditions have to be satisfied for using the solutions.

For PUSCH scheduled by DCI format 0_0 on a cell
Condition 1: if the higher layer parameter enableDefaultBeamPL-ForPUSCH0-r16 is set 'enabled', Condition 2: the UE is not configured with PUCCH resources on the active UL BWP and Condition 3: the UE is in RRC connected mode, SFN Scheme with Single Default Beam Condition 4 can be one among three below
- if a higher layer parameter enabling two default beams and two default pathloss reference RSs (e.g., enabletwoDefaultBeamPL-ForPUSCH0-0-r17) for PUSCH is not configured, and a higher layer parameter enabling multi-TRP PUSCH repetition is configured or
- if a higher layer parameter enabling two default beams and two default pathloss reference RSs (e.g., enabletwoDefaultBeamPL-ForPUSCH0-0-r17) for PUSCH is not configured and a higher layer parameter enabling multi-TRP PUSCH repetition is not configured, or
- If a higher layer parameter enabling two default beams and two default pathloss reference RSs (e.g., enabletwoDefaultBeamPL-ForPUSCH0-0-r17) for PUSCH is configured, and a higher layer parameter enabling multi-TRP PUSCH repetition is not configured, Condition 5: if at least one CORESET is configured with more than one TCI state through MAC-CE command,
the UE shall transmit PUSCH according to the spatial relation, if applicable, with a reference to the RS with 'QCL-TypeD' corresponding to the QCL assumption . . . .

Spatial Relation with Respect to Single TCI:
Solution 1-1: the TCI state or the QCL assumption of the lowest TCI state ID activated for a CORESET with the lowest index among the CORESETs activated two different TCI states on the active DL BWP of the cell.
Solution 1-2: the TCI state or the QCL assumption of the highest TCI state ID activated for a CORESET with the lowest index among the CORESETs activated two different TCI states on the active DL BWP of the cell.
Solution 1-3: the TCI state or the QCL assumption of the first TCI state ID activated for a CORESET with the lowest index among the CORESETs activated two different TCI states on the active DL BWP of the cell.
Solution 1-4: the TCI state or the QCL assumption of the last TCI state ID activated for a CORESET with the lowest index among the CORESETs activated two different TCI states on the active DL BWP of the cell.
Solution 2: the TCI state or the QCL assumption of a CORESET with the lowest index among the CORESETs activated a single TCI state on the active DL BWP of the cell.

Spatial Relation with Respect to Multiple TCI:
Solution 3: the QCL assumption of a CORESET with the lowest index, where the QCL assumption is a combination of the QCL parameters corresponding to the TCI states activated for the CORESET among the CORESETs activated two different TCI states on the active DL BWP of the cell.

SFN Scheme with Two Default Beams
Condition 4: if a higher layer parameter enabling two default beams and two default pathloss reference RSs (e.g., enabletwoDefaultBeamPL-ForPUSCH0-0-r17) for PUSCH is configured, a higher layer parameter enabling multi-TRP PUSCH repetition is configured, a higher layer parameter defining beam mapping pattern is configured either sequential or cyclic mapping and a higher layer parameter defining the number of repetitions for PUSCH is configured or indicated by time domain resource allocation field, Condition 5: if at least one CORESET is configured with more than one TI state through MAC-CE command,
the UE shall transmit PUSCH according to the spatial relations, if applicable, with reference(s) to the RS(s) with 'QCL-TypeD' corresponding to . . . .

Solution 4: the TCI states or the QCL assumptions of the TCI state IDs activated for a CORESET with the lowest index among the CORESETs activated two different TCI states Solution 5: the TCI states or the QCL assumptions of two CORESETs from the lowest index among the CORESETs activated a single TCI state on the active DL BWP of the cell.

If the value configured by a higher layer parameter defining the number of repetitions for PUSCH or indicated by time domain resource allocation field equals to two, the first and second spatial relations are applied to the first and second PUSCH transmissions, respectively.

If the value configured by a higher layer parameter defining the number of repetitions for PUSCH or indicated by time domain resource allocation field is larger than two,
- If a higher layer parameter defining beam mapping pattern is configured with cyclic mapping, the first and second spatial relation are applied to the first and second PUSCH transmissions, respectively, and the same spatial relation mapping pattern continues to the remaining PUSCH transmission occasions.
- If a higher layer parameter defining beam mapping pattern is configured with sequential mapping, the first spatial relation is applied to the first and second PUSCH transmissions, and the second spatial relation is applied to the third and fourth PUSCH transmissions, and the same spatial relation mapping pattern continues to the remaining PUSCH transmission occasions.

Regarding solutions for SFN scheme with two default beams, the above statements are just for example, it can be extended generally considering M number of TRPs, N number of TCIs activated in a CORESET, and P number of PUSCH repetition based on the similar principle.

Non-SFN Scheme with a Single Default Beam
Condition 4 can be one among three as below
- if a higher layer parameter enabling two default beams and two default pathloss reference RSs (e.g., enabletwoDefaultBeamPL-ForPUSCH0-0-r17) for PUSCH is not configured, and a higher layer parameter enabling multi-TRP PUSCH repetition is configured or
- if a higher layer parameter enabling two default beams and two default pathloss reference RSs (e.g., enabletwoDefaultBeamPL-ForPUSCH0-0-r17) for PUSCH is not configured and a higher layer parameter enabling multi-TRP PUSCH repetition is not configured, or
- If a higher layer parameter enabling two default beams and two default pathloss reference RSs (e.g., enabletwoDefaultBeamPL-ForPUSCH0-0-r17) for PUSCH is configured, and a higher layer parameter enabling multi-TRP PUSCH repetition is not configured, Condition 5: if two search space sets are associated and configured by higher layer parameter for PDCCH repetition, Condition 6 can be one among two as below:
- If the UE is not provided coresetPoolIndex value of 1 for any CORESET, or is provided coresetPoolIndex value of 1 for all CORESETs, in ControlResourceSet, or If two CORESETs which each CORESET is associated with two search space sets, respectively, configured by higher layer parameter for PDCCH repetition, are provided different coresetPoolIndex values,
the UE shall transmit PUSCH according to the spatial relation, if applicable, with a reference to the RS with 'QCL-TypeD' corresponding to . . . .
Solution 1: the TCI state or the QCL assumption of a CORESET with the lowest index on the active DL BWP of the cell.
Solution 2: the TCI state or the QCL assumption of the CORESET corresponding to the lowest ID of the search space set among search space sets configured by higher layer parameter for PDCCH repetition on the active DL BWP of the cell.
Solution 3: the TCI state or the QCL assumption of the CORESET with the lowest ID corresponding to the lowest coresetPoolIndex value on the active DL BWP of the cell.

Non-SFN Scheme with Two Default Beams
Condition 4: if a higher layer parameter enabling two default beams and two default pathloss reference RSs (e.g., enabletwoDefaultBeamPL-ForPUSCH0-0-r17) for PUSCH is configured, a higher layer parameter enabling multi-TRP PUSCH repetition is configured, a higher layer parameter defining beam mapping pattern is configured either sequential or cyclic mapping and a higher layer parameter defining the number of repetitions for PUSCH is configured or indicated by time domain resource allocation field,
Condition 5: if two search space sets are associated and configured by higher layer parameter for PDCCH repetition,
Condition 6 can be one among two as below:
If the UE is not provided coresetPoolIndex value of 1 for any CORESET, or is provided coresetPoolIndex value of 1 for all CORESETs, in ControlResourceSet, or
If two CORESETs which each CORESET is associated with two search space sets, respectively, configured by higher layer parameter for PDCCH repetition, are provided different coresetPoolIndex values,
the UE shall transmit PUSCH according to the spatial relations, if applicable, with reference(s) to the RS(s) with 'QCL-TypeD' corresponding to . . .
Solution 4: the TCI states or the QCL assumptions of the TCI state IDs activated for CORESETs associated with two search space sets, respectively, configured by higher layer parameter for PDCCH repetition on the active DL BWP of the cell.
Solution 5: the TCI states or the QCL assumptions of the first two CORESETs, sorted in ascending order using the CORESET ID value among the CORESETs activated a single TCI state on the active DL BWP of the cell.
Solution 6: the TCI states or the QCL assumptions of two CORESETs where each CORESET is with the lowest ID among CORESETs, which are configured with the same value of coresetPoolIndex, on the active DL BWP of the cell.
If the value configured by a higher layer parameter defining the number of repetitions for PUSCH or indicated by time domain resource allocation field equals to two, the first and second spatial relations are applied to the first and second PUSCH transmissions, respectively.

If the value configured by a higher layer parameter defining the number of repetitions for PUSCH or indicated by time domain resource allocation field is larger than two,
If a higher layer parameter defining beam mapping pattern is configured with cyclic mapping, the first and second spatial relation are applied to the first and second PUSCH transmissions, respectively, and the same spatial relation mapping pattern continues to the remaining PUSCH transmission occasions.
If a higher layer parameter defining beam mapping pattern is configured with sequential mapping, the first spatial relation is applied to the first and second PUSCH transmissions, and the second spatial relation is applied to the third and fourth PUSCH transmissions, and the same spatial relation mapping pattern continues to the remaining PUSCH transmission occasions.

Regarding solutions for Non-SFN scheme with two default beams, the above statements are just for example, it can be extended generally considering M number of TRPs, N number of CORESETs which each CORESET is associated with N search space sets, respectively, configured by higher layer parameter for PDCCH repetition, and P number of PUSCH repetition based on the similar principle.

[Scenario 2]
Conditions and solutions for the scenario 2 according to the embodiment of the present disclosure are described below. The conditions described below are for illustrative purpose, and not all conditions have to be satisfied for using the solutions.
For PUSCH scheduled by DCI format 0_0 on a cell and
Condition 1: if the higher layer parameter enableDefaultBeamPL-ForPUSCH0-r16 is set 'enabled',
Condition 2: the UE is configured with PUCCH resources on the active UL BWP where all the PUCCH resource(s) are not configured with any spatial relation and
Condition 3: the UE is in RRC connected mode,
SFN Scheme with Single Default Beam
Condition 4 can be one among three below
if a higher layer parameter enabling two default beams and two default pathloss reference RSs (e.g., enabletwoDefaultBeamPL-ForPUSCH0-0-r17) for PUSCH is not configured, and a higher layer parameter enabling multi-TRP PUSCH repetition is configured or
if a higher layer parameter enabling two default beams and two default pathloss reference RSs (e.g., enabletwoDefaultBeamPL-ForPUSCH0-0-r17) for PUSCH is not configured and a higher layer parameter enabling multi-TRP PUSCH repetition is not configured, or
If a higher layer parameter enabling two default beams and two default pathloss reference RSs (e.g., enabletwoDefaultBeamPL-ForPUSCH0-0-r17) for PUSCH is configured, and a higher layer parameter enabling multi-TRP PUSCH repetition is not configured,
Condition 5: if at least one CORESET is configured with more than one TCI state through MAC-CE command,
the UE shall transmit PUSCH according to the spatial relation, if applicable, with a reference to the RS with 'QCL-TypeD' corresponding to the QCL assumption . . . .

Spatial Relation with Respect to Single TCI:
Solution 1-1: the TCI state or the QCL assumption of the lowest TCI state ID activated for a CORESET with the lowest index among the CORESETs activated two different TCI states on the active DL BWP of the cell in case CORESET(s) are configured on the cell.

Solution 1-2: the TCI state or the QCL assumption of the highest TCI state ID activated for a CORESET with the lowest index among the CORESETs activated two different TCI states on the active DL BWP of the cell in case CORESET(s) are configured on the cell.

Solution 1-3: the TCI state or the QCL assumption of the first TCI state ID activated for a CORESET with the lowest index among the CORESETs activated two different TCI states on the active DL BWP of the cell in case CORESET(s) are configured on the cell.

Solution 1-4: the TCI state or the QCL assumption of the last TCI state ID activated for a CORESET with the lowest index among the CORESETs activated two different TCI states on the active DL BWP of the cell in case CORESET(s) are configured on the cell.

Solution 2: the TCI state or the QCL assumption of a CORESET with the lowest index among the CORESETs activated a single TCI state on the active DL BWP of the cell in case CORESET(s) are configured on the cell.

Spatial Relation with Respect to Multiple TCI:

Solution 3: the QCL assumption of a CORESET with the lowest index, where the QCL assumption is a combination of the QCL parameters corresponding to the TCI states activated for the CORESET among the CORESETs activated two different TCI states on the active DL BWP of the cell in case CORESET(s) are configured on the cell.

SFN Scheme with Two Default Beams

Condition 4: if a higher layer parameter enabling two default beams and two default pathloss reference RSs (e.g., enabletwoDefaultBeamPL-ForPUSCH0-0-r17) for PUSCH is configured, a higher layer parameter enabling multi-TRP PUSCH repetition is configured, a higher layer parameter defining beam mapping pattern is configured either sequential or cyclic mapping and a higher layer parameter defining the number of repetitions for PUSCH is configured or indicated by time domain resource allocation field, Condition 5: if at least one CORESET is configured with more than one TCI state through MAC-CE command, the UE shall transmit PUSCH according to the spatial relations, if applicable, with reference(s) to the RS(s) with 'QCL-TypeD' corresponding to . . . .

Solution 4: the TCI states or the QCL assumptions of the TCI state IDs activated for a CORESET with the lowest index among the CORESETs activated two different TCI states Solution 5: the TCI states or the QCL assumptions of two CORESETs from the lowest index among the CORESETs activated a single TCI state on the active DL BWP of the cell in case CORESET(s) are configured on the cell.

If the value configured by a higher layer parameter defining the number of repetitions for PUSCH or indicated by time domain resource allocation field equals to two, the first and second spatial relations are applied to the first and second PUSCH transmissions, respectively.

If the value configured by a higher layer parameter defining the number of repetitions for PUSCH or indicated by time domain resource allocation field is larger than two, If a higher layer parameter defining beam mapping pattern is configured with cyclic mapping, the first and second spatial relation are applied to the first and second PUSCH transmissions, respectively, and the same spatial relation mapping pattern continues to the remaining PUSCH transmission occasions.

If a higher layer parameter defining beam mapping pattern is configured with sequential mapping, the first spatial relation is applied to the first and second PUSCH transmissions, and the second spatial relation is applied to the third and fourth PUSCH transmissions, and the same spatial relation mapping pattern continues to the remaining PUSCH transmission occasions.

Regarding solutions for SFN scheme with two default beams, the above statements are just for example, it can be extended generally considering M number of TRPs, N number of TCIs activated in a CORESET, and P number of PUSCH repetition based on the similar principle.

Non-SFN Scheme with a Single Default Beam

Condition 4 can be one among three as below if a higher layer parameter enabling two default beams and two default pathloss reference RSs (e.g., enabletwoDefaultBeamPL-ForPUSCH0-0-r17) for PUSCH is not configured, and a higher layer parameter enabling multi-TRP PUSCH repetition is configured or if a higher layer parameter enabling two default beams and two default pathloss reference RSs (e.g., enabletwoDefaultBeamPL-ForPUSCH0-0-r17) for PUSCH is not configured and a higher layer parameter enabling multi-TRP PUSCH repetition is not configured, or If a higher layer parameter enabling two default beams and two default pathloss reference RSs (e.g., enabletwoDefaultBeamPL-ForPUSCH0-0-r17) for PUSCH is configured, and a higher layer parameter enabling multi-TRP PUSCH repetition is not configured, Condition 5: if two search space sets are associated and configured by higher layer parameter for PDCCH repetition, Condition 6 can be one among two as below:

If the UE is not provided coresetPoolIndex value of 1 for any CORESET, or is provided coresetPoolIndex value of 1 for all CORESETs, in ControlResourceSet, or If two CORESETs which each CORESET is associated with two search space sets, respectively, configured by higher layer parameter for PDCCH repetition, are provided different coresetPoolIndex values, the UE shall transmit PUSCH according to the spatial relation, if applicable, with a reference to the RS with 'QCL-TypeD' corresponding to . . . .

Solution 1: the TCI state or the QCL assumption of a CORESET with the lowest index on the active DL BWP of the cell in case CORESET(s) are configured on the cell.

Solution 2: the TCI state or the QCL assumption of the CORESET corresponding to the lowest ID of the search space set among search space sets configured by higher layer parameter for PDCCH repetition on the active DL BWP of the cell in case CORESET(s) are configured on the cell.

Solution 3: the TCI state or the QCL assumption of the CORESET with the lowest ID corresponding to the lowest coresetPoolIndex value on the active DL BWP of the cell in case CORESET(s) are configured on the cell.

Non-SFN Scheme with Two Default Beams

Condition 4: if a higher layer parameter enabling two default beams and two default pathloss reference RSs (e.g., enabletwoDefaultBeamPL-ForPUSCH0-0-r17) for PUSCH is configured, a higher layer parameter enabling multi-TRP PUSCH repetition is configured, a higher layer parameter defining beam mapping pattern is configured either sequential or cyclic mapping and a higher layer parameter defining the number of repetitions for PUSCH is configured or indicated by time domain resource allocation field, Condition 5: if two search space sets are associated and configured by higher layer parameter for PDCCH repetition, Condition 6 can be one among two as below:
  If the UE is not provided coresetPoolIndex value of 1 for any CORESET, or is provided coresetPoolIndex value of 1 for all CORESETs, in ControlResourceSet, or
  If two CORESETs which each CORESET is associated with two search space sets, respectively, configured by higher layer parameter for PDCCH repetition, are provided different coresetPoolIndex values, the UE shall transmit PUSCH according to the spatial relations, if applicable, with reference(s) to the RS(s) with 'QCL-TypeD' corresponding to . . . .
  Solution 4: the TCI states or the QCL assumptions of the TCI state IDs activated for CORESETs associated with two search space sets, respectively, configured by higher layer parameter for PDCCH repetition on the active DL BWP of the cell in case CORESET(s) are configured on the cell.
  Solution 5: the TCI states or the QCL assumptions of the first two CORESETs, sorted in ascending order using the CORESET ID value among the CORESETs activated a single TCI state on the active DL BWP of the cell in case CORESET(s) are configured on the cell.
  Solution 6: the TCI states or the QCL assumptions of two CORESETs where each CORESET is with the lowest ID among CORESETs, which are configured with the same value of coresetPoolIndex, on the active DL BWP of the cell in case CORESET(s) are configured on the cell.

If the value configured by a higher layer parameter defining the number of repetitions for PUSCH or indicated by time domain resource allocation field equals to two, the first and second spatial relations are applied to the first and second PUSCH transmissions, respectively.

If the value configured by a higher layer parameter defining the number of repetitions for PUSCH or indicated by time domain resource allocation field is larger than two,
  If a higher layer parameter defining beam mapping pattern is configured with cyclic mapping, the first and second spatial relation are applied to the first and second PUSCH transmissions, respectively, and the same spatial relation mapping pattern continues to the remaining PUSCH transmission occasions.
  If a higher layer parameter defining beam mapping pattern is configured with sequential mapping, the first spatial relation is applied to the first and second PUSCH transmissions, and the second spatial relation is applied to the third and fourth PUSCH transmissions, and the same spatial relation mapping pattern continues to the remaining PUSCH transmission occasions.

Regarding solutions for Non-SFN scheme with two default beams, the above statements are just for example, it can be extended generally considering M number of TRPs, N number of CORESETs which each CORESET is associated with N search space sets, respectively, configured by higher layer parameter for PDCCH repetition, and P number of PUSCH repetition based on the similar principle.

Figure 9A:
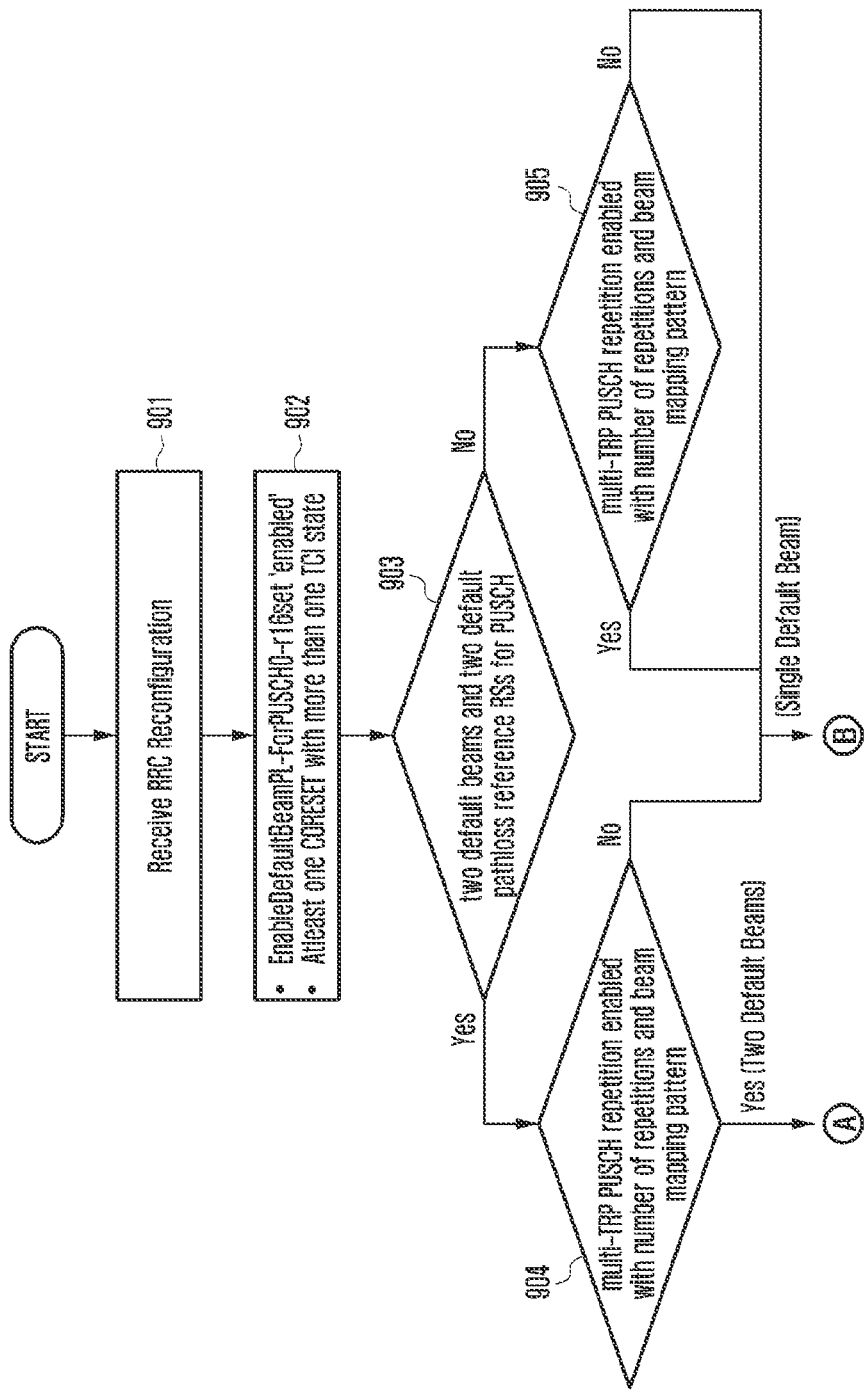
FIGS. 9a and 9b illustrate a flow chart for SFN scheme of scenario 1 and scenario 2 according to an embodiment of the disclosure.
Figure 9B:
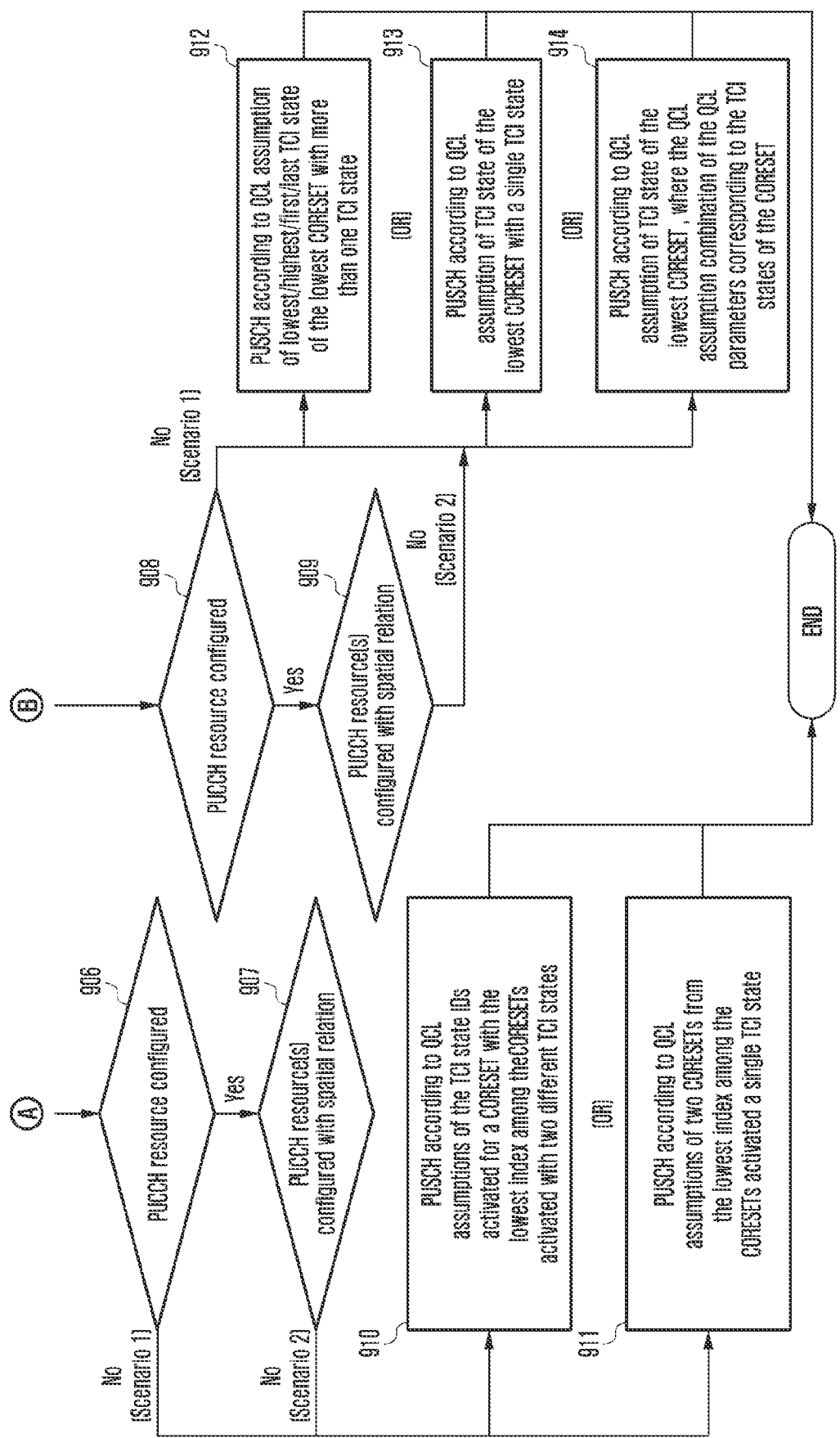

FIGS. 9a and 9b illustrate a flow chart for SFN scheme of scenario 1 and scenario 2 according to an embodiment of the disclosure.

Referring to FIGS. 9a and 9b, in step 901, UE receives RRC reconfiguration message from a base station. In an embodiment of the disclosure, the higher layer parameter enableDefaultBeamPL-ForPUSCH0-r16 is set 'enabled', and for SFN scheme of scenario 1 and scenario 2, at least one CORESET is configured with more than one TCI states (902).

If two default beams and two default pathloss reference RSs for PUSCH is configured (903), multi-TRP PUSCH repetition is enabled (904), and the UE is not configured with PUCCH resources on the active UL BWP (906), the UE transmits PUSCH according to the spatial relation with a reference to the RS with 'QCL-typeD' corresponding to the TCI states or the QCL assumptions of the TCI states IDs activated for a CORESET with the lowest index among the CORESETs activated with two difference TCI states (910), or of two CORESETs from the lowest index among the CORESETs activated a single TCI state (911).

If two default beams and two default pathloss reference RSs for PUSCH is configured (903), multi-TRP PUSCH repetition is enabled (904), and the UE is configured with PUCCH on the active UL BWP (906) where all the PUCCH resources are not configured with any spatial relation (907), the UE transmits PUSCH according to the spatial relation with a reference to the RS with 'QCL-typeD' corresponding to the TCI states or the QCL assumptions of the TCI states IDs activated for a CORESET with the lowest index among the CORESETs activated with two difference TCI states (910), or of two CORESETs from the lowest index among the CORESETs activated a single TCI state (911).

If two default beams and two default pathloss reference RSs for PUSCH is configured (903), multi-TRP PUSCH repetition is not enabled (904), and the UE is not configured with PUCCH resources on the active UL BWP (908), the UE transmits PUSCH according to the spatial relation with a reference to the RS with 'QCL-typeD' corresponding to the TCI state or the QCL assumption of lowest/highest/first/last TCI state of the lowest CORESET with more than one TCI states (912), or of TCI state of the lowest CORESET with a single TCI state (913), or of TCI state of the lowest CORESET where the QCL assumption is combination of the QCL parameters corresponding to the TCI states of the CORESET (914).

If two default beams and two default pathloss reference RSs for PUSCH is configured (903), multi-TRP PUSCH repetition is not enabled (904), and the UE is configured with PUCCH on the active UL BWP (908) where all the PUCCH resources are not configured with any spatial relation (909), the UE transmits PUSCH according to the spatial relation with a reference to the RS with 'QCL-typeD' corresponding to the TCI state or the QCL assumption of lowest/highest/first/last TCI state of the lowest CORESET with more than one TCI states (912), or of TCI state of the lowest CORESET with a single TCI state (913), or of TCI state of the lowest CORESET where the QCL assumption is combination of the QCL parameters corresponding to the TCI states of the CORESET (914).

If two default beams and two default pathloss reference RSs for PUSCH is not configured (903), multi-TRP PUSCH repetition is enabled (905), and the UE is not configured with PUCCH resources on an active UL BWP (908), the UE transmits PUSCH according to the spatial relation with a reference to the RS with 'QCL-typeD' corresponding to the TCI state or the QCL assumption of lowest/highest/first/last TCI state of the lowest CORESET with more than one TCI states (912), or of TCI state of the lowest CORESET with a single TCI state (913), or of TCI state of the lowest CORESET where the QCL assumption is combination of the QCL parameters corresponding to the TCI states of the CORESET (914).

If two default beams and two default pathloss reference RSs for PUSCH is not configured (903), multi-TRP PUSCH repetition is enabled (905), and the UE is configured with PUCCH on the active UL BWP (908) where all the PUCCH resources are not configured with any spatial relation (909), the UE transmits PUSCH according to the spatial relation with a reference to the RS with 'QCL-typeD' corresponding to the TCI state or the QCL assumption of lowest/highest/first/last TCI state of the lowest CORESET with more than one TCI states (912), or of TCI state of the lowest CORESET with a single TCI state (913), or of TCI state of the lowest CORESET where the QCL assumption is combination of the QCL parameters corresponding to the TCI states of the CORESET (914).

If two default beams and two default pathloss reference RSs for PUSCH is not configured (903), multi-TRP PUSCH repetition is not enabled (905), and the UE is not configured with PUCCH resources on an active UL BWP (908), the UE transmits PUSCH according to the spatial relation with a reference to the RS with 'QCL-typeD' corresponding to the TCI state or the QCL assumption of lowest/highest/first/last TCI state of the lowest CORESET with more than one TCI states (912), or of TCI state of the lowest CORESET with a single TCI state (913), or of TCI state of the lowest CORESET where the QCL assumption is combination of the QCL parameters corresponding to the TCI states of the CORESET (914).

If two default beams and two default pathloss reference RSs for PUSCH is not configured (903), multi-TRP PUSCH repetition is not enabled (905), and the UE is configured with PUCCH on the active UL BWP (908) where all the PUCCH resources are not configured with any spatial relation (909), the UE transmits PUSCH according to the spatial relation with a reference to the RS with 'QCL-typeD' corresponding to the TCI state or the QCL assumption of lowest/highest/first/last TCI state of the lowest CORESET with more than one TCI states (912), or of TCI state of the lowest CORESET with a single TCI state (913), or of TCI state of the lowest CORESET where the QCL assumption is combination of the QCL parameters corresponding to the TCI states of the CORESET (914).

Figure 10A:
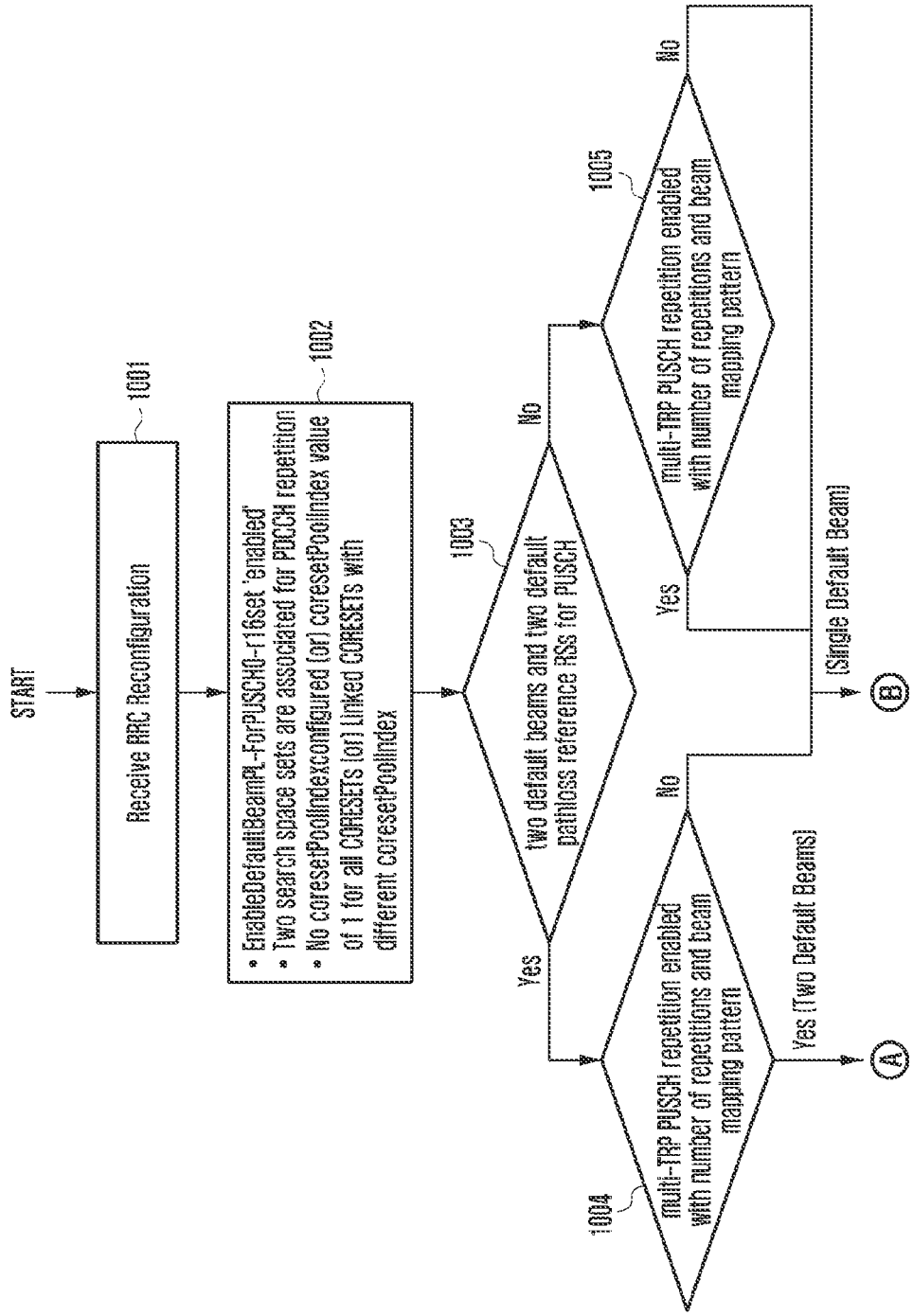
FIGS. 10a and 10b illustrate a flow chart for non-SFN scheme of scenario 1 and scenario 2 according to an embodiment of the disclosure.
Figure 10B:
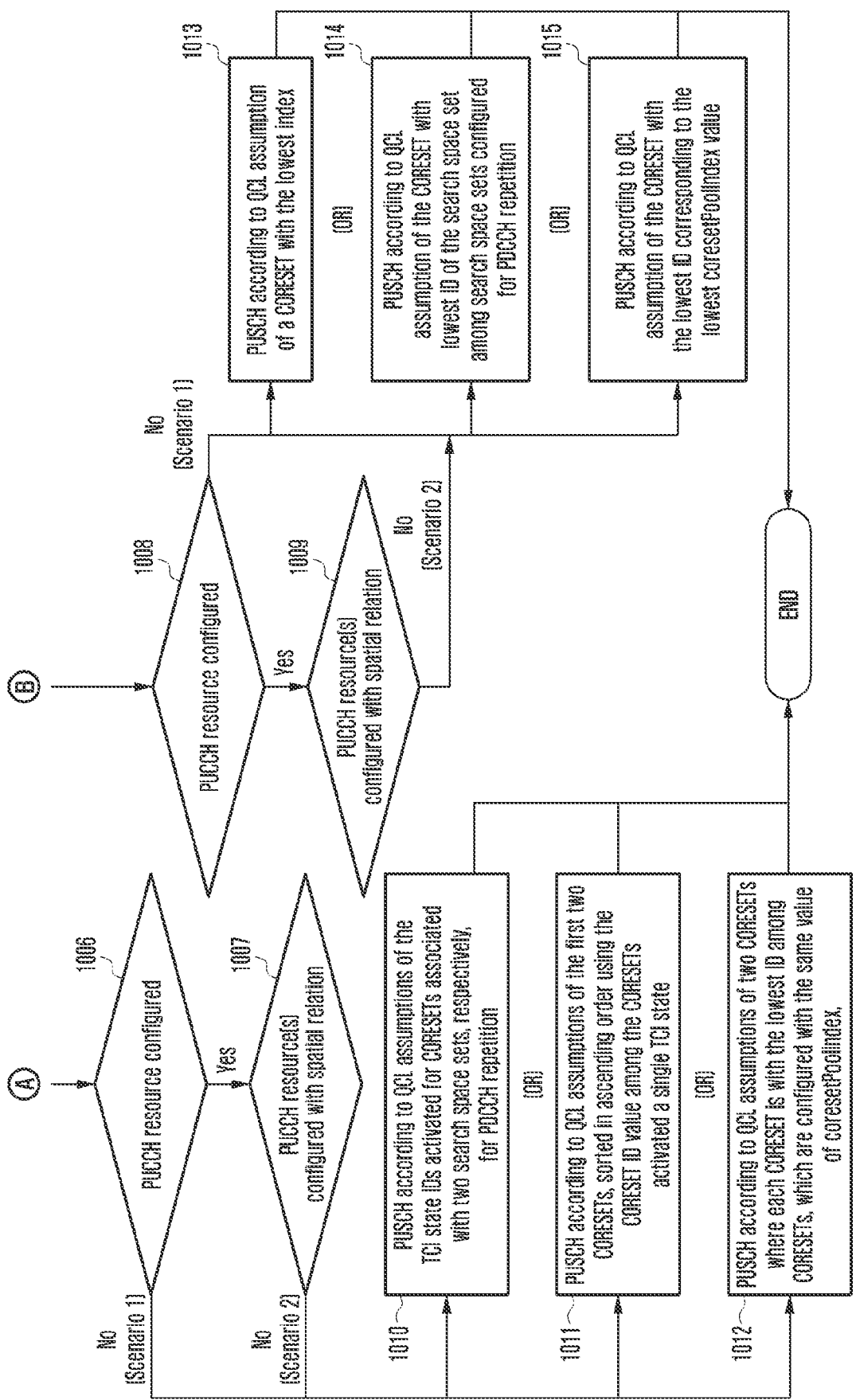

FIGS. 10*a* and 10*b* illustrate a flow chart for non-SFN scheme of scenario 1 and scenario 2 according to an embodiment of the disclosure.

Referring to FIGS. 10*a* and 10*b*, in step 1001, UE receives RRC reconfiguration message from a base station. In an embodiment of the disclosure, the higher layer parameter enableDefaultBeamPL-ForPUSCH0-r16 is set 'enabled', and for non-SFN scheme of scenario 1 and scenario 2, two search space sets are associated for PDCCH repetition (1002). The UE is not provided coresetPoolIndex value of 1, or is provided coresetPoolIndex value of 1 for all CORESETS, or two CORESETs which each CORESET is associated with two search space sets, are provided different coresetPoolIndex values (1002).

If two default beams and two default pathloss reference RSs for PUSCH is configured (1003), multi-TRP PUSCH repetition is enabled (1004), and the UE is not configured with PUCCH resources on the active UL BWP (1006), the UE transmits PUSCH according to the spatial relation with a reference to the RS with 'QCL-typeD' corresponding to the TCI state states or the QCL assumptions of the TCI states IDs activated for CORESETs associated with two search spaces sets, respectively, for PDCCH repetition (1010), or of the first two CORESETs, sorted in ascending order using the CORESET ID value among the CORESETs activated a single TCI state, (1011), or of two CORESETs where each CORESET is with the lowest ID among CORESETs, which are configured with the same value of coresetPoolIndex (1012).

If two default beams and two default pathloss reference RSs for PUSCH is configured (1003), multi-TRP PUSCH repetition is enabled (1004), and the UE is configured with PUCCH on the active UL BWP (1006) where all the PUCCH resources are not configured with any spatial relation (1007), the UE transmits PUSCH according to the spatial relation with a reference to the RS with 'QCL-typeD' corresponding to the TCI state states or the QCL assumptions of the TCI states IDs activated for CORESETs associated with two search spaces sets, respectively, for PDCCH repetition (1010), or of the first two CORESETs, sorted in ascending order using the CORESET ID value among the CORESETs activated a single TCI state, (1011), or of two CORESETs where each CORESET is with the lowest ID among CORESETs, which are configured with the same value of coresetPoolIndex (1012).

If two default beams and two default pathloss reference RSs for PUSCH is configured (1003), multi-TRP PUSCH repetition is not enabled (1004), and the UE is not configured with PUCCH resources on the active UL BWP (1008), the UE transmits PUSCH according to the spatial relation with a reference to the RS with 'QCL-typeD' corresponding to the TCI state or the QCL assumption of a CORESET with the lowest index (1013), or of the CORESET with lowest ID of the search space set among search space sets configured for PDCCH repetition (1014), or of the CORESET with the lowest ID corresponding to the lowest coresetPoolIndex value (1015).

If two default beams and two default pathloss reference RSs for PUSCH is configured (1003), multi-TRP PUSCH repetition is not enabled (1004), and the UE is configured with PUCCH on the active UL BWP (1008) where all the PUCCH resources are not configured with any spatial relation (1009), the UE transmits PUSCH according to the spatial relation with a reference to the RS with 'QCL-typeD' corresponding to the TCI state or the QCL assumption of a CORESET with the lowest index (1013), or of the CORESET with lowest ID of the search space set among search space sets configured for PDCCH repetition (1014), or of the CORESET with the lowest ID corresponding to the lowest coresetPoolIndex value (1015).

If two default beams and two default pathloss reference RSs for PUSCH is not configured (1003), multi-TRP PUSCH repetition is enabled (1005), and the UE is not configured with PUCCH resources on the active UL BWP (1008), the UE transmits PUSCH according to the spatial relation with a reference to the RS with 'QCL-typeD' corresponding to the TCI state or the QCL assumption of a CORESET with the lowest index (1013), or of the CORESET with lowest ID of the search space set among search space sets configured for PDCCH repetition (1014), or of the CORESET with the lowest ID corresponding to the lowest coresetPoolIndex value (1015).

If two default beams and two default pathloss reference RSs for PUSCH is not configured (1003), multi-TRP PUSCH repetition is enabled (1005), and the UE is configured with PUCCH on the active UL BWP (1008) where all the PUCCH resources are not configured with any spatial relation (1009), the UE transmits PUSCH according to the spatial relation with a reference to the RS with 'QCL-typeD' corresponding to the TCI state or the QCL assumption of a CORESET with the lowest index (1013), or of the CORESET with lowest ID of the search space set among search space sets configured for PDCCH repetition (1014), or of the CORESET with the lowest ID corresponding to the lowest coresetPoolIndex value (1015).

If two default beams and two default pathloss reference RSs for PUSCH is not configured (1003), multi-TRP PUSCH repetition is not enabled (1005), and the UE is not configured with PUCCH resources on the active UL BWP (1008), the UE transmits PUSCH according to the spatial relation with a reference to the RS with 'QCL-typeD' corresponding to the TCI state or the QCL assumption of a CORESET with the lowest index (1013), or of the CORESET with lowest ID of the search space set among search space sets configured for PDCCH repetition (1014), or of the CORESET with the lowest ID corresponding to the lowest coresetPoolIndex value (1015).

If two default beams and two default pathloss reference RSs for PUSCH is not configured (1003), multi-TRP PUSCH repetition is not enabled (1005), and the UE is configured with PUCCH on the active UL BWP (1008) where all the PUCCH resources are not configured with any spatial relation (1009), the UE transmits PUSCH according to the spatial relation with a reference to the RS with 'QCL-typeD' corresponding to the TCI state or the QCL assumption of a CORESET with the lowest index (1013), or of the CORESET with lowest ID of the search space set among search space sets configured for PDCCH repetition (1014), or of the CORESET with the lowest ID corresponding to the lowest coresetPoolIndex value (1015).

Figure 11:
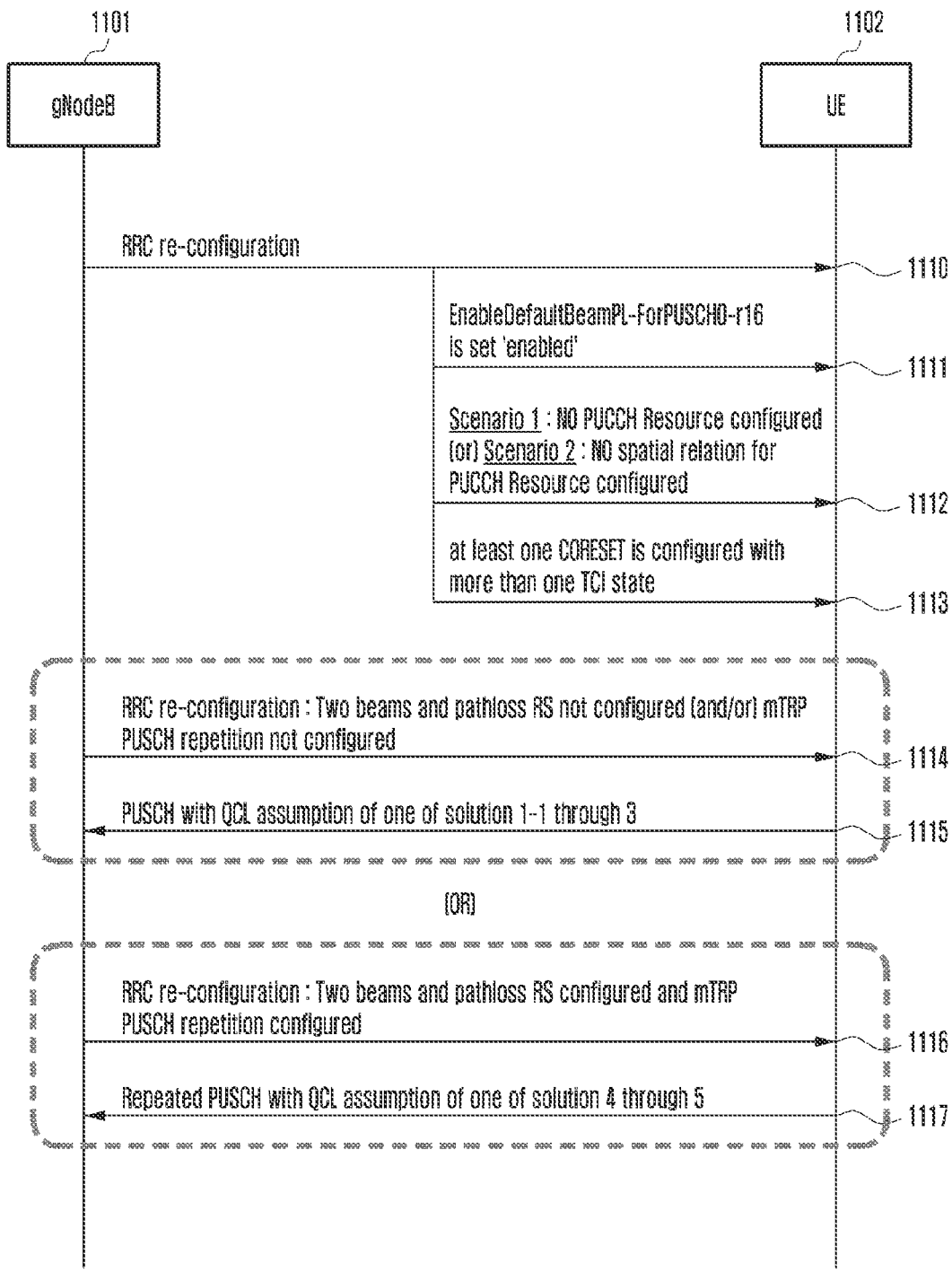
FIG. 11 is a flow chart illustrating an operation of an user equipment (UE) and a base station for SFN scheme of scenario 1 and scenario 2 according to an embodiment of the disclosure.

FIG. 11 is a flow chart illustrating an operation of an user equipment (UE) and a base station for SFN scheme of scenario 1 and scenario 2 according to an embodiment of the disclosure.

Referring FIG. 11, the UE (1102) receives from the base station (1101) the RRC reconfiguration message (1110). In an embodiment of the disclosure, the higher layer parameter EnableDefaultBeamPL-ForPUSCH0-r16 enabling default beam and pathloss reference RS is set to 'enabled' (1111). In an embodiment of the disclosure, the UE is not configured with PUCCH resources on the active UL BWP (scenario 1), or the UE is configured with PUCCH on the active UL BWP where all the PUCCH resources are not configured with any spatial relation (scenario 2) (1112). In an embodiment of the disclosure, at least one at least one CORESET is configured with more than one TCI states (1113). If two default beams and two default pathloss reference RSs for PUSCH is not configured and/or the multi-TRP PUSCH repetition is not configured (1114) to the UE, the UE transmits PUSCH with QCL assumption of one of solution 1-1 through solution 3 for scenario 1 or scenario 2 (1115). If two default beams and two default pathloss reference RSs for PUSCH is configured and the multi-TRP PUSCH repetition is configured (1116) to the UE, the UE transmits PUSCH with QCL assumption of one of solution 4 through 5 for scenario 1 or scenario 2 (1117).

Figure 12:
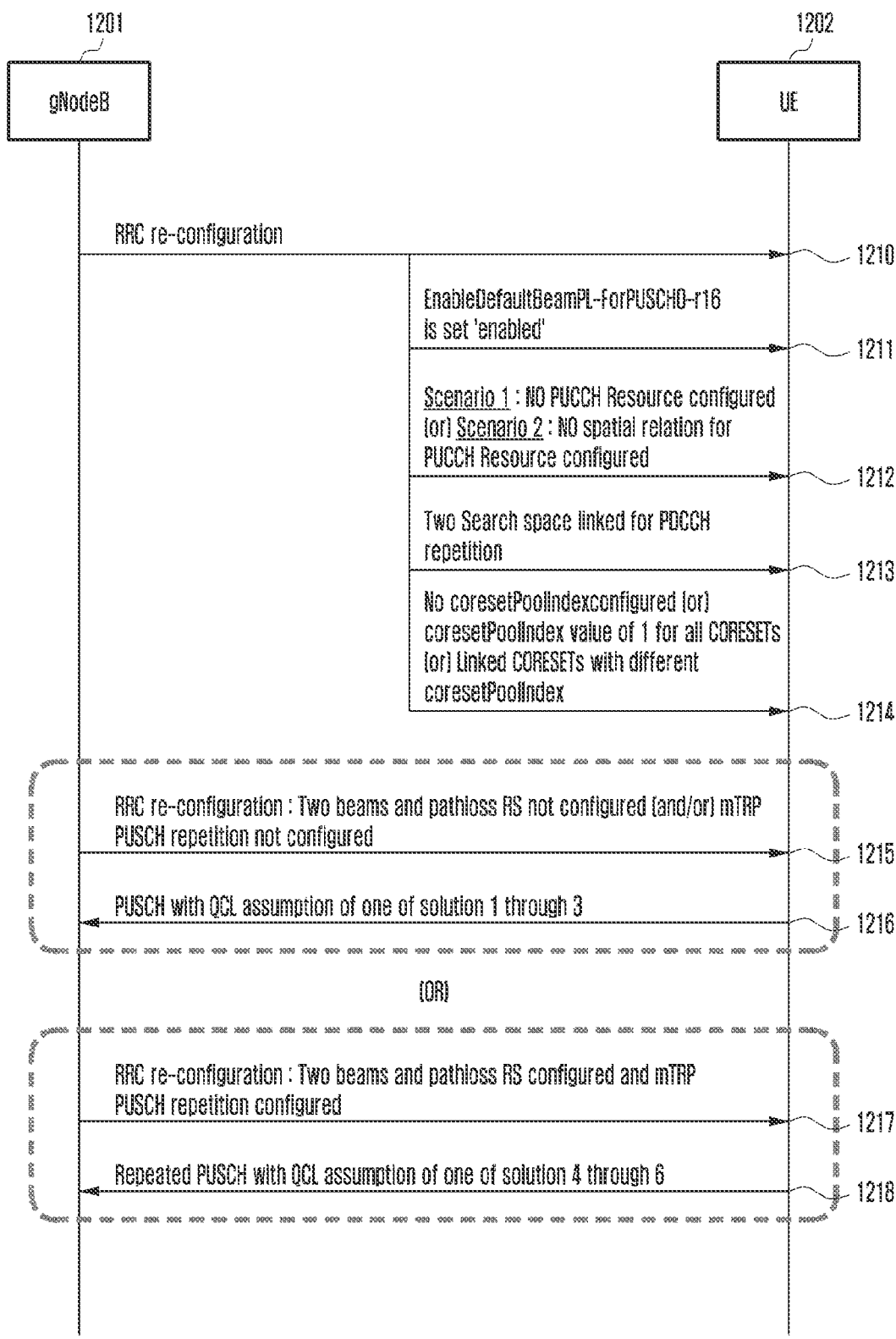
FIG. 12 is a flow chart illustrating an operation of an user equipment (UE) and a base station for non-SFN scheme of scenario 1 and scenario 2 according to an embodiment of the disclosure.

FIG. 12 is a flow chart illustrating an operation of an user equipment (UE) and a base station for non-SFN scheme of scenario 1 and scenario 2 according to an embodiment of the disclosure.

Referring FIG. 12, the UE (1202) receives from the base station (1201) the RRC reconfiguration message (1210). In an embodiment of the disclosure, the higher layer parameter EnableDefaultBeamPL-ForPUSCH0-r16 enabling default beam and pathloss reference RS is set to 'enabled' (1211). In an embodiment of the disclosure, the UE is not configured with PUCCH resources on the active UL BWP (scenario 1), or the UE is configured with PUCCH on the active UL BWP where all the PUCCH resources are not configured with any spatial relation (scenario 2) (1212). In an embodiment of the disclosure, two search space sets are associated for PDCCH repetition (1213). In an embodiment of the disclosure, the UE is not provided coresetPoolIndex value of 1, or is provided coresetPoolIndex value of 1 for all CORESETS, or two CORESETs which each CORESET is associated with two search space sets, are provided different coresetPoolIndex values (1214). If two default beams and two default pathloss reference RSs for PUSCH is not configured and/or the multi-TRP PUSCH repetition is not configured (1215) to the UE, the UE transmits PUSCH with QCL assumption of one of solution 1 through solution 3 for scenario 1 or scenario 2 (1216). If two default beams and two default pathloss reference RSs for PUSCH is configured and the multi-TRP PUSCH repetition is configured (1217) to the UE, the UE transmits PUSCH with QCL assumption of one of solution 4 through 6 for scenario 1 or scenario 2 (1218).

[Scenario 3]

Conditions and solutions for the scenario 3 according to the embodiment of the present disclosure are described below. The conditions described below are for illustrative purpose, and not all conditions have to be satisfied for using the solutions.

If
   Condition 1: the PUSCH transmission is scheduled by DCI format 0_0 on serving cell c,
   Condition 2: the UE is not provided PUCCH resources for the active UL BWP of serving cell c, and
   Condition 3: the UE is provided enableDefaultBeamPL-ForPUSCH0-r16

SFN Scheme with a Single Default Pathloss Reference RS, $q_d$

Condition 4 can be one among three below
     if a higher layer parameter enabling two default beams and two default pathloss reference RSs (e.g., enabletwoDefaultBeamPL-ForPUSCH0-0-r17) for PUSCH is not configured, and a higher layer parameter enabling multi-TRP PUSCH repetition is configured or
     if a higher layer parameter enabling two default beams and two default pathloss reference RSs (e.g., enabletwoDefaultBeamPL-ForPUSCH0-0-r17) for PUSCH is not configured and a higher layer parameter enabling multi-TRP PUSCH repetition is not configured, or
     If a higher layer parameter enabling two default beams and two default pathloss reference RSs (e.g., enabletwoDefaultBeamPL-ForPUSCH0-0-r17) for PUSCH is configured, and a higher layer parameter enabling multi-TRP PUSCH repetition is not configured,
   Condition 5: if at least one CORESET is configured with more than one TCI state through MAC-CE command, the UE determines a RS resource index $q_d$ providing a periodic RS resource with 'QCL-TypeD' in . . .

Spatial Relation with Respect to Single TCI:
   Solution 1-1: the TCI state or the QCL assumption of the lowest TCI state ID activated for a CORESET with the lowest index among the CORESETs activated two different TCI states on the active DL BWP of the cell.
   Solution 1-2: the TCI state or the QCL assumption of the highest TCI state ID activated for a CORESET with the lowest index among the CORESETs activated two different TCI states on the active DL BWP of the cell.

Solution 1-3: the TCI state or the QCL assumption of the first TCI state ID activated for a CORESET with the lowest index among the CORESETs activated two different TCI states on the active DL BWP of the cell.

Solution 1-4: the TCI state or the QCL assumption of the last TCI state ID activated for a CORESET with the lowest index among the CORESETs activated two different TCI states on the active DL BWP of the cell.

Solution 2: the TCI state or the QCL assumption of a CORESET with the lowest index among the CORESETs activated a single TCI state on the active DL BWP of the cell.

Spatial Relation with Respect to Multiple TCI:

Solution 3: the QCL assumption of a CORESET with the lowest index, where the QCL assumption is a combination of the QCL parameters corresponding to the TCI states activated for the CORESET among the CORESETs activated two different TCI states on the active DL BWP of the cell.

SFN Scheme with Two Default Pathloss Reference RSs, $q_d$

Condition 4: if a higher layer parameter enabling two default beams and two default pathloss reference RSs (e.g., enabletwoDefaultBeamPL-ForPUSCH0-0-r17) for PUSCH is configured and a higher layer parameter enabling multi-TRP PUSCH repetition is configured Condition 5: if at least one CORESET is configured with more than one TCI state through MAC-CE command, the UE determines RS resource indexes $q_d$ providing periodic RS resources with 'QCL-TypeD' in . . .

Solution 4: the TCI states or the QCL assumptions of the TCI state IDs activated for a CORESET with the lowest index among the CORESETs activated two different TCI states Solution 5: the TCI states or the QCL assumptions of two CORESETs from the lowest index among the CORESETs activated a single TCI state on the active DL BWP of the cell.

Regarding solutions for SFN scheme with two default pathloss reference RSs, the above statements are just for example, it can be extended generally considering M number of TRPs and N number of CIs activated in a CORESET based on the similar principle.

Non-SFN Scheme with a Single Default Beam

Condition 4 can be one among three as below if a higher layer parameter enabling two default beams and two default pathloss reference RSs (e.g., enabletwoDefaultBeamPL-ForPUSCH0-0-r17) for PUSCH is not configured, and a higher layer parameter enabling multi-TRP PUSCH repetition is configured or if a higher layer parameter enabling two default beams and two default pathloss reference RSs (e.g., enabletwoDefaultBeamPL-ForPUSCH0-0-r17) for PUSCH is not configured and a higher layer parameter enabling multi-TRP PUSCH repetition is not configured, or If a higher layer parameter enabling two default beams and two default pathloss reference RSs (e.g., enabletwoDefaultBeamPL-ForPUSCH0-0-r17) for PUSCH is configured, and a higher layer parameter enabling multi-TRP PUSCH repetition is not configured, Condition 5: if two search space sets are associated and configured by higher layer parameter for PDCCH repetition, Condition 6 can be one among two as below:

If the UE is not provided coresetPoolIndex value of 1 for any CORESET, or is provided coresetPoolIndex value of 1 for all CORESETs, in ControlResourceSet, or If two CORESETs which each CORESET is associated with two search space sets, respectively, configured by higher layer parameter for PDCCH repetition, are provided different coresetPoolIndex values, the UE determines a RS resource index $q_d$ providing a periodic RS resource with 'QCL-TypeD' in . . .

Solution 1: the TCI state or the QCL assumption of a CORESET with the lowest index on the active DL BWP of the cell.

Solution 2: the TCI state or the QCL assumption of the CORESET corresponding to the lowest ID of the search space set among search space sets configured by higher layer parameter for PDCCH repetition on the active DL BWP of the cell.

Solution 3: the TCI state or the QCL assumption of the CORESET with the lowest ID corresponding to the lowest coresetPoolIndex value on the active DL BWP of the cell.

Non-SFN Scheme with Two Default Pathloss Reference RSs, $q_d$

Condition 4: if a higher layer parameter enabling two default beams and two default pathloss reference RSs (e.g., enabletwoDefaultBeamPL-ForPUSCH0-0-r17) for PUSCH is configured and a higher layer parameter enabling multi-TRP PUSCH repetition is configured Condition 5: if two search space sets are associated and configured by higher layer parameter for PDCCH repetition, Condition 6 can be one among two as below:

If the UE is not provided coresetPoolIndex value of 1 for any CORESET, or is provided coresetPoolIndex value of 1 for all CORESETs, in ControlResourceSet, or If two CORESETs which each CORESET is associated with two search space sets, respectively, configured by higher layer parameter for PDCCH repetition, are provided different coresetPoolIndex values, the UE determines RS resource indexes $q_d$ providing periodic RS resources with 'QCL-TypeD' in . . .

Solution 4: the TCI states or the QCL assumptions of the TCI state IDs activated for CORESETs associated with two search space sets, respectively, configured by higher layer parameter for PDCCH repetition on the active DL BWP of the cell.

Solution 5: the TCI states or the QCL assumptions of the first two CORESETs, sorted in ascending order using the CORESET ID value among the CORESETs activated a single TCI state on the active DL BWP of the cell.

Solution 6: the TCI states or the QCL assumptions of two CORESETs where each CORESET is with the lowest ID among CORESETs, which are configured with the same value of coresetPoolIndex, on the active DL BWP of the cell.

Regarding solutions for Non-SFN scheme with two default pathloss reference RSs, the above statements are just for example, it can be extended generally considering M number of TRPs and N number of CORESETs which each CORESET is associated with N search space sets, respectively, configured by higher layer parameter for PDCCH repetition based on the similar principle.

[Scenario 4]

Conditions and solutions for the scenario 4 according to the embodiment of the present disclosure are described below. The conditions described below are for illustrative purpose, and not all conditions have to be satisfied for using the solutions.

If
- Condition 1: the PUSCH transmission is scheduled by DCI format 0_0 on serving cell,
- Condition 2: the UE is not provided a spatial setting for PUCCH resources on the active UL BWP of the primary cell [11, TS 38.321], and
- Condition 3: the UE is provided enableDefaultBeamPL-ForPUSCH0-r16

SFN Scheme with a Single Default Pathloss Reference RS, $q_d$
- Condition 4 can be one among three below
  - if a higher layer parameter enabling two default beams and two default pathloss reference RSs (e.g., enabletwoDefaultBeamPL-ForPUSCH0-0-r17) for PUSCH is not configured, and a higher layer parameter enabling multi-TRP PUSCH repetition is configured or
  - if a higher layer parameter enabling two default beams and two default pathloss reference RSs (e.g., enabletwoDefaultBeamPL-ForPUSCH0-0-r17) for PUSCH is not configured and a higher layer parameter enabling multi-TRP PUSCH repetition is not configured, or
  - If a higher layer parameter enabling two default beams and two default pathloss reference RSs (e.g., enabletwoDefaultBeamPL-ForPUSCH0-0-r17) for PUSCH is configured, and a higher layer parameter enabling multi-TRP PUSCH repetition is not configured,
- Condition 5: if at least one CORESET is configured with more than one TCI state through MAC-CE command,
- the UE determines a RS resource index $q_d$ providing a periodic RS resource with 'QCL-TypeD' in . . .

Spatial Relation with Respect to Single TCI:
- Solution 1-1: the TCI state or the QCL assumption of the lowest TCI state ID activated for a CORESET with the lowest index among the CORESETs activated two different TCI states on the active DL BWP of the cell.
- Solution 1-2: the TCI state or the QCL assumption of the highest TCI state ID activated for a CORESET with the lowest index among the CORESETs activated two different TCI states on the active DL BWP of the cell.
- Solution 1-3: the TCI state or the QCL assumption of the first TCI state ID activated for a CORESET with the lowest index among the CORESETs activated two different TCI states on the active DL BWP of the cell.
- Solution 1-4: the TCI state or the QCL assumption of the last TCI state ID activated for a CORESET with the lowest index among the CORESETs activated two different TCI states on the active DL BWP of the cell.
- Solution 2: the TCI state or the QCL assumption of a CORESET with the lowest index among the CORESETs activated a single TCI state on the active DL BWP of the cell.

Spatial Relation with Respect to Multiple TCI:
- Solution 3: the QCL assumption of a CORESET with the lowest index, where the QCL assumption is a combination of the QCL parameters corresponding to the TCI states activated for the CORESET among the CORESETs activated two different TCI states on the active DL BWP of the cell.

SFN Scheme with two default pathloss reference RSs, $q_d$
- Condition 4: if a higher layer parameter enabling two default beams and two default pathloss reference RSs (e.g., enabletwoDefaultBeamPL-ForPUSCH0-0-r17) for PUSCH is configured and a higher layer parameter enabling multi-TRP PUSCH repetition is configured,
- Condition 5: if at least one CORESET is configured with more than one TCI state through MAC-CE command,
- the UE determines RS resource indexes $q_d$ providing periodic RS resources with 'QCL-TypeD' in . . .
- Solution 4: the TCI states or the QCL assumptions of the TCI state IDs activated for a CORESET with the lowest index among the CORESETs activated two different TCI states
- Solution 5: the TCI states or the QCL assumptions of two CORESETs from the lowest index among the CORESETs activated a single TCI state on the active DL BWP of the cell.

Regarding solutions for SFN scheme with two default pathloss reference RSs, the above statements are just for example, it can be extended generally considering M number of TRPs and N number of CIs activated in a CORESET based on the similar principle.

Non-SFN Scheme with a Single Default Pathloss Reference RS, $q_d$
- Condition 4 can be one among three as below
  - if a higher layer parameter enabling two default beams and two default pathloss reference RSs (e.g., enabletwoDefaultBeamPL-ForPUSCH0-0-r17) for PUSCH is not configured, and a higher layer parameter enabling multi-TRP PUSCH repetition is configured or
  - if a higher layer parameter enabling two default beams and two default pathloss reference RSs (e.g., enabletwoDefaultBeamPL-ForPUSCH0-0-r17) for PUSCH is not configured and a higher layer parameter enabling multi-TRP PUSCH repetition is not configured, or
  - If a higher layer parameter enabling two default beams and two default pathloss reference RSs (e.g., enabletwoDefaultBeamPL-ForPUSCH0-0-r17) for PUSCH is configured, and a higher layer parameter enabling multi-TRP PUSCH repetition is not configured,
- Condition 5: if two search space sets are associated and configured by higher layer parameter for PDCCH repetition,
- Condition 6 can be one among two as below:
  - If the UE is not provided coresetPoolIndex value of 1 for any CORESET, or is provided coresetPoolIndex value of 1 for all CORESETs, in ControlResourceSet, or
  - If two CORESETs which each CORESET is associated with two search space sets, respectively, configured by higher layer parameter for PDCCH repetition, are provided different coresetPoolIndex values,
- the UE determines a RS resource index $q_d$ providing a periodic RS resource with 'QCL-TypeD' in . . .
- Solution 1: the TCI state or the QCL assumption of a CORESET with the lowest index on the active DL BWP of the cell.
- Solution 2: the TCI state or the QCL assumption of the CORESET corresponding to the lowest ID of the search space set among search space sets configured by higher layer parameter for PDCCH repetition on the active DL BWP of the cell.

Solution 3: the TCI state or the QCL assumption of the CORESET with the lowest ID corresponding to the lowest coresetPoolIndex value on the active DL BWP of the cell.

Non-SFN Scheme with Two Default Pathloss Reference RSs, $q_d$

Condition 4: if a higher layer parameter enabling two default beams and two default pathloss reference RSs (e.g., enabletwoDefaultBeamPL-ForPUSCH0-0-r17) for PUSCH is configured and a higher layer parameter enabling multi-TRP PUSCH repetition is configured, Condition 5: if two search space sets are associated and configured by higher layer parameter for PDCCH repetition, Condition 6 can be one among two as below:
  If the UE is not provided coresetPoolIndex value of 1 for any CORESET, or is provided coresetPoolIndex value of 1 for all CORESETs, in ControlResourceSet, or
  If two CORESETs which each CORESET is associated with two search space sets, respectively, configured by higher layer parameter for PDCCH repetition, are provided different coresetPoolIndex values, the UE determines RS resource indexes $q_d$ providing periodic RS resources with 'QCL-TypeD' in . . .
  Solution 4: the TCI states or the QCL assumptions of the TCI state IDs activated for CORESETs associated with two search space sets, respectively, configured by higher layer parameter for PDCCH repetition on the active DL BWP of the cell.
  Solution 5: the TCI states or the QCL assumptions of the first two CORESETs, sorted in ascending order using the CORESET ID value among the CORESETs activated a single TCI state on the active DL BWP of the cell.
  Solution 6: the TCI states or the QCL assumptions of two CORESETs where each CORESET is with the lowest ID among CORESETs, which are configured with the same value of coresetPoolIndex, on the active DL BWP of the cell.

Regarding solutions for Non-SFN scheme with two default pathloss reference RSs, the above statements are just for example, it can be extended generally considering M number of TRPs and N number of CORESETs which each CORESET is associated with N search space sets, respectively, configured by higher layer parameter for PDCCH repetition based on the similar principle.

Figure 13A:
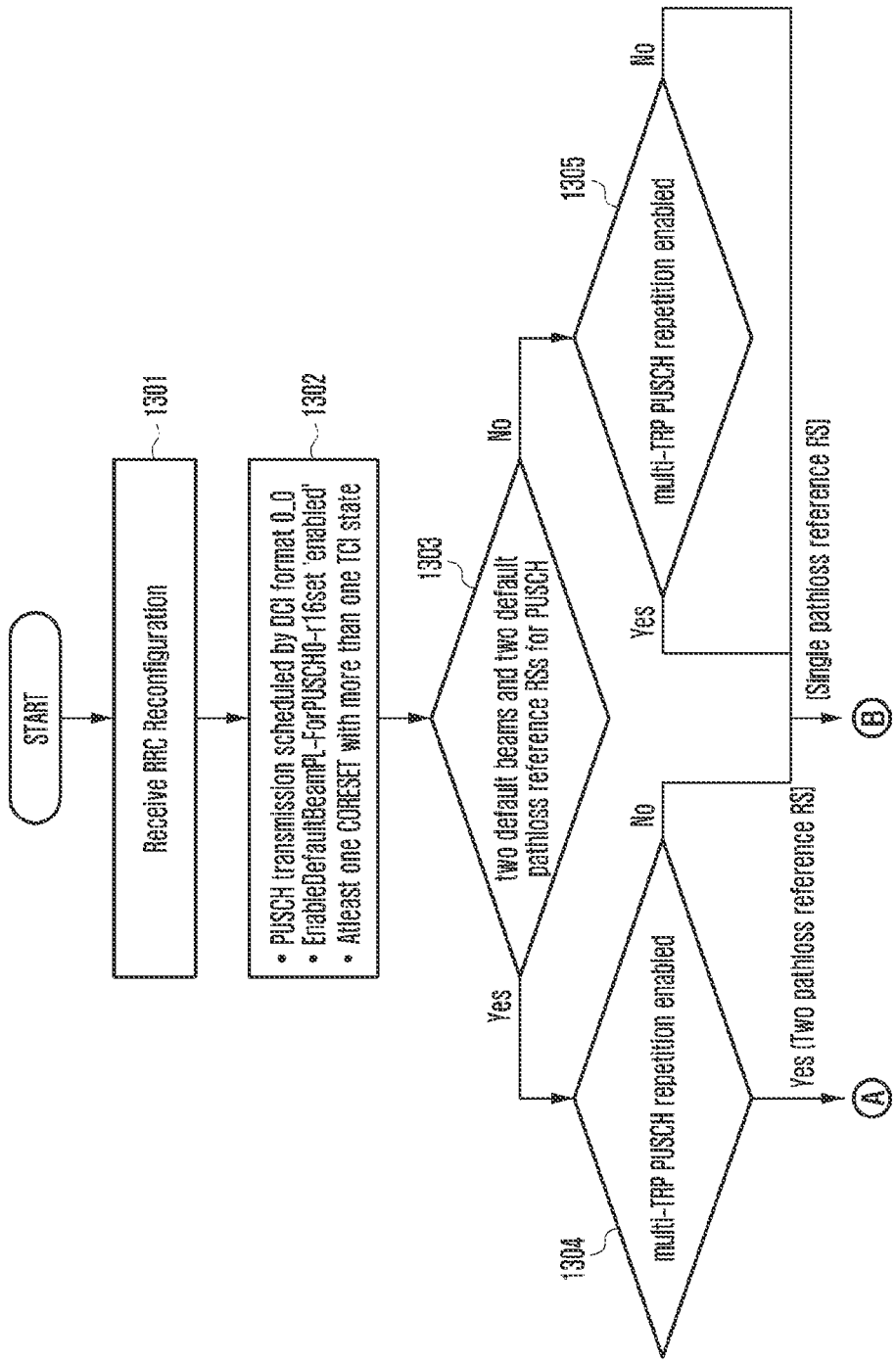
FIGS. 13a and 13b illustrate a flow chart for SFN scheme of scenario 3 and scenario 4 according to an embodiment of the disclosure.
Figure 13B:
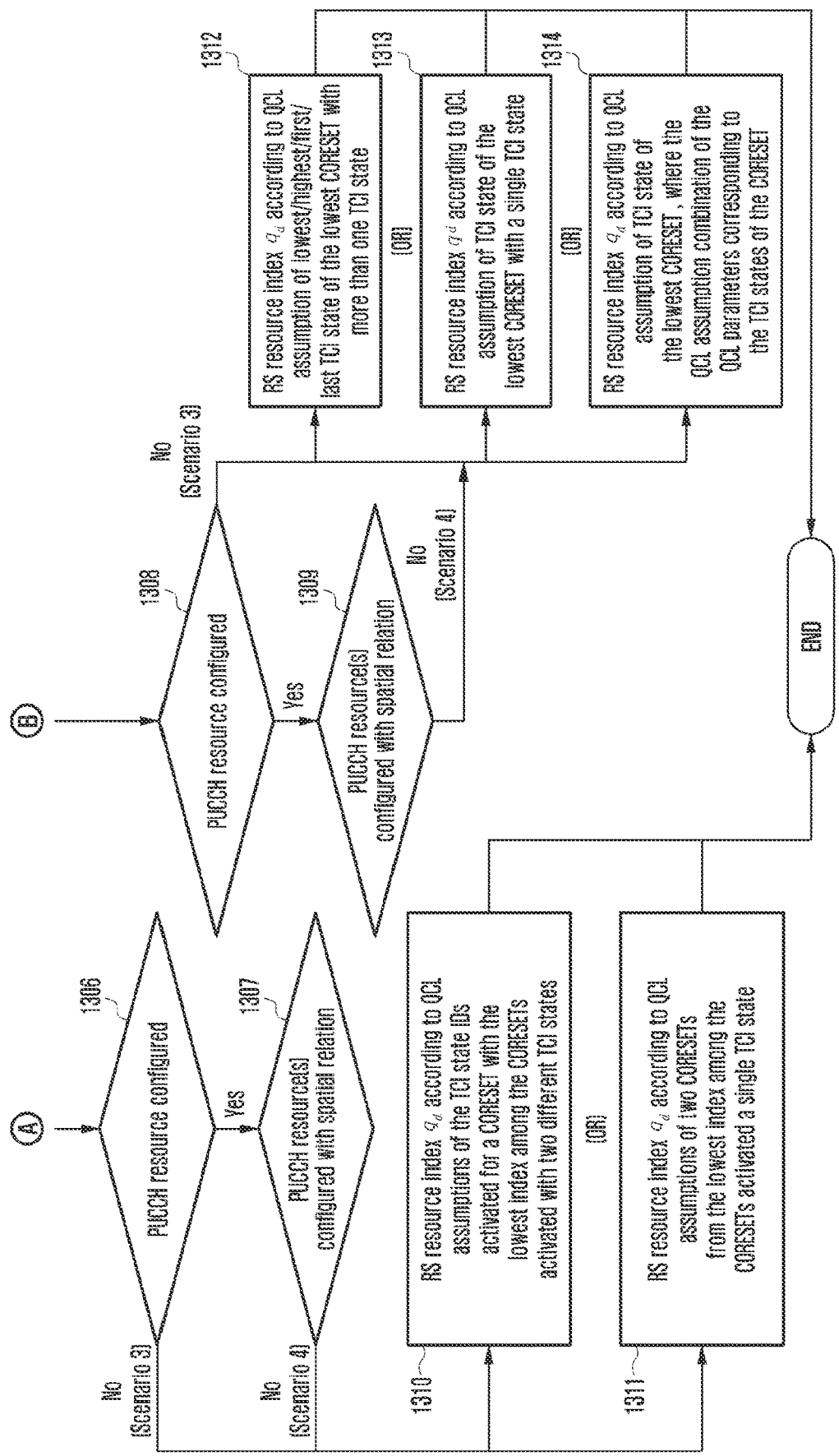

FIGS. 13a and 13b illustrate a flow chart for SFN scheme of scenario 3 and scenario 4 according to an embodiment of the disclosure.

Referring to FIGS. 13a and 13b, in step 1301, UE receives RRC reconfiguration message from a base station. In an embodiment of the disclosure, a PUSCH transmission is scheduled by DCI format 0_0, the higher layer parameter enableDefaultBeamPL-ForPUSCH0-r16 is set 'enabled', and for SFN scheme of scenario 3 and scenario 4, at least one CORESET is configured with more than one TCI states (1302).

If two default beams and two default pathloss reference RSs for PUSCH is configured (1303), multi-TRP PUSCH repetition is enabled (1304), and the UE is not configured with PUCCH resources on the active UL BWP (1306), the UE determines RS resource indexes $q_d$ providing periodic RS resources with 'QCL-TypeD' in the TCI states or the QCL assumptions of the TCI state IDs activated for a CORESET with the lowest index among the CORESETs activated two different TCI states (1310), or of two CORE-SETs from the lowest index among the CORESETs activated a single TCI state on the active DL BWP of the cell (1311).

If two default beams and two default pathloss reference RSs for PUSCH is configured (1303), multi-TRP PUSCH repetition is enabled (1304), and the UE is configured with PUCCH on the active UL BWP (1306) where all the PUCCH resources are not configured with any spatial relation (1307), the UE determines RS resource indexes $q_d$ providing periodic RS resources with 'QCL-TypeD' in the TCI states or the QCL assumptions of the TCI state IDs activated for a CORESET with the lowest index among the CORESETs activated two different TCI states (1310), or of two CORESETs from the lowest index among the CORE-SETs activated a single TCI state on the active DL BWP of the cell (1311).

If two default beams and two default pathloss reference RSs for PUSCH is configured (1303), multi-TRP PUSCH repetition is not enabled (1304), and the UE is not configured with PUCCH resources on the active UL BWP (1308), the UE determines a RS resource index $q_d$ providing a periodic RS resource with 'QCL-TypeD' in the TCI state or the QCL assumption of lowest/highest/first/last TCI state of the lowest CORESET with more than one TCI states (1312) or of TCI state of the lowest CORESET with a single TCI state (1313), or of TCI state of the lowest CORESET where the QCL assumption is combination of the QCL parameters corresponding to the TCI states of the CORESET (1314).

If two default beams and two default pathloss reference RSs for PUSCH is configured (1303), multi-TRP PUSCH repetition is not enabled (1304), and the UE is configured with PUCCH on the active UL BWP (1308) where all the PUCCH resources are not configured with any spatial relation (1309), the UE determines a RS resource index $q_d$ providing a periodic RS resource with 'QCL-TypeD' in the TCI state or the QCL assumption of lowest/highest/first/last TCI state of the lowest CORESET with more than one TCI states (1312) or of TCI state of the lowest CORESET with a single TCI state (1313), or of TC state of the lowest CORESET where the QCL assumption is combination of the QCL parameters corresponding to the TCI states of the CORESET (1314)..

If two default beams and two default pathloss reference RSs for PUSCH is not configured (1303), multi-TRP PUSCH repetition is enabled (1305), and the UE is not configured with PUCCH resources on an active UL BWP (1308), the UE determines a RS resource index $q_d$ providing a periodic RS resource with 'QCL-TypeD' in the TCI state or the QCL assumption of lowest/highest/first/last TCI state of the lowest CORESET with more than one TCI states (1312) or of TCI state of the lowest CORESET with a single TCI state (1313), or of TCI state of the lowest CORESET where the QCL assumption is combination of the QCL parameters corresponding to the TCI states of the CORE-SET (1314).

If two default beams and two default pathloss reference RSs for PUSCH is not configured (1303), multi-TRP PUSCH repetition is enabled (1305), and the UE is configured with PUCCH on the active UL BWP (1308) where all the PUCCH resources are not configured with any spatial relation (1309), the UE determines a RS resource index $q_d$ providing a periodic RS resource with 'QCL-TypeD' in the TCI state or the QCL assumption of lowest/highest/first/last TCI state of the lowest CORESET with more than one TCI states (1312) or of TCI state of the lowest CORESET with a single TCI state (1313), or of TCI state of the lowest CORESET where the QCL assumption is combination of the QCL parameters corresponding to the TCI states of the CORESET (1314).

If two default beams and two default pathloss reference RSs for PUSCH is not configured (1303), multi-TRP PUSCH repetition is not enabled (1305), and the UE is not configured with PUCCH resources on an active UL BWP (1308), the UE determines a RS resource index $q_d$ providing a periodic RS resource with 'QCL-TypeD' in the TCI state or the QCL assumption of lowest/highest/first/last TCI state of the lowest CORESET with more than one TCI states (1312) or of TCI state of the lowest CORESET with a single TCI state (1313), or of TCI state of the lowest CORESET where the QCL assumption is combination of the QCL parameters corresponding to the TCI states of the CORESET (1314).

If two default beams and two default pathloss reference RSs for PUSCH is not configured (1303), multi-TRP PUSCH repetition is not enabled (1305), and the UE is configured with PUCCH on the active UL BWP (1308) where all the PUCCH resources are not configured with any spatial relation (1309), the UE determines a RS resource index $q_d$ providing a periodic RS resource with 'QCL-TypeD' in the TCI state or the QCL assumption of lowest/highest/first/last TCI state of the lowest CORESET with more than one TCI states (1312) or of TC state of the lowest CORESET with a single TCI state (1313), or of TCI state of the lowest CORESET where the QCL assumption is combination of the QCL parameters corresponding to the TCI states of the CORESET (1314).

Figure 14A:
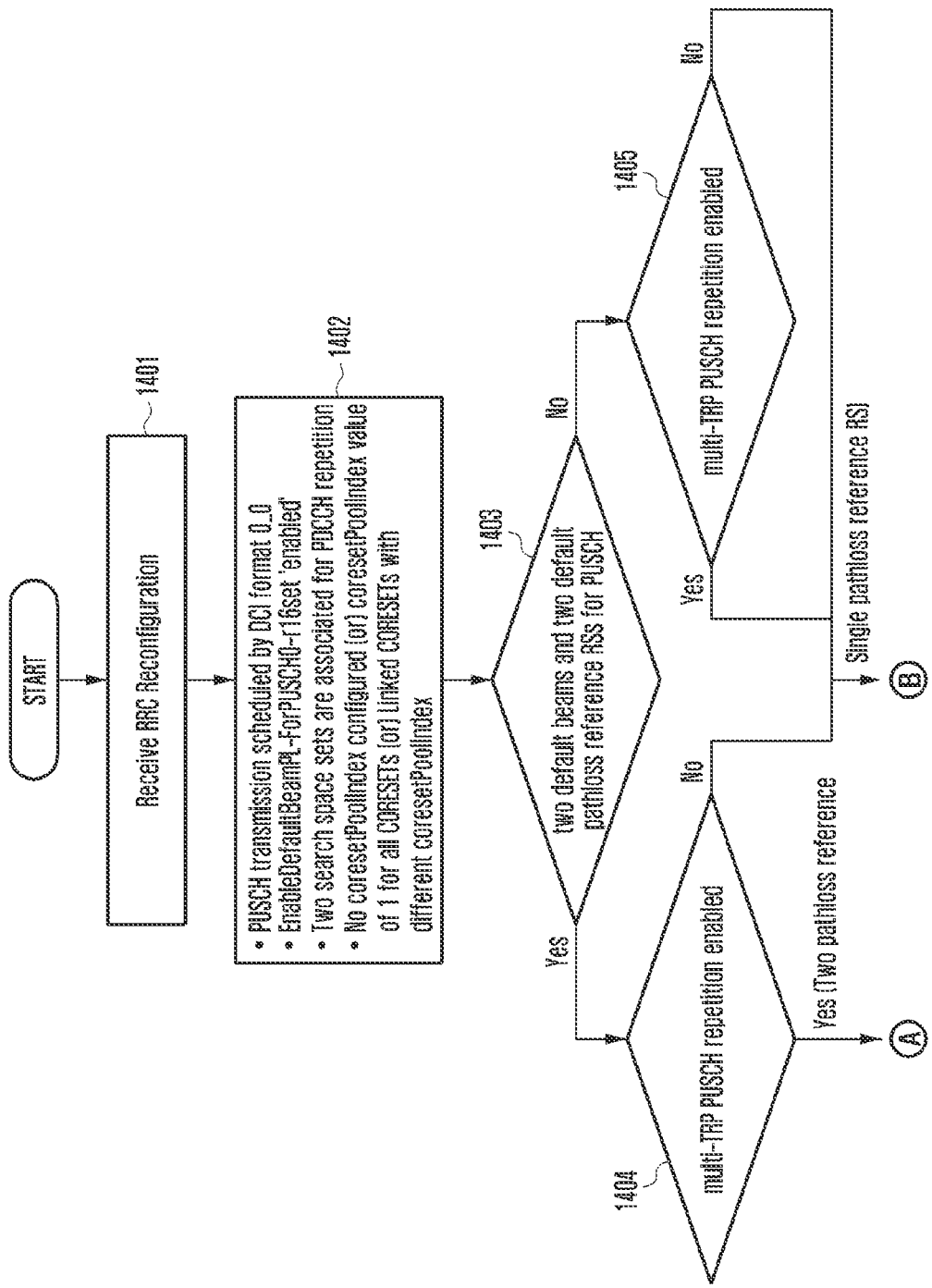
FIGS. 14a and 14b illustrate a flow chart for non-SFN scheme of scenario 3 and scenario 4 according to an embodiment of the disclosure.
Figure 14B:
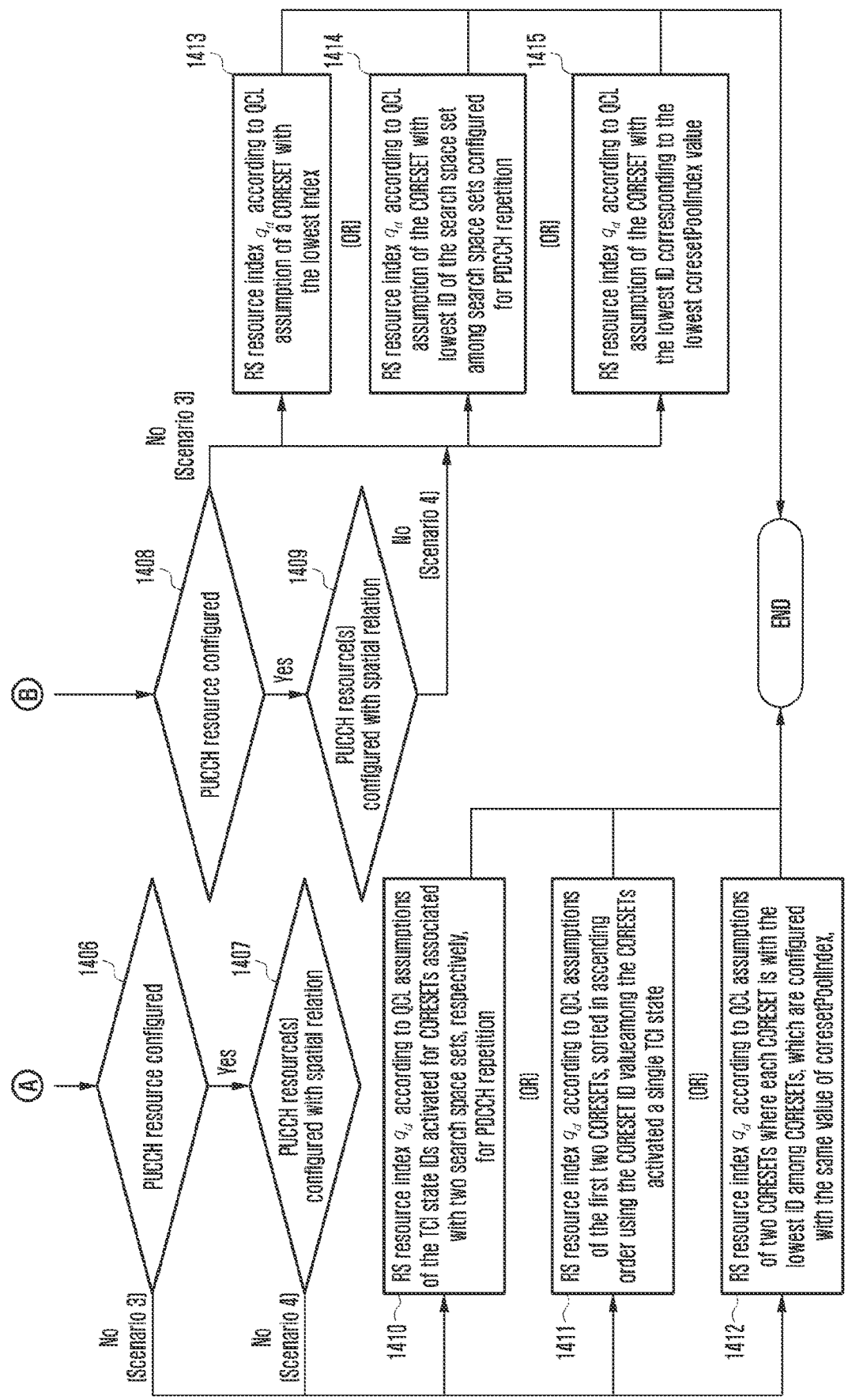

FIGS. 14a and 14b illustrate a flow chart for non-SFN scheme of scenario 3 and scenario 4 according to an embodiment of the disclosure.

Referring to FIGS. 14a and 14b, in step 1401, UE receives RRC reconfiguration message from a base station. In an embodiment of the disclosure, a PUSCH transmission is scheduled by DCI format 0_0, the higher layer parameter enableDefaultBeamPL-ForPUSCH0-r16 is set 'enabled', and for non-SFN scheme of scenario 1 and scenario 2, two search space sets are associated for PDCCH repetition (1402). The UE is not provided coresetPoolIndex value of 1, or is provided coresetPoolIndex value of 1 for all CORESETs, or two CORESETs which each CORESET is associated with two search space sets, are provided different coresetPoolIndex values (1402).

If two default beams and two default pathloss reference RSs for PUSCH is configured (1403), multi-TRP PUSCH repetition is enabled (1404), and the UE is not configured with PUCCH resources on the active UL BWP (1406), the UE determines RS resource indexes $q_d$ providing periodic RS resources with 'QCL-TypeD' in the TCI states or the QCL assumptions of the TCI state IDs activated for CORESETs associated with two search space sets, respectively, for PDCCH repetition (1410) or of the first two CORESETs sorted in ascending order using the CORESET ID value among the CORESETs activated a single TCI state (1411), or of two CORESETs where each CORESET is with the lowest ID among CORESETs, which are configured with the same value of coresetPoolIndex (1412).

If two default beams and two default pathloss reference RSs for PUSCH is configured (1403), multi-TRP PUSCH repetition is enabled (1404), and the UE is configured with PUCCH on the active UL BWP (1406) where all the PUCCH resources are not configured with any spatial relation (1407), the UE determines RS resource indexes $q_d$ providing periodic RS resources with 'QCL-TypeD' in the TCI states or the QCL assumptions of the TCI state IDs activated for CORESETs associated with two search space sets, respectively, for PDCCH repetition (1410) or of the first two CORESETs sorted in ascending order using the CORESET ID value among the CORESETs activated a single TCI state (1411), or of two CORESETs where each CORESET is with the lowest ID among CORESETs, which are configured with the same value of coresetPoolIndex (1412).

If two default beams and two default pathloss reference RSs for PUSCH is configured (1403), multi-TRP PUSCH repetition is not enabled (1404), and the UE is not configured with PUCCH resources on the active UL BWP (1408), the UE determines a RS resource index $q_d$ providing a periodic RS resource with 'QCL-TypeD' in the TCI state or the QCL assumption of a CORESET with the lowest index (1413) or of the CORESET with lowest ID of the search space set among search space sets configured for PDCCH repetition (1414), or of the CORESET with the lowest ID corresponding to the lowest coresetPoolIndex value (1415).

If two default beams and two default pathloss reference RSs for PUSCH is configured (1403), multi-TRP PUSCH repetition is not enabled (1404), and the UE is configured with PUCCH on the active UL BWP (1408) where all the PUCCH resources are not configured with any spatial relation (1409), the UE determines a RS resource index $q_d$ providing a periodic RS resource with 'QCL-TypeD' in the TCI state or the QCL assumption of a CORESET with the lowest index (1413) or of the CORESET with lowest ID of the search space set among search space sets configured for PDCCH repetition (1414), or of the CORESET with the lowest ID corresponding to the lowest coresetPoolIndex value (1415)..

If two default beams and two default pathloss reference RSs for PUSCH is not configured (1403), multi-TRP PUSCH repetition is enabled (1405), and the UE is not configured with PUCCH resources on the active UL BWP (1408), the UE determines a RS resource index $q_d$ providing a periodic RS resource with 'QCL-TypeD' in the TCI state or the QCL assumption of a CORESET with the lowest index (1413) or of the CORESET with lowest ID of the search space set among search space sets configured for PDCCH repetition (1414), or of the CORESET with the lowest ID corresponding to the lowest coresetPoolIndex value (1415).

If two default beams and two default pathloss reference RSs for PUSCH is not configured (1403), multi-TRP PUSCH repetition is enabled (1405), and the UE is configured with PUCCH on the active UL BWP (1408) where all the PUCCH resources are not configured with any spatial relation (1409), the UE determines a RS resource index $q_d$ providing a periodic RS resource with 'QCL-TypeD' in the TCI state or the QCL assumption of a CORESET with the lowest index (1413) or of the CORESET with lowest ID of the search space set among search space sets configured for PDCCH repetition (1414), or of the CORESET with the lowest ID corresponding to the lowest coresetPoolIndex value (1415).

If two default beams and two default pathloss reference RSs for PUSCH is not configured (1403), multi-TRP PUSCH repetition is not enabled (1405), and the UE is not configured with PUCCH resources on the active UL BWP (1408), the UE determines a RS resource index $q_d$ providing a periodic RS resource with 'QCL-TypeD' in the TCI state or the QCL assumption of a CORESET with the lowest index (1413) or of the CORESET with lowest ID of the search space set among search space sets configured for PDCCH repetition (1414), or of the CORESET with the lowest ID corresponding to the lowest coresetPoolIndex value (1415).

If two default beams and two default pathloss reference RSs for PUSCH is not configured (1403), multi-TRP PUSCH repetition is not enabled (1405), and the UE is configured with PUCCH on the active UL BWP (1408) where all the PUCCH resources are not configured with any spatial relation (1409), the UE determines a RS resource index $q_d$ providing a periodic RS resource with 'QCL-TypeD' in the TCI state or the QCL assumption of a CORESET with the lowest index (1413) or of the CORESET with lowest ID of the search space set among search space sets configured for PDCCH repetition (1414), or of the CORESET with the lowest ID corresponding to the lowest coresetPoolIndex value (1415).

Figure 15:
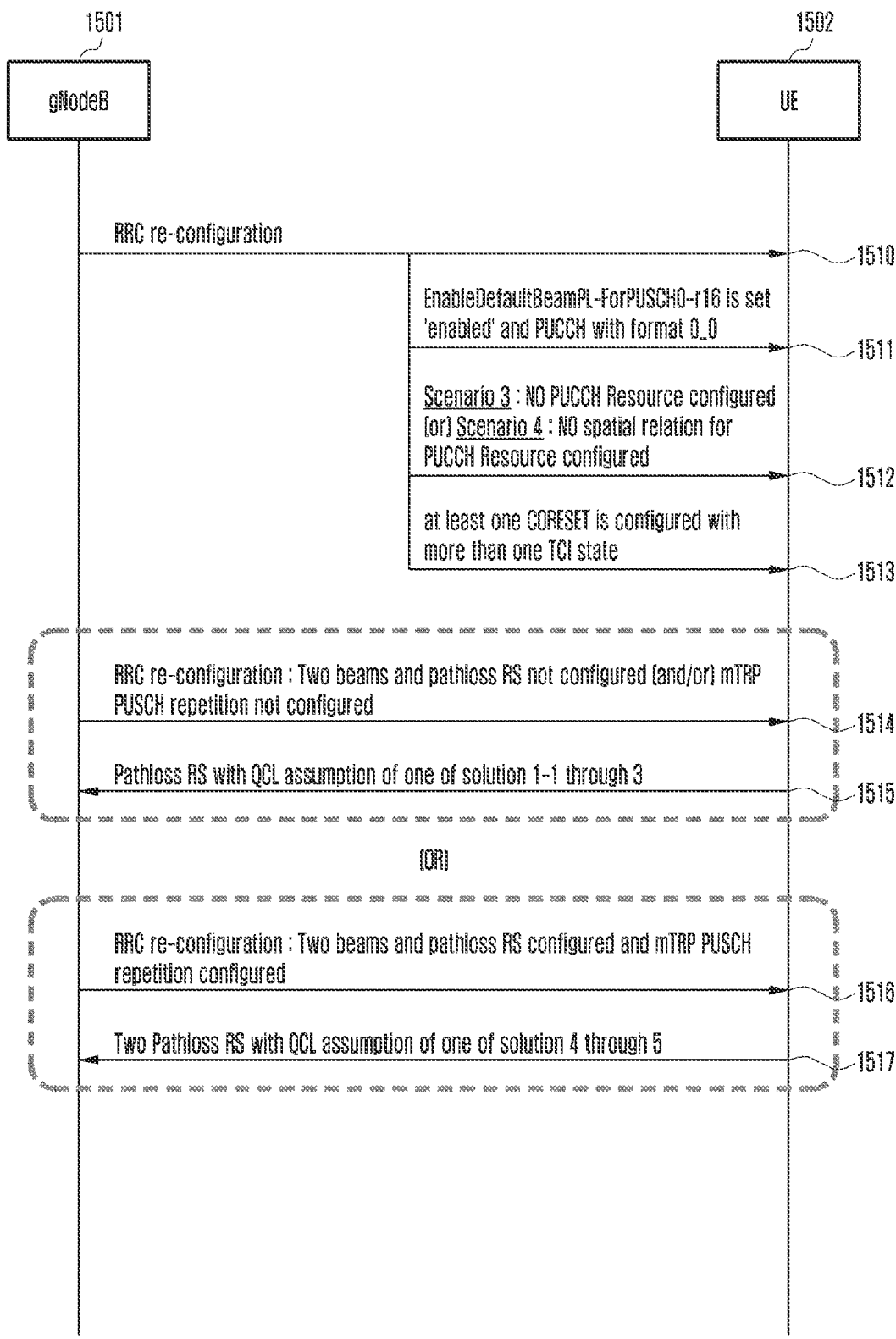
FIG. 15 is a flow chart illustrating an operation of an user equipment (UEL) and a base station for SFN scheme of scenario 3 and scenario 4 according to an embodiment of the disclosure.

FIG. 15 is a flow chart illustrating an operation of an user equipment (UE) and a base station for SFN scheme of scenario 3 and scenario 4 according to an embodiment of the disclosure.

Referring FIG. 15, the UE (1502) receives from the base station (1501) the RRC reconfiguration message (1510). In an embodiment of the disclosure, the higher layer parameter EnableDefaultBeamPL-ForPUSCH0-r16 enabling default beam and pathloss reference RS is set to 'enabled' (1511). In an embodiment of the disclosure, the UE is not configured with PUCCH resources on the active UL BWP (scenario 3), or the UE is configured with PUCCH on the active UL BWP where all the PUCCH resources are not configured with any spatial relation (scenario 4) (1512). In an embodiment of the disclosure, at least one at least one CORESET is configured with more than one TCI states (1513). If two default beams and two default pathloss reference RSs for PUSCH is not configured and/or the multi-TRP PUSCH repetition is not configured (1514) to the UE, the UE determines pathloss RS with QCL assumption of one of solution 1-1 through solution 3 for scenario 3 or scenario 4 (1515). If two default beams and two default pathloss reference RSs for PUSCH is configured and the multi-TRP PUSCH repetition is configured (1516) to the UE, the UE determines two pathloss RSs with QCL assumption of one of solution 4 through 5 for scenario 3 or scenario 4 (1517).

Figure 16:
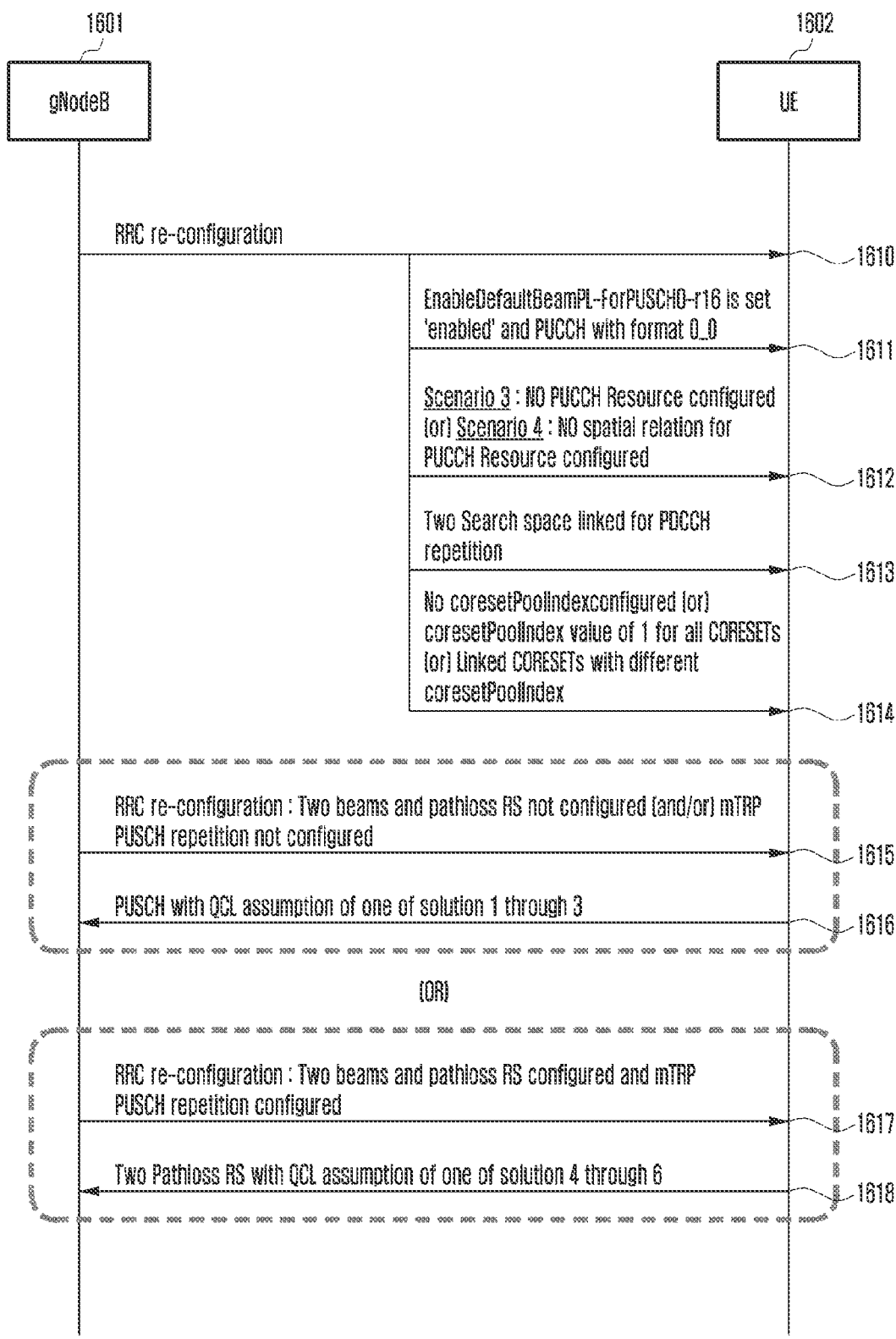
FIG. 16 is a flow chart illustrating an operation of an user equipment (UE) and a base station for non-SFN scheme of scenario 3 and scenario 4 according to an embodiment of the disclosure.

FIG. 16 is a flow chart illustrating an operation of an user equipment (UE) and a base station for non-SFN scheme of scenario 3 and scenario 4 according to an embodiment of the disclosure.

Referring FIG. 16, the UE (1602) receives from the base station (1601) the RRC reconfiguration message (1610). In an embodiment of the disclosure, the higher layer parameter EnableDefaultBeamPL-ForPUSCH0-r16 enabling default beam and pathloss reference RS is set to 'enabled' (1611). In an embodiment of the disclosure, the UE is not configured with PUCCH resources on the active UL BWP (scenario 3), or the UE is configured with PUCCH on the active UL BWP where all the PUCCH resources are not configured with any spatial relation (scenario 4) (1612). In an embodiment of the disclosure, two search space sets are associated for PDCCH repetition (1613). In an embodiment of the disclosure, the UE is not provided coresetPoolIndex value of 1, or is provided coresetPoolIndex value of 1 for all CORESETS, or two CORESETs which each CORESET is associated with two search space sets, are provided different coresetPoolIndex values (1614). If two default beams and two default pathloss reference RSs for PUSCH is not configured and/or the multi-TRP PUSCH repetition is not configured (1615) to the UE, the UE determines pathloss RS with QCL assumption of one of solution 1 through solution 3 for scenario 3 or scenario 4 (1616). If two default beams and two default pathloss reference RSs for PUSCH is configured and the multi-TRP PUSCH repetition is configured (1617) to the UE, the UE determines two pathloss RSs with QCL assumption of one of solution 4 through 6 for scenario 3 or scenario 4 (1618).

[Scenario 5]

Conditions and solutions for the scenario 5 according to the embodiment of the present disclosure are described below. The conditions described below are for illustrative purpose, and not all conditions have to be satisfied for using the solutions.

For PUSCH scheduled by DCI format 0_0 on a cell,
Single Default Beam
  if a higher layer parameter enabling two default beams and two default pathloss reference RSs (e.g., enabletwoDefaultBeamPL-ForPUSCH0-0-r17) for PUSCH is not configured, and a higher layer parameter enabling multi-TRP PUSCH repetition is configured or
  if a higher layer parameter enabling two default beams and two default pathloss reference RSs (e.g., enabletwoDefaultBeamPL-ForPUSCH0-0-r17) for PUSCH is not configured and a higher layer parameter enabling multi-TRP PUSCH repetition is not configured, or
  If a higher layer parameter enabling two default beams and two default pathloss reference RSs (e.g., enabletwoDefaultBeamPL-ForPUSCH0-0-r17) for PUSCH is configured, and a higher layer parameter enabling multi-TRP PUSCH repetition is not configured,
  the UE shall transmit PUSCH according to the spatial relation, if applicable, corresponding to
    Solution 1: the dedicated PUCCH resource with the lowest ID configured with a single PUCCH-spatialRelationInfo within the active UL BWP of the cell, as described in Clause 9.2.1 of [6, TS 38.213].
    Solution 2-1: the first PUCCH spatialRelationInfo, configured to the dedicated PUCCH resource with the lowest ID associated with more than one PUCCH-spatialRelationInfo within the active UL BWP of the cell, as described in Clause 9.2.1 of [6, TS 38.213].
    Solution 2-2: the last PUCCH spatialRelationInfo, configured to the dedicated PUCCH resource with the lowest ID among associated with more than one PUCCH-spatialRelationInfo within the active UL BWP of the cell, as described in Clause 9.2.1 of [6, TS 38.213].
    Solution 2-3: the PUCCH spatialRelationInfo with the lowest pucch-SpatialRelationInfoId, configured to the dedicated PUCCH resource with the lowest ID associated with more than one PUCCH-spatialRelationInfo within the active UL BWP of the cell, as described in Clause 9.2.1 of [6, TS 38.213].
    Solution 2-4: the PUCCH spatialRelationInfo with the highest pucch-SpatialRelationInfoId, configured to the dedicated PUCCH resource with the lowest ID associated with more than one PUCCH-spatialRelationInfo within the active UL BWP of the cell, as described in Clause 9.2.1 of [6, TS 38.213].
    Solution 3: the dedicated PUCCH resource with the lowest ID associated with one or two PUCCH-spatialRelationInfos within the active UL BWP of the cell, as described in Clause 9.2.1 of [6, TS 38.213].
    If PUCCH resource with two PUCCH-spatialRelationInfos is chosen, applying the first or lowest PUCCH spatialRelationInfo Solution 4: the SRS-spatialrelationinfo associated with the SRS resource with the lowest ID for the SRS resource set with the lowest ID within the active UL BWP of the cell, as described in Clause 9.2.1 of [6, TS 38.213], if two SRS resource sets are configured when the usage is configured with codebook or noncodebook Two Default Beams if a higher layer parameter enabling two default beams and two default pathloss reference RSs (e.g., enablet-woDefaultBeamPL-ForPUSCH0-0-r17) for PUSCH is configured, a higher layer parameter enabling multi-TRP PUSCH repetition is configured, a higher layer parameter defining beam mapping pattern is configured either sequential or cyclic mapping and a higher layer parameter defining the number of repetitions for PUSCH is configured or indicated by time domain resource allocation field, the UE shall transmit PUSCH according to the spatial relations, if applicable, corresponding to Solution 5: the two dedicated PUCCH resources from the lowest ID among PUCCH resources associated with a single PUCCH-spatialRelationInfo Solution 6: the dedicated PUCCH resource with the lowest ID among PUCCH resources associated with more than one PUCCH-spatialRelationInfo Solution 7: two SRS-spatialrelationinfo associated with each SRS resource with the lowest ID for each SRS resource set, if two SRS resource sets are configured when the usage is configured with codebook or noncodebook within the active UL BWP of the cell, as described in Clause 9.2.1 of [6, TS 38.213].

If the value configured by a higher layer parameter defining the number of repetitions for PUSCH or indicated by time domain resource allocation field equals to two, the first and second spatial relations are applied to the first and second PUSCH transmissions, respectively.

If the value configured by a higher layer parameter defining the number of repetitions for PUSCH or indicated by time domain resource allocation field is larger than two, If a higher layer parameter defining beam mapping pattern is configured with cyclic mapping, the first and second spatial relation are applied to the first and second PUSCH transmissions, respectively, and the same spatial relation mapping pattern continues to the remaining PUSCH transmission occasions.

If a higher layer parameter defining beam mapping pattern is configured with sequential mapping, the first spatial relation is applied to the first and second PUSCH transmissions, and the second spatial relation is applied to the third and fourth PUSCH transmissions, and the same spatial relation mapping pattern continues to the remaining PUSCH transmission occasions.

Regarding solutions for two default beams, the above statements are just for example, it can be extended generally considering M number of TRPs, N number of PUCCH-spatialrelationinfos associated with a PUCCH resource, and P number of PUSCH repetition based on the similar principle.

Figure 17A:
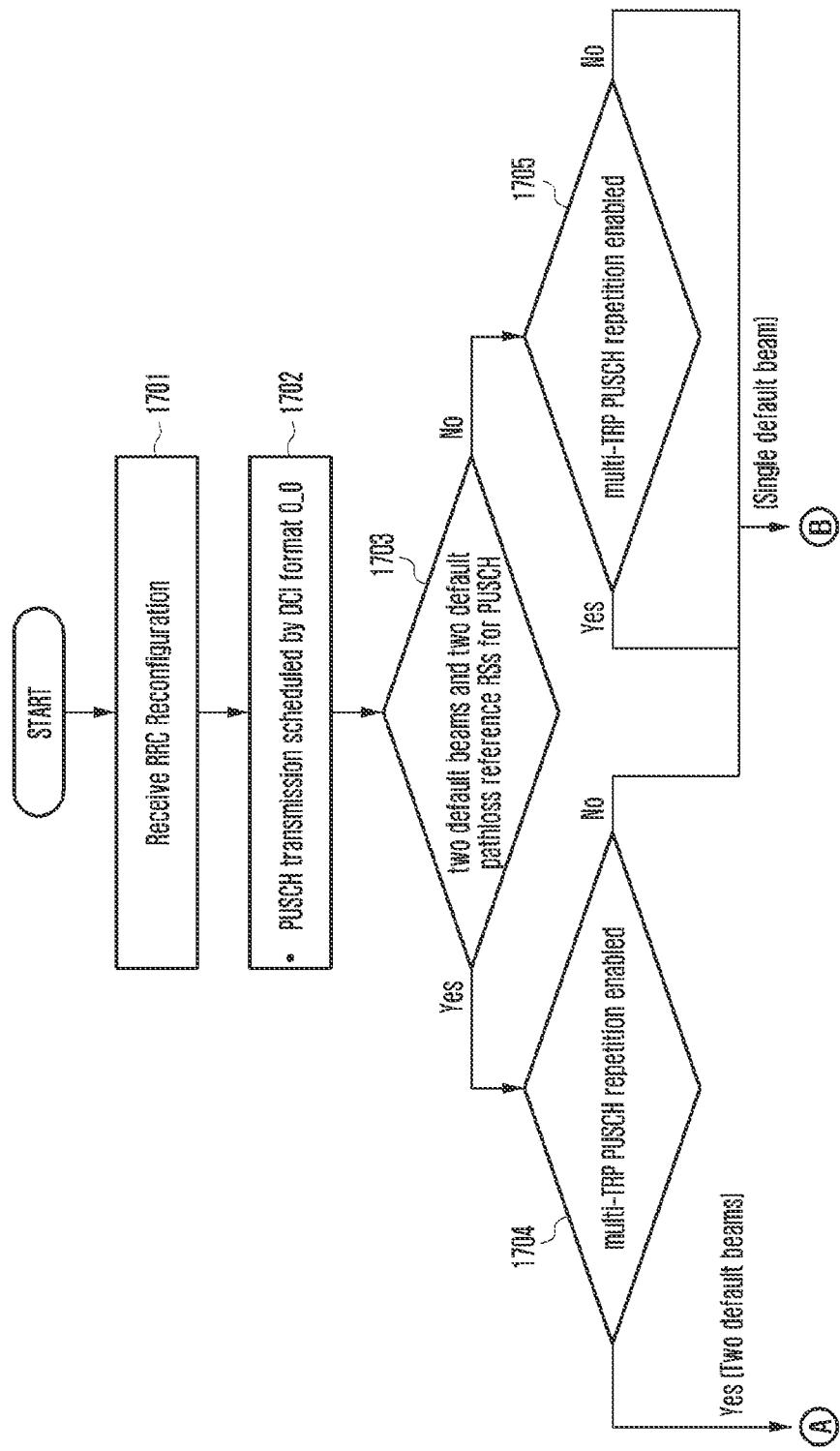
FIGS. 17a and 17b illustrate a flow chart for scenario 5 according to an embodiment of the disclosure.
Figure 17B:
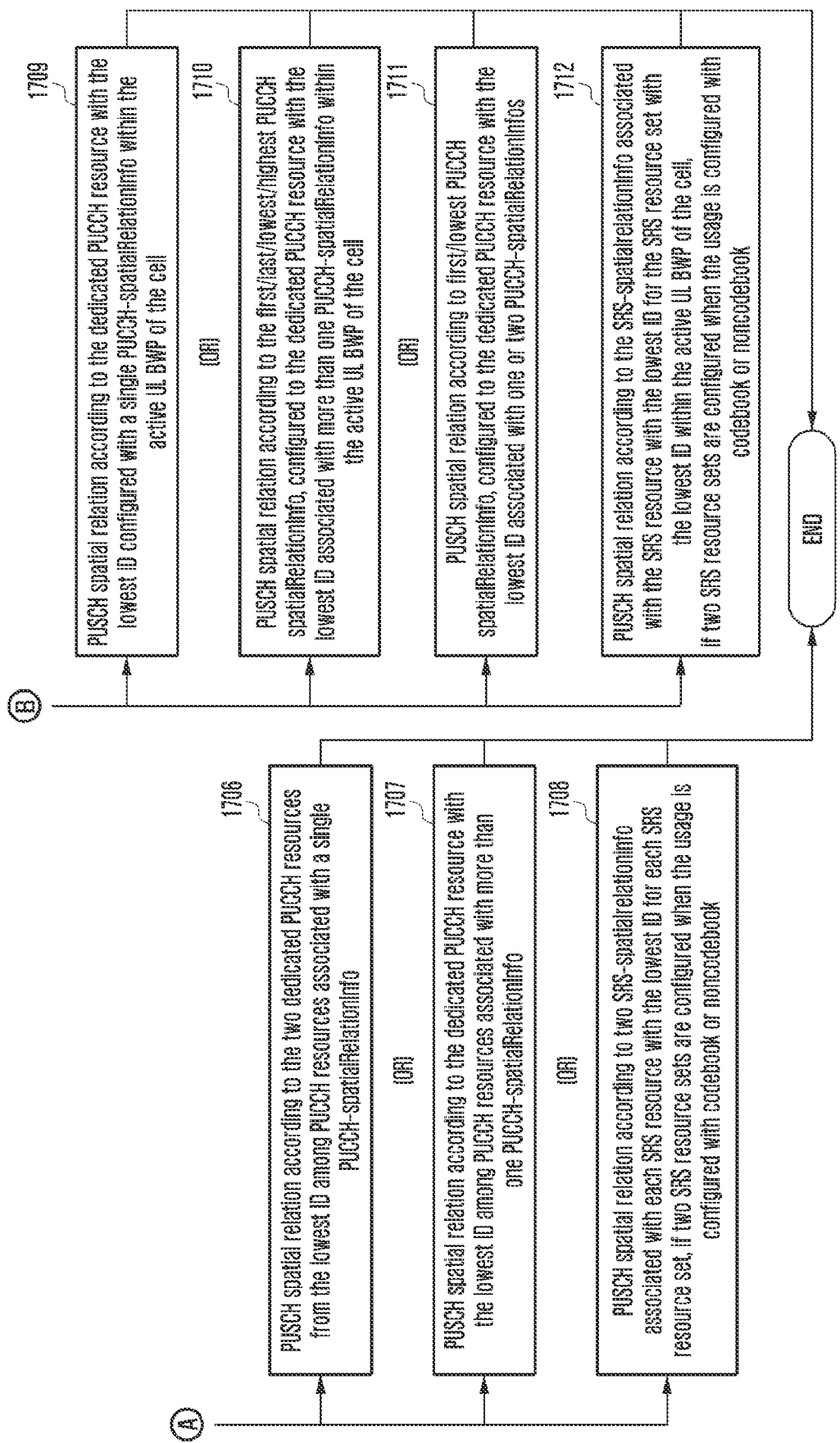

FIGS. 17a and 17b illustrate a flow chart for scenario 5 according to an embodiment of the disclosure.

Referring to FIGS. 17a and 17b, in step 1701, UE receives RRC reconfiguration message from a base station. In an embodiment of the disclosure, a PUSCH transmission is scheduled by DCI format 0_0 (1702).

If two default beams and two default pathloss reference RSs for PUSCH is configured (1703) and multi-TRP PUSCH repetition is enabled (1704), the UE transmits PUSCH according to spatial relations corresponding to the two dedicated PUCCH resources from the lowest ID among PUCCH resources associated with a single PUCCH-spatialRelationInfo (1706) or corresponding to the dedicated PUCCH resource with the lowest ID among PUCCH resources associated with more than one PUCCH-spatialRelationInfo (1707), or corresponding to two SRS-spatialrelationInfo associated with each SRS resource with the lowest ID for each SRS resource set, if two SRS resource sets are configured when the usage is configured with codebook or noncodebook (1708).

If two default beams and two default pathloss reference RSs for PUSCH is configured (1703) and multi-TRP PUSCH petition is not enabled (1704), the UE transmits PUSCH according to spatial relations corresponding to the dedicated PUCCH resource with the lowest ID configured with a single PUCCH-spatialRelationInfo within the active UL BWP of the cell (1709), or corresponding to the first/last/lowest/highest PUCCH-spatialRelationInfo, configured to the dedicated PUCCH resource with the lowest ID associated with more than one PUCCH-spatialRelationInfo within the active UL BWP of the cell (1710), or corresponding to the first/lowest PUCCH-spatialRelationInfo, configured to the dedicated PUCCH resource with the lowest ID associated with one or two PUCCH-spatialRElationInfos (1711), or corresponding to the SRS-spatialrelationInfo associated with the SRS resource with the lowest ID for the SRS resource set with the lowest ID within the active UL BWP of the cell, if two SRS resource sets are configured when the usage is configured with codebook or noncodebook (1712).

Figure 18:
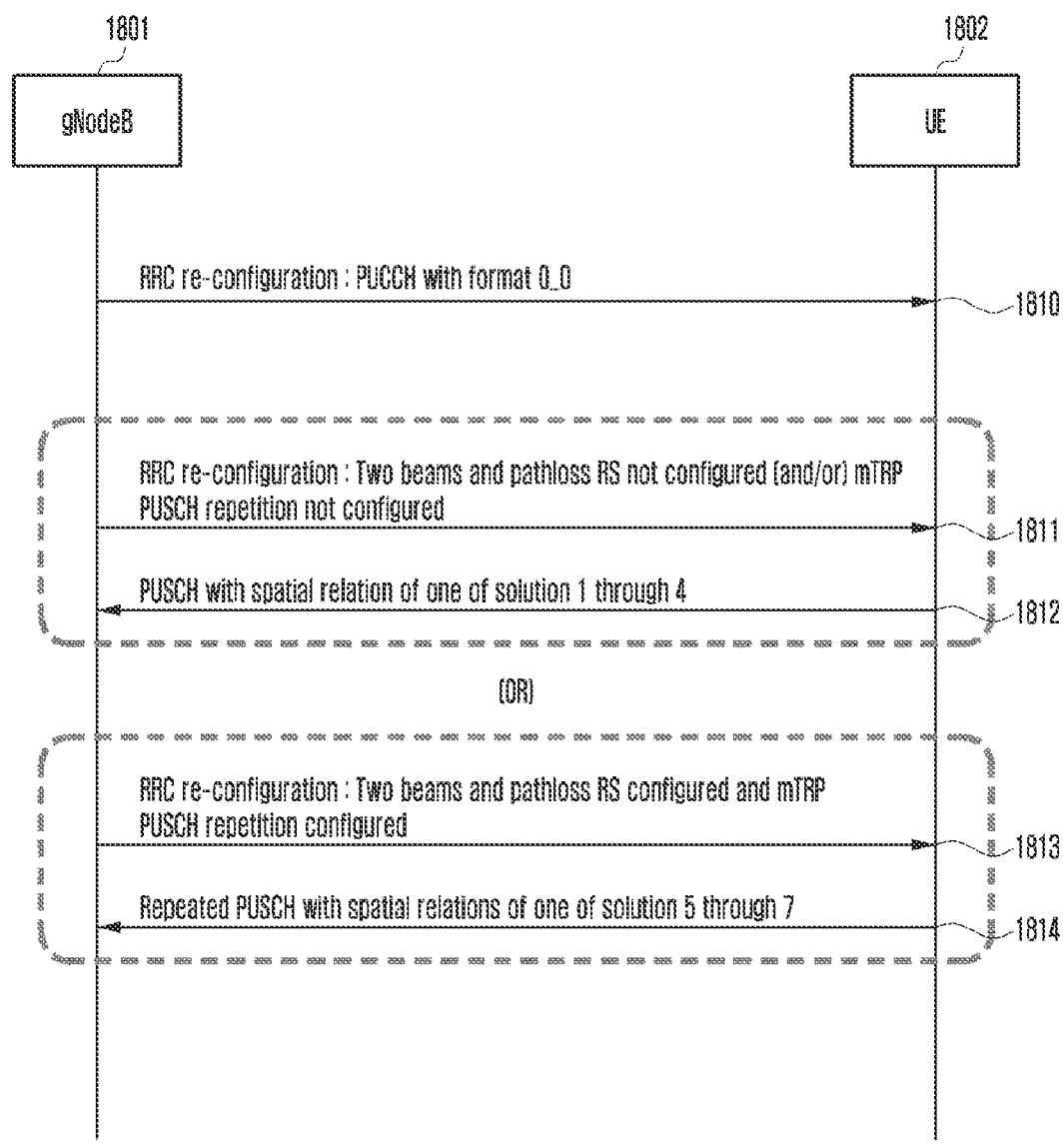
FIG. 18 is a flow chart illustrating an operation of an user equipment (UE) and a base station for scenario 5 according to an embodiment of the disclosure.

If two default beams and two default pathloss reference RSs for PUSCH is not configured (1703) and multi-TRP PUSCH petition is either enabled or not (1705), the UE transmits PUSCH according to spatial relations corresponding to the dedicated PUCCH resource with the lowest ID configured with a single PUCCH-spatialRelationInfo within the active UL BWP of the cell (1709), or corresponding to the first/last/lowest/highest PUCCH-spatialRelationInfo, configured to the dedicated PUCCH resource with the lowest ID associated with more than one PUCCH-spatialRelationInfo within the active UL BWP of the cell (1710), or corresponding to the first/lowest PUCCH-spatialRelationInfo, configured to the dedicated PUCCH resource with the lowest ID associated with one or two PUCCH-spatialRElationInfos (1711), or corresponding to the SRS-spatialrelationInfo associated with the SRS resource with the lowest ID for the SRS resource set with the lowest ID within the active UL BWP of the cell, if two SRS resource sets are configured when the usage is configured with codebook or noncodebook (1712). FIG. 18 is a flow chart illustrating an operation of an user equipment (UE) and a base station for scenario 5 according to an embodiment of the disclosure.

Referring FIG. 18, the UE (1802) receives from the base station (1801) the RRC reconfiguration message (1810). If two default beams and two default pathloss reference RSs for PUSCH is not configured and/or the multi-TRP PUSCH repetition is not configured (1811) to the UE, the UE transmits PUSCH according to spatial relations using solution 1 through 4 for the scenario 5 (1812). If two default beams and two default pathloss reference RSs for PUSCH is configured and the multi-TRP PUSCH repetition is configured (1813) to the UE the UE transmits PUSCH according to spatial relations using solution 5 through 7 for the scenario 5 (1814).

Figure 19:
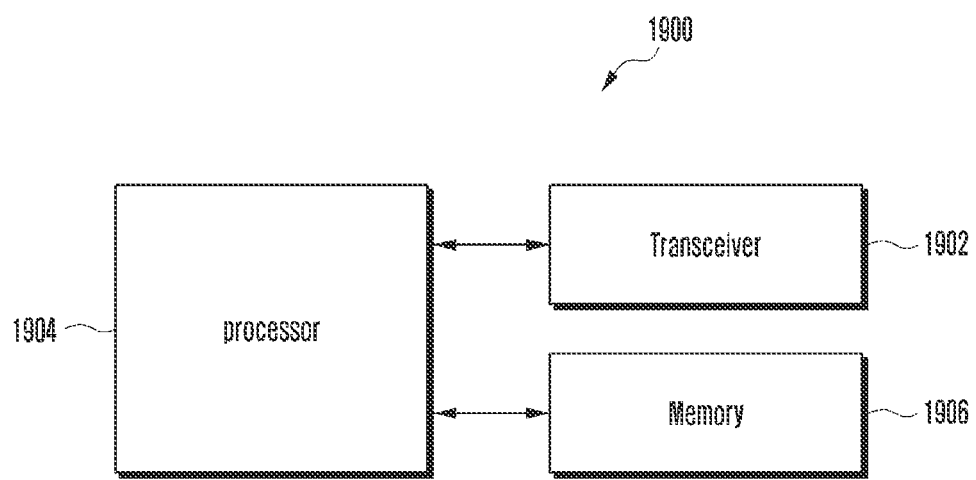
FIG. 19 is a block diagram illustrating a structure of a base station according to an embodiment of the disclosure.

FIG. 19 is a block diagram illustrating a structure of a UE according to an embodiment of the disclosure.

Referring to FIG. 19, a UE may include a transceiver 1901, a memory 1906, and a processor 1904. However, the components of the UE are not limited to the above-described examples. For example, the UE may include more or fewer components than the above-described components. In addition, the transceiver 1902, the memory 1906, and the processor 1904 may be implemented in the form of a single chip.

According to an embodiment of the disclosure, the transceiver 1902 may transmit and receive signals to and from the base station. The above-described signal may include control information and data. To this end, the transceiver 1902 may include an RF transmitter that up-converts and amplifies the frequency of a transmitted signal, and an RF receiver that amplifies a received signal with low noise and down-converts a frequency. In addition, the transceiver 1902 may receive a signal through a wireless channel, may output the received signal to the processor 1904, and may transmit the signal output from the processor 1904 through the wireless channel.

According to an embodiment of the disclosure, the memory 1906 may store programs and data necessary for the operation of the UE. In addition, the memory 1906 may store control information or data included in signals transmitted and received by the UE. The memory 1906 may be composed of a storage medium, such as a read only memory (ROM), a random access memory (RAM), a hard disk, a compact disc (CD)-ROM, or a digital versatile discs (DVD), or a combination of the storage media. In addition, the memory 1906 may be composed of a plurality of memories. According to an embodiment of the disclosure, the memory 1906 may store a program for controlling and receiving an operation for reducing power consumption of a UE.

According to an embodiment of the disclosure, the processor 1904 may control a series of processes in which the UE can operate according to the above-described embodiments of the disclosure.

Figure 20:
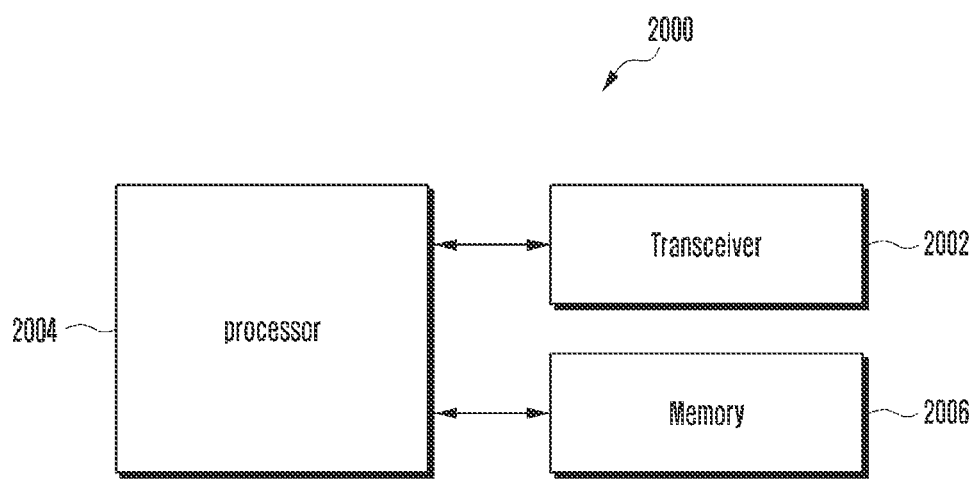
FIG. 20 is a block diagram illustrating a structure of a terminal according to an embodiment of the disclosure.

FIG. 20 is a block diagram illustrating a structure of a base station according to an embodiment of the disclosure.

Referring to FIG. 20, a base station may include a transceiver 2002, a memory 2006, and a processor 2004. However, the components of the base station are not limited to the above-described examples. For example, the base station may include more or fewer components than the above-described components. In addition, the transceiver 2002, the memory 2006, and the processor 2004 may be implemented in the form of a single chip.

According to an embodiment of the disclosure, the transceiver 2002 may transmit and receive signals to and from a UE. The above-described signal may include control information and data. To this end, the transceiver 2002 may include an RF transmitter that up-converts and amplifies the frequency of a transmitted signal, and an RF receiver that amplifies a received signal with low noise and down-converts a frequency. In addition, the transceiver 2002 may receive a signal through a wireless channel, may output the received signal to the processor 2004, and may transmit the signal output from the processor 2004 through the wireless channel.

According to an embodiment of the disclosure, the memory 2006 may store programs and data required for the operation of the base station. In addition, the memory 2006 may store control information or data included in signals transmitted and received by the base station. The memory 2006 may be composed of a storage medium, such as a ROM, a RAM, a hard disk, a CD-ROM, or a DVD, or a combination of the storage media. In addition, the memory 2006 may be composed of a plurality of memories. According to an embodiment of the disclosure, the memory 20061 may store a program for generating and transmitting control information for reducing power consumption of the UE of the base station.

According to an embodiment of the disclosure, the processor 2004 may control a series of processes so that the base station can operate according to the embodiment of the disclosure described above.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a ROM, an electrically erasable programmable read only memory (EEPROM), a magnetic disc storage device, a compact disc-ROM (CD-ROM), DVDs, or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein based on without departing from the spirit and scope of the disclosure as defined by the appended claims and their equivalents. Further, the above respective embodiments may be employed in combination, as necessary. For example, one embodiment of the disclosure may be partially combined with another embodiment to operate a base station and a terminal. Further, embodiments of the disclosure may be applied to other communication systems, and other variants may also be implemented based on the technical idea of the embodiments of the disclosure, For example, the embodiments may be applied to LTE, 5G, or NR systems.

The invention claimed is:

1. A terminal in a communication system, the terminal comprising:
a transceiver; and
a controller configured to:
receive, from a base station, downlink control information (DCI) format 0_0 scheduling a physical uplink shared channel (PUSCH),
transmit, to the base station, the PUSCH according to a spatial relation,
wherein the spatial relation associated with the PUSCH corresponds to a dedicated physical uplink control channel (PUCCH) resource with a lowest identity (ID) within an active uplink (UL) bandwidth part (BWP), and
wherein, in case that the dedicated PUCCH resource with the lowest ID within the active UL BWP corresponds to more than one spatial relation, the spatial relation associated with the PUSCH corresponds to a spatial relation with a lowest ID among the more than one spatial relation.

2. The terminal of claim 1, wherein the controller is configured to receive, from the base station, a higher layer parameter enabling a default beam and a default pathloss reference signal (RS),
wherein the spatial relation associated with the PUSCH is associated with a transmission configuration indication (TCI) state corresponding to a control resource set (CORESET) with a lowest ID on an active downlink (DL) BWP, in response to PUCCH resources not being configured on the active UL BWP, and
wherein, in case that the CORESET with the lowest ID on the active DL BWP is configured with more than one TCI state, the spatial relation associated with the PUSCH is associated with a first TCI state among the more than one TCI state.

3. The terminal of claim 1, wherein the controller is configured to receive, from the base station, a higher layer parameter enabling a default beam and a default pathloss reference signal (RS),
wherein the spatial relation associated with the PUSCH is associated with a transmission configuration indication (TCI) state corresponding to a control resource set (CORESET) with a lowest ID on an active downlink (DL) BWP, in response to PUCCH resources being configured on the active UL BWP where all the PUCCH resources are not configured with any spatial relation, and
wherein, in case that the CORESET with the lowest ID on the active DL BWP is configured with more than one TCI state, the spatial relation associated with the PUSCH is associated with a first TCI state among the more than one TCI state.

4. The terminal of claim 1, wherein the controller is configured to:
receive, from the base station, a higher layer parameter enabling a default beam and a default pathloss reference signal (RS), and
wherein a pathloss RS index associated with power of the PUSCH is based on a transmission configuration indication (TCI) state corresponding to a control resource set (CORESET) with a lowest ID on an active downlink (DL) BWP, in response to PUCCH resources not being configured on the active UL BWP, and
wherein, in case that the CORESET with the lowest ID on the active DL BWP is configured with more than one TCI state, the pathloss RS index is based on a first TCI state among the more than one TCI state.

5. The terminal of claim 1, wherein the controller is configured to:
receive, from the base station, a higher layer parameter enabling a default beam and a default pathloss reference signal (RS), and
wherein a pathloss RS index associated with power of the PUSCH is based on a transmission configuration indication (TCI) state corresponding to a control resource set (CORESET) with a lowest ID on an active downlink (DL) BWP, in response to PUCCH resources being configured on the active UL BWP where all the PUCCH resources are not configured with any spatial relation, and
wherein, in case that the CORESET with the lowest ID on the active DL BWP is configured with more than one TCI state, the pathloss RS index is based on a first TCI state among the more than one TCI state.

6. A method performed by a terminal in a communication system, the method comprising:
receiving, from a base station, downlink control information (DCI) format 0_0 scheduling a physical uplink shared channel (PUSCH),
transmitting, to the base station, the PUSCH according to a spatial relation,
wherein the spatial relation associated with the PUSCH corresponds to a dedicated physical uplink control channel (PUCCH) resource with a lowest identity (ID) within an active uplink (UL) bandwidth part (BWP), and
wherein, in case that the dedicated PUCCH resource with the lowest ID within the active UL BWP corresponds to more than one spatial relation, the spatial relation associated with the PUSCH corresponds to a spatial relation with a lowest ID among the more than one spatial relation.

7. The method of claim 6, further comprising receiving, from the base station, a higher layer parameter enabling a default beam and a default pathloss reference signal (RS),
wherein the spatial relation associated with the PUSCH is associated with a transmission configuration indication (TCI) state corresponding to a control resource set (CORESET) with a lowest ID on an active downlink (DL) BWP, in response to PUCCH resources not being configured on the active UL BWP, and
wherein, in case that the CORESET with the lowest ID on the active DL BWP is configured with more than one TCI state, the spatial relation associated with the PUSCH is associated with a first TCI state among the more than one TCI state.

8. The method of claim 6, further comprising receiving, from the base station, a higher layer parameter enabling a default beam and a default pathloss reference signal (RS),
wherein the spatial relation associated with the PUSCH is associated with a transmission configuration indication (TCI) state corresponding to a control resource set (CORESET) with a lowest ID on an active downlink (DL) BWP, in response to PUCCH resources being configured on the active UL BWP where all the PUCCH resources are not configured with any spatial relation, and wherein, in case that the CORESET with the lowest ID on the active DL BWP is configured with more than one TCI state, the spatial relation associated with the PUSCH is associated with a first TCI state among the more than one TCI state.

9. The method of claim 6, further comprising:
receiving, from the base station, a higher layer parameter enabling a default beam and a default pathloss reference signal (RS); and
wherein the pathloss RS index associated with power of the PUSCH is based on a transmission configuration indication (TCI) state corresponding to a control resource set (CORESET) with a lowest ID on an active downlink (DL) BWP, in response to PUCCH resources not being configured on the active UL BWP, and
wherein, in case that the CORESET with the lowest ID on the active DL BWP is configured with more than one TCI state, the pathloss RS index is based on a first TCI state among the more than one TCI state.

10. The method of claim 6, further comprising:
receiving, from the base station, a higher layer parameter enabling a default beam and a default pathloss reference signal (RS); and
wherein the pathloss RS index associated with power of the PUSCH is based on a transmission configuration indication (TCI) state corresponding to a control resource set (CORESET) with a lowest ID on an active downlink (DL) BWP, in response to PUCCH resources being configured on the active UL BWP where all the PUCCH resources are not configured with any spatial relation, and
wherein, in case that the CORESET with the lowest ID on the active DL BWP is configured with more than one TCI state, the pathloss RS index is based on a first TCI state among the more than one TCI state.

11. A base station in a communication system, the base station comprising:
a transceiver; and
a controller configured to:
transmit, to a terminal, downlink control information (DCI) format 0_0 scheduling a physical uplink shared channel (PUSCH), and
receive the PUSCH from the terminal according to a spatial relation associated with the PUSCH,
wherein the spatial relation associated with the PUSCH corresponds to a dedicated physical uplink control channel (PUCCH) resource with a lowest identity (ID) within an active uplink (UL) bandwidth part (BWP), and
wherein, in case that the dedicated PUCCH resource with the lowest ID within the active UL BWP corresponds to more than one spatial relation, the spatial relation associated with the PUSCH corresponds to a spatial relation with a lowest ID among the more than one spatial relation.

12. The base station of claim 11, wherein the controller is configured to transmit, to the terminal, a higher layer parameter enabling a default beam and a default pathloss reference signal (RS),
wherein the spatial relation associated with the PUSCH is associated with a transmission configuration indication (TCI) state corresponding to a control resource set (CORESET) with a lowest ID on an active downlink (DL) BWP, in response to PUCCH resources not being configured on the active UL BWP, and
wherein, in case that the CORESET with the lowest ID on the active DL BWP is configured with more than one TCI state, the spatial relation associated with the PUSCH is associated with a first TCI state among the more than one TCI state.

13. The base station of claim 11, wherein the controller is configured to transmit, to the terminal, a higher layer parameter enabling a default beam and a default pathloss reference signal (RS),
wherein the spatial relation associated with the PUSCH is associated with a transmission configuration indication (TCI) state corresponding to a control resource set (CORESET) with a lowest ID on an active downlink (DL) BWP, in response to PUCCH resources being configured on the active UL BWP where all the PUCCH resources are not configured with any spatial relation, and
wherein, in case that the CORESET with the lowest ID on the active DL BWP is configured with more than one TCI state, the spatial relation associated with the PUSCH is associated with a first TCI state among the more than one TCI state.

14. The base station of claim 11, wherein the controller is configured to transmit, to the terminal, a higher layer parameter enabling a default beam and a default pathloss reference signal (RS),
wherein power of the PUSCH is associated with a pathloss RS index,
wherein the pathloss RS index is based on a transmission configuration indication (TCI) state corresponding to a control resource set (CORESET) with a lowest ID on an active downlink (DL) BWP, in response to PUCCH resources not being configured on the active UL BWP or in response to the PUCCH resources being configured on the active UL BWP where all the PUCCH resources are not configured with any spatial relation, and
wherein, in case that the CORESET with the lowest ID on the active DL BWP is configured with more than one TCI state, the pathloss RS index is based on a first TCI state among the more than one TCI state.

15. A method performed by a base station in a communication system, the method comprising:
transmitting, to the terminal, downlink control information (DCI) format 0_0 scheduling a physical uplink shared channel (PUSCH), and
receiving the PUSCH from the terminal according to a spatial relation associated with the PUSCH,
wherein the spatial relation associated with the PUSCH corresponds to a dedicated physical uplink control channel (PUCCH) resource with a lowest identity (ID) within an active uplink (UL) bandwidth part (BWP), and
wherein, in case that the dedicated PUCCH resource with the lowest ID within the active UL BWP corresponds to more than one spatial relation, the spatial relation associated with the PUSCH corresponds to a spatial relation with a lowest ID among the more than one spatial relation.

* * * * *